United States Patent
Kamada et al.

(10) Patent No.: US 7,796,221 B2
(45) Date of Patent: Sep. 14, 2010

(54) LIQUID CRYSTAL DISPLAY DEVICE AND METHOD OF PREVENTING IMAGE STICKING THEREON

(75) Inventors: Tsuyoshi Kamada, Kawasaki (JP); Takashi Sasabayashi, Kawasaki (JP); Kazuya Ueda, Kawasaki (JP); Hidefumi Yoshida, Kawasaki (JP)

(73) Assignees: Fujitsu Limited, Kawasaki (JP); Au Optronics Corporation, Hsinchu (TW)

( * ) Notice: Subject to any disclaimer, the term of this patent is extended or adjusted under 35 U.S.C. 154(b) by 740 days.

(21) Appl. No.: 11/046,145

(22) Filed: Jan. 28, 2005

(65) Prior Publication Data

US 2006/0023137 A1    Feb. 2, 2006

(30) Foreign Application Priority Data

Jul. 28, 2004    (JP) .............................. 2004-220263

(51) Int. Cl.
    G02F 1/1343    (2006.01)
(52) U.S. Cl. ........................ 349/139; 349/39
(58) Field of Classification Search ................ 349/139, 349/39
    See application file for complete search history.

(56) References Cited

U.S. PATENT DOCUMENTS

| | | | |
|---|---|---|---|
| 4,840,460 A | 6/1989 | Bernot et al. ............... | 349/144 |
| 5,126,865 A | 6/1992 | Sarma ......................... | 349/85 |
| 5,459,596 A * | 10/1995 | Ueda et al. ................... | 349/39 |
| 5,521,729 A * | 5/1996 | Ukai et al. .................... | 349/42 |
| 5,786,876 A | 7/1998 | Ota et al. ...................... | 349/42 |
| 6,040,886 A | 3/2000 | Ota et al. ..................... | 349/141 |
| 6,400,427 B1 | 6/2002 | Hanazawa et al. ........... | 349/44 |
| 6,563,561 B1 | 5/2003 | Ota et al. .................... | 349/141 |
| 6,980,273 B2 | 12/2005 | Ota et al. .................... | 349/141 |
| 7,136,116 B2 | 11/2006 | Sakamoto et al. ............. | 349/43 |

FOREIGN PATENT DOCUMENTS

| | | |
|---|---|---|
| CN | 1129035 | 8/1996 |
| CN | 1470924 | 1/2004 |
| JP | 02-000012 | 1/1990 |
| JP | 3076938 | 6/2000 |

* cited by examiner

*Primary Examiner*—David Nelms
*Assistant Examiner*—W. Patty Chen
(74) *Attorney, Agent, or Firm*—Kratz, Quintos & Hanson, LLP

(57) ABSTRACT

A sub picture element electrode directly connected to a thin film transistor is disposed between a floating sub picture element electrode capacitively coupled to a control electrode and a gate bus line in order to prevent injection of electric charges from the gate bus line to the floating sub picture element electrode. Moreover, a shield pattern electrically connected to an auxiliary capacitance bus line is formed between the floating sub picture element electrode and a data bus line. This shield pattern avoids injection of electric charges from the data bus line to the floating sub picture element electrode.

1 Claim, 37 Drawing Sheets $$V_{px2} = \frac{C_c}{C_c + C_{LC2}} \times V_{px1}$$

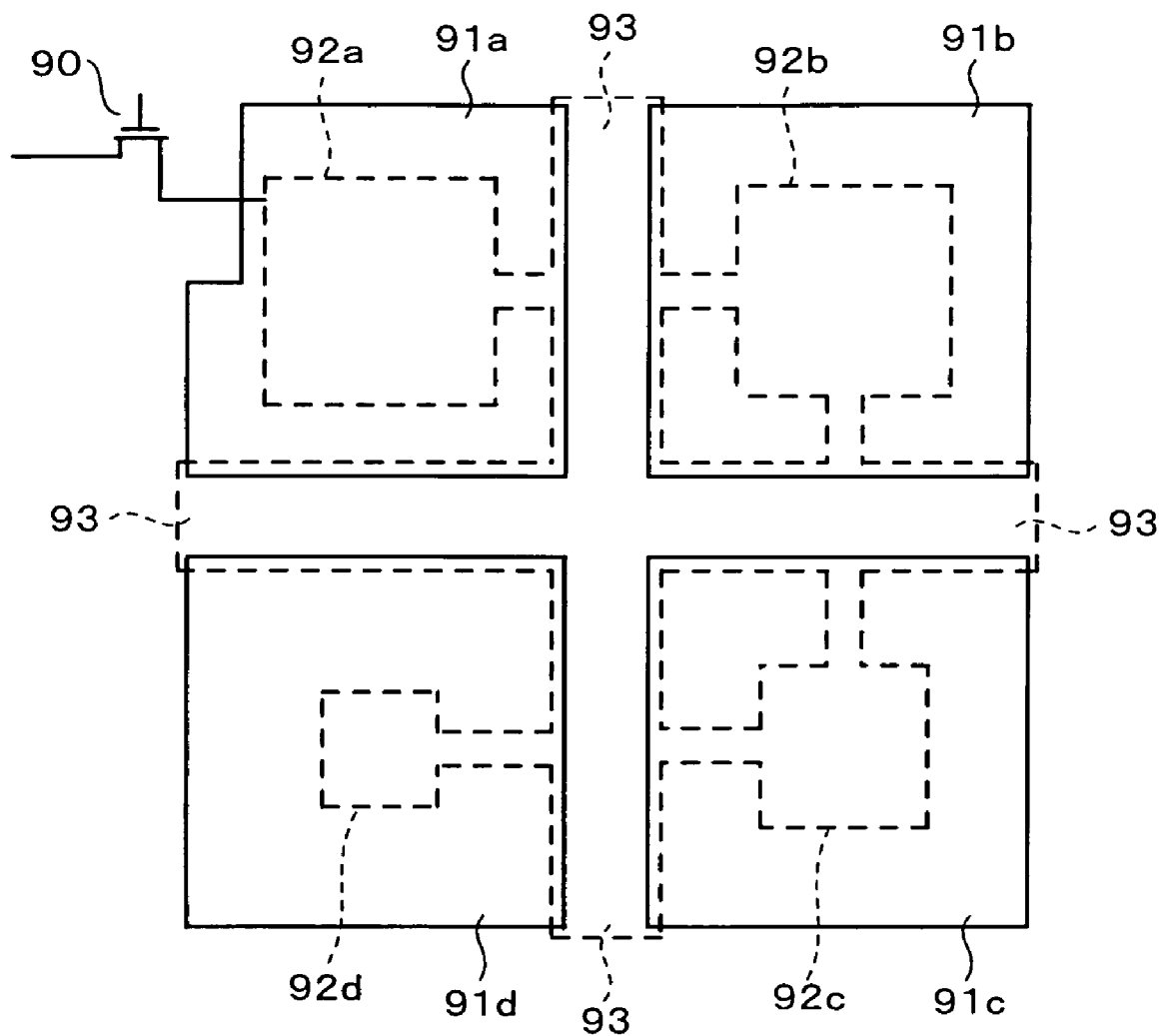

FIG. 7A
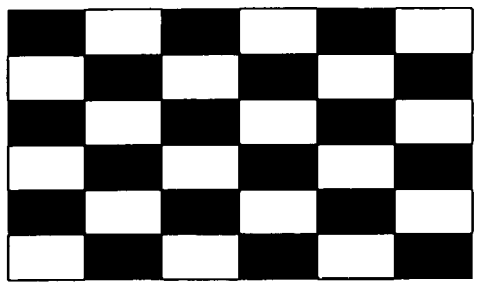
FIG. 7B
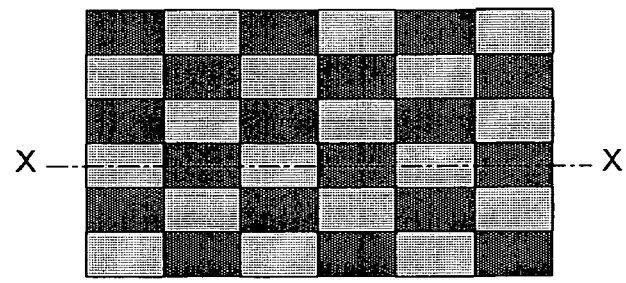
FIG. 7C
FIG. 8
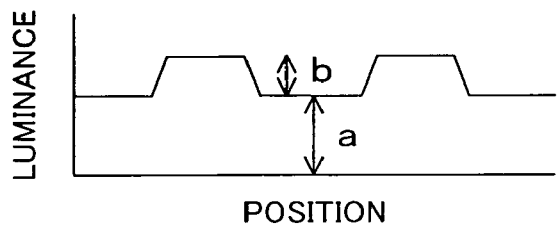

FIG. 11

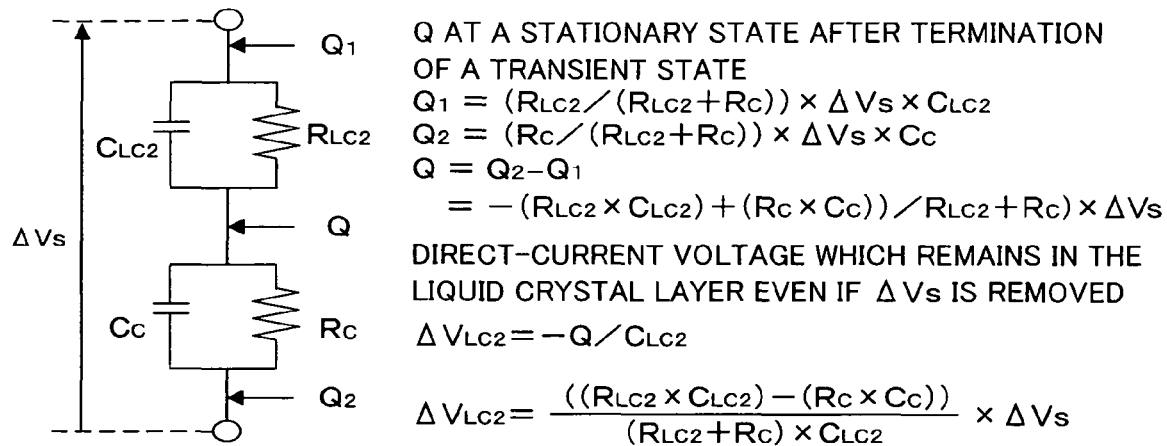

Q AT A STATIONARY STATE AFTER TERMINATION OF A TRANSIENT STATE $Q_1 = (R_{LC2}/(R_{LC2}+R_C)) \times \Delta V_S \times C_{LC2}$
$Q_2 = (R_C/(R_{LC2}+R_C)) \times \Delta V_S \times C_C$
$Q = Q_2 - Q_1$
$\phantom{Q} = -(R_{LC2} \times C_{LC2}) + (R_C \times C_C))/R_{LC2}+R_C) \times \Delta V_S$ DIRECT-CURRENT VOLTAGE WHICH REMAINS IN THE LIQUID CRYSTAL LAYER EVEN IF $\Delta V_S$ IS REMOVED $\Delta V_{LC2} = -Q/C_{LC2}$ $\Delta V_{LC2} = \dfrac{((R_{LC2} \times C_{LC2}) - (R_C \times C_C))}{(R_{LC2}+R_C) \times C_{LC2}} \times \Delta V_S$

FIG. 12

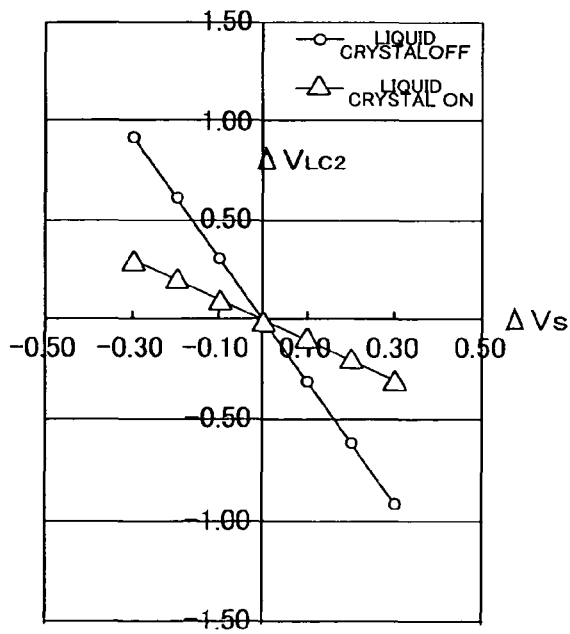

FIG. 29
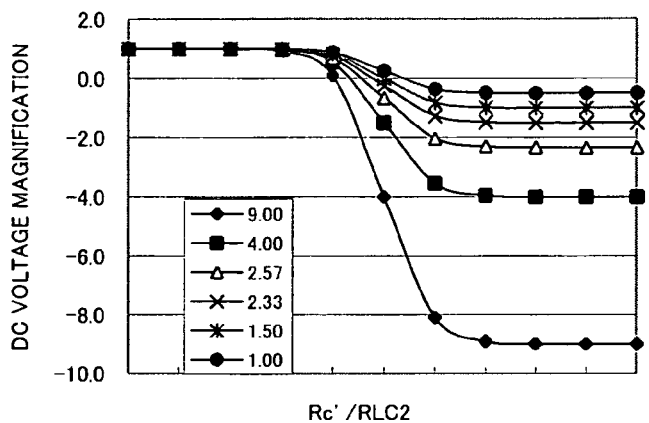
FIG. 30
|  | 0.9 | 0.8 | 0.72 | 0.7 | 0.6 | 0.5 |
|---|---|---|---|---|---|---|
|  | 9.00 | 4.00 | 2.57 | 2.33 | 1.50 | 1.00 |
| $10^{-5}$ | 1.00 | 1.00 | 1.00 | 1.00 | 1.00 | 1.00 |
| $10^{-4}$ | 1.00 | 1.00 | 1.00 | 1.00 | 1.00 | 1.00 |
| $10^{-3}$ | 0.99 | 1.00 | 1.00 | 1.00 | 1.00 | 1.00 |
| $10^{-2}$ | 0.90 | 0.95 | 0.97 | 0.98 | 0.98 | 0.99 |
| $10^{-1}$ | 0.09 | 0.55 | 0.70 | 0.77 | 0.82 | 0.88 |
| 1 | −4.00 | −1.50 | −0.67 | −0.25 | 0.00 | 0.25 |
| $10^1$ | −8.09 | −3.55 | −2.03 | −1.27 | −0.82 | −0.36 |
| $10^2$ | −8.90 | −3.95 | −2.30 | −1.48 | −0.98 | −0.49 |
| $10^3$ | −8.99 | −4.00 | −2.33 | −1.50 | −1.00 | −0.50 |
| $10^4$ | −9.00 | −4.00 | −2.33 | −1.50 | −1.00 | −0.50 |
| $10^5$ | −9.00 | −4.00 | −2.33 | −1.50 | −1.00 | −0.50 |
FIG. 31
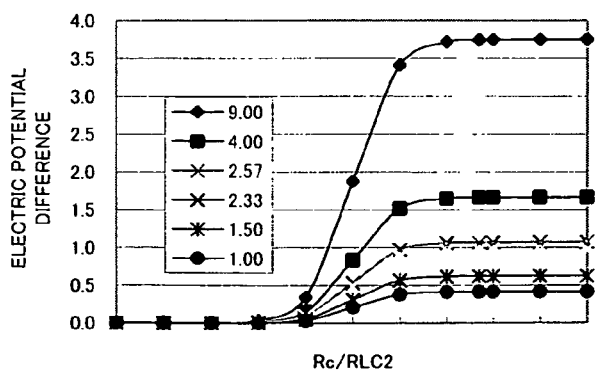

$$\Delta V_{LC2} = \frac{(1 - (R_C/R_{LC2} \times C_C/(C_{LC2} + C_{S2})))}{(1 + R_C/R_{LC2})} \times \Delta V_S$$

LIQUID CRYSTAL DISPLAY DEVICE AND METHOD OF PREVENTING IMAGE STICKING THEREON

CROSS-REFERENCE TO RELATED APPLICATIONS

This application is based on and claims priority of Japanese Patent Application No. 2004-220263, filed on Jul. 28, 2004, the entire contents of which are being incorporated herein by reference.

BACKGROUND OF THE INVENTION

1. Field of the Invention

The present invention relates to a liquid crystal display device including a plurality of sub picture element electrodes in one picture element region, and to a method of preventing image sticking thereon. More specifically, the present invention relates to such a liquid crystal display device in which at least one of the sub picture element electrodes is capacitively coupled with a control electrode to which a display voltage is applied, and to a method of preventing image sticking thereon.

2. Description of the Prior Art

As compared to a cathode ray tube (CRT), liquid crystal display devices have advantages that they are thin, lightweight, as well as have low voltage drive capability and low power consumption. For this reason, liquid crystal display devices are applied to various electronic devices including televisions, notebook personal computers (PCs), desktop PCs, personal digital assistants (PDAs), cellular telephones, and the like. In particular, an active matrix liquid crystal display device provided with thin film transistors (TFTs) as switching elements for respective picture elements (sub pixels) exerts excellent display characteristics almost equal to a CRT owing to high driving performances. Accordingly, active matrix liquid crystal display devices are now used in various fields, such as desktop PCs and televisions, where CRTs have been conventionally applied.

In general, a liquid crystal display device includes two substrates and liquid crystal which is sealed between these substrates. Picture element electrodes, TFTs, and the like are formed for respective picture elements on one of the substrates. Meanwhile, color filters opposed to the picture element electrodes, and a common electrode common to the respective picture elements are formed on the other substrate. The color filters include three types of red (R), green (G), and blue (B), and a color filter in one of these colors is disposed at each of the picture elements. The three picture elements in red (R), green (G), and blue (B), which are disposed adjacently to one another, collectively constitute one pixel. In this specification, the substrate including formation of the picture element electrodes and the TFTs will be hereinafter referred to as a TFT substrate, and the substrate to be disposed opposite to the TFT substrate will be hereinafter referred to as a counter substrate. Moreover, a structure formed by sealing the liquid crystal between the TFT substrate and the counter substrate will be hereinafter referred to as a liquid crystal panel.

Conventionally, a twisted nematic (TN) liquid crystal display device, which is configured to seal horizontal alignment type liquid crystal (liquid crystal having positive dielectric constant anisotropy) between two substrates and to subject liquid crystal molecules to twisted alignment, has been widely used. However, the twisted nematic liquid crystal display device has a disadvantage of a poor view angle characteristic where contrast and color tone vary largely when a screen is viewed from an inclined angle. For this reason, a multi-domain vertical alignment (MVA) liquid crystal display device having a fine view angle characteristic has been developed and put into practical use.

FIG. 1A and FIG. 1B are schematic cross-sectional views showing an example of a MVA liquid crystal display device. A TFT substrate 10 and a counter substrate 20 are disposed opposite to each other while sandwiching spacers (not shown), and vertical alignment type liquid crystal (liquid crystal having negative dielectric constant anisotropy) 30 is sealed between these substrates 10 and 20. Picture element electrodes 12 on the TFT substrate 10 are provided with slits 12a serving as domain regulating structures to determine directions of inclinations of liquid crystal molecules upon application of a voltage. Surfaces of the picture element electrodes 12 are covered with a vertical alignment film 14 made of polyimide, for example.

A plurality of protrusions 23 in the shape of mounds are formed below a common electrode 22 of the counter substrate 20 as domain regulating structures. As shown in FIG. 1A, these protrusions 23 are disposed in positions which are shifted in oblique directions relative to the slits 12a on the substrate 10. Surfaces of the common electrode 22 and the protrusions 23 are also covered with a vertical alignment film 24 made of polyimide, for example.

Polarizing plates (not shown) are disposed below the TFT substrate 10 and above the counter substrate 20, respectively. These polarizing plates are disposed so as to set absorptions axes orthogonal to each other.

In the MVA liquid crystal display device having the above-described configuration, when a voltage is not applied between the picture element electrodes 12 and the common electrode 22, most of liquid crystal molecules 30a are aligned perpendicularly to the surfaces of the substrates. However, the liquid crystal molecules 30a in the vicinity of the protrusions 23 are aligned perpendicularly to inclined surfaces of the protrusions 23. In this case, light entering a liquid crystal layer from a bottom of the TFT substrate 10 through the polarizing plate is transmitted through the liquid crystal layer while not changing the direction of polarization, and is then shielded by the other polarizing plate above the counter substrate 20. In short, a black display is achieved in this case.

When a given voltage is applied between the picture element electrodes 12 and the common electrode 22, the liquid crystal molecules 30a are aligned obliquely to the surfaces of the substrates due to an influence of an electric field. In this case, as shown in FIG. 1B, the directions of inclination of the liquid crystal molecules 30a are different on two sides of each slit 12a or each protrusion 23. In this way, so-called alignment division (or multi-domains) is achieved. When the liquid crystal molecules 30a are aligned obliquely to the surfaces of the substrates as shown in FIG. 1B, the light which enters the liquid crystal layer from the bottom of the TFT substrate 10 through the polarizing plate changes the direction of polarization and is transmitted through the polarizing plate above the counter substrate 20. The amount of the light transmitted through the polarizing plates depends on the voltage applied between the picture element electrodes 12 and the common electrode 22.

In the MVA liquid crystal display device, since the directions of inclination of the liquid crystal molecules 30a are different on the two sides of each slit 12a or each protrusion 23 upon application of the voltage as shown in FIG. 1B. Accordingly, leakage of the light in oblique directions is suppressed and an excellent view angle characteristic is obtained.

Although the above example explains the case where the protrusions and the slits constitute the domain regulating structures, there is also a case where recesses (grooves) on the surface of the substrate are used as the domain regulating structures. Moreover, although FIG. 1A and FIG. 1B describes the example in which the domain regulating structures are formed on both of the TFT substrate 10 and the counter substrate 20, it is also possible to form the domain regulating structures only on one of the TFT substrate 10 and the counter substrate 20.

Incidentally, the conventional MVA liquid crystal display device causes a phenomenon in which a screen seems slightly whiter when viewed from an oblique angle. FIG. 2 is a graph showing transmittance-applied voltage (T-V) characteristic when viewing a screen from front and T-V characteristic when viewing the screen from above at an angle of 60°, in which the lateral axis indicates the applied voltage (V) and the longitudinal axis indicates the transmittance. As shown in FIG. 2, when a voltage slightly higher than a threshold voltage is applied (a region surrounded by a circle in the graph), the transmittance when viewing the screen obliquely becomes higher than the transmittance when viewing the screen from front. On the contrary, when the applied voltage is increased to a certain level, the transmittance when viewing the screen obliquely becomes lower than the transmittance when viewing the screen from front. For this reason, differences in luminance among a red picture element, a green picture element, and a blue picture element are reduced when viewing the screen from obliquely, and resultantly, the phenomenon of the whiter screen occurs as described previously. This phenomenon is called wash out. Wash out occurs not only in the MVA liquid crystal display device but also in the TN liquid crystal display device.

The U.S. Pat. No. 4,840,460 Specification disclosed a technique to divide one picture element into a plurality of sub picture elements and to subject the sub picture element to capacitive coupling. In such a liquid crystal display device, electric potential is divided depending on capacity ratios among the respective sub picture elements. Accordingly, it is possible to apply different amounts of voltages to the respective sub picture elements. Therefore, one picture element appears to include a plurality of regions having different threshold values in terms of the T-V characteristic. When one picture element includes the plurality of regions having different threshold values in terms of the T-V characteristic, it is possible to suppress the phenomenon that the transmittance when viewing the screen obliquely becomes higher than the transmittance when viewing the screen from front, and thereby to suppress the phenomenon of the whiter screen (wash out). The above-described method of improving a display characteristic by means of dividing one picture element into the plurality of capacitively coupled sub picture elements is called a halftone gray scale (HT) method applying capacitive coupling. Note that the liquid crystal display device disclosed in U.S. Pat. No. 4,840,460 is a TN liquid crystal display device.

FIG. 3 is a plan view showing an example of a TFT substrate in a liquid crystal display device configured to achieve the HT method applying capacitive coupling, and FIG. 4 is a cross-sectional view taken along the I-I line in FIG. 3.

On a glass substrate 51 constituting a base of the TFT substrate, there are formed a plurality of gate bus lines 52 extending in a horizontal direction (an X direction) and a plurality of data bus lines (drain bus lines) 55 extending in a vertical direction (a Y direction). A rectangular region defined by the gate bus lines 52 and the data bus lines 55 constitutes each picture element region. Meanwhile, on the glass substrate 51, there are formed auxiliary capacitance bus lines 53 disposed parallel to the gate bus lines 52 and intersecting the center of the respective picture element regions.

A first insulating film 54 is formed in a space between each of the gate bus lines 52 and each of the data bus lines 55 and in a space between each of the auxiliary capacitance bus lines 53 and each of the data bus lines 55. By using this first insulating film 54, the gate bus lines 52 and the data bus lines 55, and, the auxiliary capacitance bus lines 53 and the data bus lines 55 are electrically insulated, respectively.

A thin film transistor (TFT) 56, a control electrode 57, an auxiliary capacitance electrode 58, and sub picture element electrodes 61a and 61b are formed in each picture element region. As shown in FIG. 3, the TFT 56 applies part of the gate bus line 52 as a gate electrode. Moreover, as shown in FIG. 4, a semiconductor film 56a constituting an active layer for the TFT 56 is formed above the gate bus line 52, and a channel protection film 56b is formed on this semiconductor film 56a.

A drain electrode 56d of the TFT 56 is connected to the data bus line 55, and a source electrode 56s thereof is disposed in a position opposed to the drain electrode 56d while sandwiching the gate bus line 52. Moreover, the auxiliary capacitance electrode 58 is formed in a position opposed to the auxiliary capacitance bus line 53 while sandwiching the first insulating film 54. Furthermore, as shown in FIG. 3, the control electrode 57 is electrically connected to the source electrode 56s and to the auxiliary capacitance electrode 58 through a line 59.

The data bus lines 55, the TFT 56, the control electrode 57, the auxiliary capacitance electrode 58, and the line 59 are covered with a second insulating film 60, and the sub picture element electrodes 61a and 61b are formed on the second insulating film 60. The sub picture element electrode 61a is capacitively coupled to the control electrode 57 while sandwiching the second insulating film 60. Meanwhile, the sub picture element electrode 61b is electrically connected to the auxiliary capacitance electrode 58 through a contact hole 60a which is formed on the second insulating film 60. Surfaces of the sub picture element electrodes 61a and 61b are covered with an alignment film 62.

In the meantime, as shown in FIG. 4, the counter substrate includes a color filter 72 formed on one of surfaces (which is on the lower side in FIG. 4) of a glass substrate 71 constituting a base, a common electrode 73 formed on the color filter 72, and an alignment film 74 covering a surface of the common electrode 73.

The TFT substrate and the counter electrode are disposed opposite to each other while sandwiching spacers (not shown). Then, liquid crystal 80 is sealed between the TFT substrate and the counter substrate.

In a case of a transmissive liquid crystal display device, the sub picture element electrodes 61a and 61b are made of a transparent conductive material such as indium-tin oxide (ITO). On the other hand, in a case of a reflective liquid crystal display device, the sub picture element electrodes 61a and 61b are made of a highly reflective material such as aluminum.

FIG. 5 is an equivalent circuit diagram showing one picture element in a liquid crystal display device including the above-described TFT substrate. In FIG. 5, reference code $C_{LC1}$ denotes a capacitance composed of the sub picture element electrode 61b and the common electrode 73, reference code $C_S$ denotes a capacitance composed of the auxiliary capacitance electrode 58 and the auxiliary capacitance bus line 53, reference code $C_C$ denotes a capacitance composed of the sub picture element electrode 61a and the control electrode 57, and reference code $C_{LC2}$ denotes a capacitance composed of the sub picture element electrode 61a and the common electrode 73. As shown in FIG. 5, a voltage is divided by the capacitance $C_{LC2}$, which is formed between the sub picture element electrode 61a and the common electrode 73, and the control capacitance $C_C$. Accordingly, when a voltage applied to the sub picture element electrode 61b is $V_{px1}$, a voltage $V_{px2}$ to be applied to the sub picture element electrode 61a will be calculated by the following formula (1):

$$V_{px2} = \frac{C_C}{C_C + C_{LC2}} \times V_{px1} \quad (1)$$

Although an actual voltage ratio ($V_{px2}/V_{px1}$) is a design item for a display characteristic of a liquid crystal display device, it is considered ideal that the voltage ratio is in a range approximately from 0.6 to 0.8.

A sub picture element electrode to which a display voltage is applied through capacitive coupling, such as the sub picture element electrode 61a, will be hereinafter referred to as a floating sub picture element electrode. Meanwhile, a sub picture element electrode electrically connected to a TFT through a low-resistance conductive body (a line, for example), such as the sub picture element electrode 61b, will be hereinafter referred to as a sub picture element electrode directly connected to the TFT.

As shown in FIG. 6, Japanese Patent No. 3076938 Specification (equivalent to Japanese Unexamined Patent Publication No. 5(1993)-66412) discloses a TN liquid crystal display device in which a picture element electrode is divided into a plurality (which is equal to four in FIG. 6) of sub picture element electrodes 91a to 91d and control electrodes 92a to 92d are respectively disposed below the sub picture element electrodes 91a to 91d through an insulating film. In this liquid crystal display device, display voltages are applied to the control electrodes 92a to 92d through a TFT 90. Since the sizes of the respective control electrodes 92a to 92d are different from one another, the voltages to be applied to the sub picture element electrodes 91a to 91d are also mutually different. Accordingly, it is possible to obtain an effect attributable to the HT method, namely, an effect to suppress wash out. Here, to avoid leakage of light from a space between any of the sub picture element electrodes 91a to 91d, another control electrode 93 is also disposed in the space between any of the sub picture element electrodes 91a to 91d.

However, the inventors of the present invention have carried out experiments and researches and have found out that a liquid crystal display device including the above-described conventional floating sub picture element electrodes caused deterioration in the display characteristic attributable to image sticking.

FIG. 7A to FIG. 7C and FIG. 8 are schematic diagrams showing a testing method for measuring a degree of image sticking. Firstly, a black and white checker pattern as shown in FIG. 7A is displayed on a liquid crystal display device continuously for a certain period. Thereafter, a halftone pattern as shown in FIG. 7B is displayed on the entire screen of the liquid crystal display device. In this case, when image sticking occurs on the screen, the checker pattern becomes dimly visible as shown in FIG. 7C. After switching from the checker pattern display to the halftone display, luminance is measured along the X-X line in FIG. 7C, for example. Then, assuming that luminance in a dark portion is "a" and a difference in luminance between the dark portion and a bright portion is "b" as shown in FIG. 8, an image sticking ratio defined as 100×b/(a+b) will be calculated.

An image sticking ratio of a liquid crystal display device not including the floating sub picture element electrodes and an image sticking ratio of a liquid crystal display device including the floating sub picture element electrodes were measured in accordance with the above-described method. As a result, the image sticking ratio of the liquid crystal display device not including the sub picture element electrodes was equal to or less than 5%. On the contrary, the image sticking ratio of the liquid crystal display device including the sub picture element electrodes was equal to or more than 10%.

SUMMARY OF THE INVENTION

In consideration of the foregoing problem, it is an object of the present invention to provide a liquid crystal display device applying the capacitive coupling HT method for suppressing wash out, which is capable of preventing occurrence of image sticking, and to provide a method of preventing the image sticking.

The above-described problem will be solved by a liquid crystal display device having first and second substrates disposed opposite to each other, a liquid crystal sealed between the first and second substrates, a gate bus line and a data bus line formed on the first substrate, a thin film transistor connected to the gate bus line and the data bus line, a plurality of sub picture element electrodes formed in a picture element region defined by the gate bus line and the data bus line, and a control electrode capacitively coupled to at least one of the plurality of sub picture element electrodes and to which a display voltage is applied from the data bus line through the thin film transistor. Here, the liquid crystal display device includes a shield member for electrically shielding connection between the sub picture element electrode capacitively coupled to the control electrode and at least any of the gate bus line and the data bus line.

In the present invention, connection between the sub picture element electrode, which is capacitively coupled to the control electrode, and at least any of the gate bus line and the data bus line is electrically shielded by the shield member connected to an auxiliary capacitance bus line that is maintained at constant electric potential, for example. In this way, by shielding the sub picture element electrode capacitively coupled to the control electrode by use of the shield member, it is possible to avoid injection of charges either from the gate bus line or from the data bus line to the sub picture element electrode. As a result, image sticking is prevented.

It is also possible to use a sub picture element which is directly connected to the TFT as the shield member. For example, by disposing the sub picture element electrode directly connected to the TFT between the sub picture element electrode capacitively coupled to the control electrode and the gate bus line, it is possible to avoid injection of electric charges from the gate bus line to the sub picture element electrode capacitively coupled to the control electrode.

The above-described problem will be solved by a method of preventing image sticking on a liquid crystal display device, which has first and second substrates disposed opposite to each other, a liquid crystal sealed between the first and second substrates, a gate bus line and a data bus line formed on the first substrate, a thin film transistor connected to the gate bus line and the data bus line, a plurality of sub picture element electrodes formed in a picture element region defined by the gate bus line and the data bus line, a control electrode capacitively coupled to at least one of the plurality of sub picture element electrodes and to which a display voltage is applied from the data bus line through the thin film transistor, and a common electrode formed on the second substrate and opposed to the plurality of sub picture element electrodes on the first substrate. Here, assuming that central electric potential of the data bus line relative to electric potential of the common electrode is $V_{ddc}$, that central electric potential of the gate bus line relative to the electric potential of the common electrode is $V_{gdc}$, that a resistance between the sub picture element electrode capacitively coupled to the control electrode and the data bus line is $R_D$, and that a resistance between the sub picture element electrode capacitively coupled to the control electrode and the gate bus line is $R_G$, the method includes the step of setting a position and a shape of the sub picture element electrode capacitively coupled to the control electrode so as to satisfy that $V_{ddc} - V_{gdc} \times R_D/R_G$ is approximately equal to zero.

To maintain the TFT to an off state, a negative voltage is applied to the gate bus line in the majority of a frame period. Meanwhile, a positive direct-current voltage is superposed with a signal flowing on the data bus line in order to compensate a feed through voltage. Therefore, it is possible to prevent image sticking by setting the position and the shape of the sub picture element electrode (the sub picture element electrode capacitively coupled to the control electrode) such that an influence of a direct-current voltage component of the signal flowing on the data bus line (that is, the central electric potential of the data bus line relative to the electric potential of the common electrode) and an influence of a direct-current voltage component of a signal flowing on the gate bus line (that is, the central electric potential of the gate bus line relative to the electric potential of the common electrode) cancel each other, i.e., so as to satisfy that $V_{ddc} - V_{gdc} \times R_D/R_G$ is approximately equal to zero.

The above-described problem will be solved by a liquid crystal display device having first and second substrates disposed opposite to each other, a liquid crystal sealed between the first and second substrates, a gate bus line and a data bus line formed on the first substrate, a thin film transistor connected to the gate bus line and the data bus line, a plurality of sub picture element electrodes formed in a picture element region defined by the gate bus line and the data bus line, a control electrode capacitively coupled to at least one of the plurality of sub picture element electrodes and to which a display voltage is applied from the data bus line through the thin film transistor, and a common electrode formed on the second substrate and opposed to the plurality of sub picture element electrodes on the first substrate. Here, the sub picture element electrode capacitively coupled to the control electrode is connected to the sub picture element electrode connected to the thin film transistor through a resistor.

In the present invention, the sub picture element electrode capacitively coupled to the control electrode (the floating sub picture element electrode) is connected to the sub picture element electrode directly connected to the thin film transistor through the high-resistance resistor made of amorphous silicon, for example. In this way, a value of resistance between the floating sub picture element electrode and the control electrode is reduced and a direct-current voltage remaining in a liquid crystal layer is reduced, whereby occurrence of image sticking is prevented. However, if the value of resistance of the resistor is too low, an electric current will flow between the floating sub picture element electrode and the sub picture element electrode directly connected to the TFT and an electric potential difference is reduced. Accordingly, the effect of preventing wash out will be reduced.

The above-described problem will be solved by a liquid crystal display device having first and second substrates disposed opposite to each other, a liquid crystal sealed between the first and second substrates, a gate bus line and a data bus line formed on the first substrate, a thin film transistor connected to the gate bus line and the data bus line, a plurality of sub picture element electrodes formed in a picture element region defined by the gate bus line and the data bus line, a control electrode capacitively coupled to at least one of the plurality of sub picture element electrodes and to which a display voltage is applied from the data bus line through the thin film transistor, and an auxiliary capacitance bus line maintained at constant electric potential and constituting an auxiliary capacitance together with the control electrode. Here, the liquid crystal display device includes a switching element to be driven by a signal flowing on a different gate bus line from the gate bus line to which the thin film transistor is connected, the switching element being provided in any of a location between the sub picture element electrode capacitively coupled to the control electrode and the auxiliary capacitance bus line or a location between the sub picture element electrode capacitively coupled to the control electrode and the sub picture element electrode connected to the thin film transistor.

In the present invention, the switching element is disposed either between the floating sub picture element electrode and the auxiliary capacitance bus line or between the floating sub picture element electrode and the sub picture element electrode directly connected to the thin film transistor, and the switching element is driven by the signal flowing on the different gate bus line from the gate bus line connected to the thin film transistor. In this way, electric charges charged in the floating sub picture element electrode at given timing flow either on the auxiliary capacitance bus line or on the sub picture element electrode directly connected to the TFT, and occurrence of image sticking is thereby prevented.

The above-described problem will be solved by a method of preventing image sticking on a liquid crystal display device having first and second substrates disposed opposite to each other, a liquid crystal sealed between the first and second substrates, a gate bus line and a data bus line formed on the first substrate, a thin film transistor connected to the gate bus line and the data bus line, a plurality of sub picture element electrodes formed in a picture element region defined by the gate bus line and the data bus line, a control electrode capacitively coupled to at least one of the plurality of sub picture element electrodes and to which a display voltage is applied from the data bus line through the thin film transistor, an auxiliary capacitance bus line maintained at constant electric potential and constituting an auxiliary capacitance together with the control electrode, and a common electrode formed on the second substrate and opposed to the plurality of sub picture element electrodes on the first substrate. Here, the method includes the step of forming a second auxiliary capacitance parallel to a capacitance between the sub picture element electrode capacitively coupled to the control electrode and the common electrode.

One of the reasons why the electric potential difference occurs between the floating sub picture element electrodes in a white display portion and in a black display portion is variation in a liquid crystal capacitance. Accordingly, in the present invention, the second auxiliary capacitance is formed parallel to the liquid crystal capacitance to reduce an influence by the variation in the liquid crystal capacitance.

Normally, the auxiliary capacitance bus line is maintained either at the same electric potential as that of the common electrode or at constant electric potential relative to the common electrode. Therefore, when an auxiliary capacitance electrode is formed between the floating sub picture element electrode and the auxiliary capacitance bus line and this auxiliary capacitance electrode is connected to the floating sub picture element electrode, for example, it is equivalent to formation of the second auxiliary capacitance parallel to the liquid crystal capacitance. In this way, it is possible to avoid occurrence of image sticking.

BRIEF DESCRIPTION OF THE DRAWINGS

FIG. 6 is a plan view showing a liquid crystal display device disclosed in Japanese Patent No. 3076938 Specification.

FIG. 7A to FIG. 7C are schematic diagrams (No. 1) showing a testing method for measuring a degree of image sticking.

FIG. 8 is a schematic diagram (No. 2) showing the testing method for measuring the degree of image sticking.

FIG. 11 is an equivalent circuit diagram showing a sub picture element electrode including a floating sub picture element electrode.

FIG. 12 is a graph showing a relation between $\Delta Vs$ and $\Delta V_{LC2}$ when a display voltage is applied to a liquid crystal layer (when liquid crystal is turned on), and a relation between $\Delta Vs$ and $\Delta V_{LC2}$ when the display voltage is not applied to the liquid crystal layer (when the liquid crystal is turned off).

FIG. 29 is a graph showing results of calculations of dependencies (DC voltage magnifications) of image sticking voltages on a resistor $R_C$ between a control electrode and a floating sub picture element electrode and on a resistor $R_{LC2}$ between the floating sub picture element electrode and a common electrode.

FIG. 30 is a table showing the results illustrated in FIG. 29.

FIG. 31 is a graph showing relations between $R_C/R_{LC2}$ and electric potential differences of sub picture element electrodes at a white display portion and at a black display portion.

DESCRIPTION OF THE PREFERRED EMBODIMENTS

Now, the present invention will be described further in detail.

Normally, image sticking on a liquid crystal display device is attributable to existence of direct-current voltage components in signals flowing on a gate bus line, a data bus line, and the like, and variation in CR values (values of a liquid crystal capacitance and a liquid crystal resistor) of a liquid crystal layer between a white display mode and a black display mode as a consequence. In the following, the reason why the image sticking occurs in a liquid crystal display device including a floating sub picture element electrode will be described.

Figure 9:
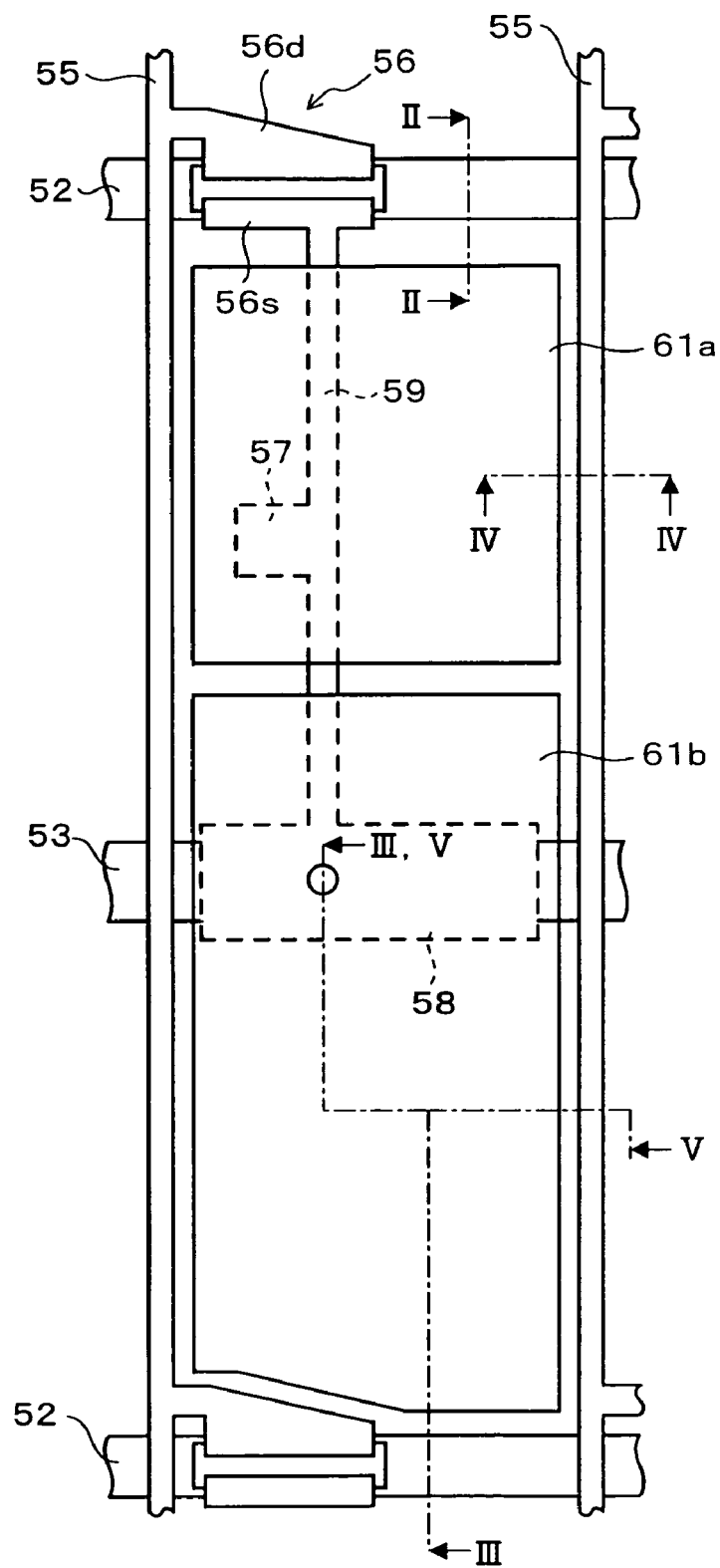
FIG. 9 is a plan view showing one picture element in a liquid crystal display device including a floating sub picture element electrode.

FIG. 9 is a plan view showing one picture element in a liquid crystal display device including a floating sub picture element electrode. Meanwhile, FIG. 10A is a schematic cross-sectional view taken along the II-II line in FIG. 9, FIG. 10B is a schematic cross-sectional view taken along the III-III line in FIG. 9, FIG. 10C is a schematic cross-sectional view taken along the IV-IV line in FIG. 9, and FIG. 10D is a schematic cross-sectional view taken along the V-V line in FIG. 9.

Figure 10A:
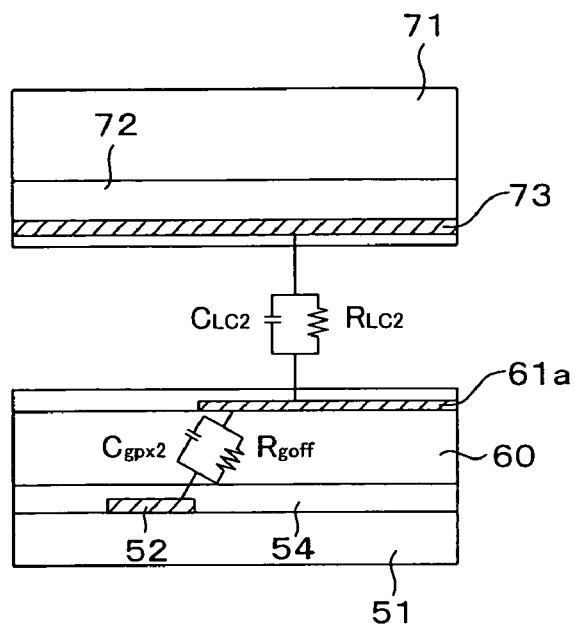
FIG. 10A is a schematic cross-sectional view taken along the II-II line in FIG. 9.
Figure 10C:
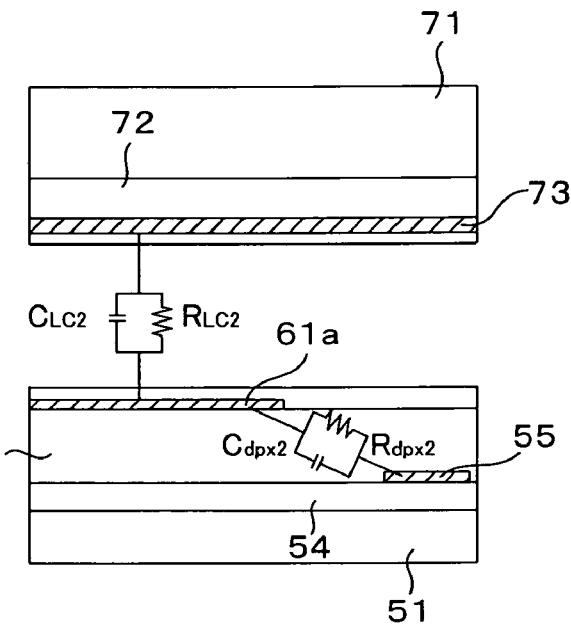
FIG. 10C is a schematic cross-sectional view taken along the IV-IV line in FIG. 9.

In the liquid crystal display device shown in FIG. 9, it is possible to consider that $C_{LC2}$ and $R_{LC2}$ are connected in parallel between a sub picture element electrode (a floating sub picture element electrode) 61a and a common electrode 73 as shown in FIG. 10A. Here, reference code $C_{LC2}$ denotes a capacitance between the sub picture element electrode 61a and the common electrode 73, and reference code $R_{LC2}$ denotes a resistance between the sub picture element electrode 61a and the common electrode 73.

Moreover, it is also possible to consider that $C_{gpx2}$ and $R_{goff}$ are connected in parallel between the sub picture element electrode 61a and a gate bus line 52. Here, reference code $C_{gpx2}$ denotes a capacitance between the sub picture element electrode 61a and the gate bus line 52, and reference code $R_{goff}$ denotes a resistance between the sub picture element electrode 61a and the gate bus line 52.

Figure 10B:
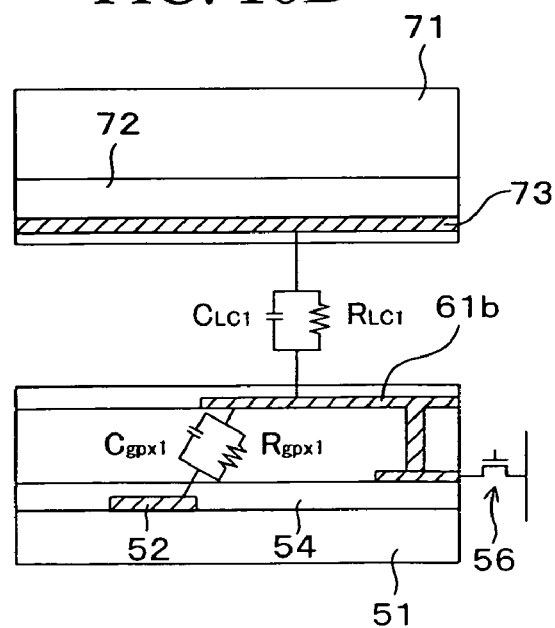
FIG. 10B is a schematic cross-sectional view taken along the III-III III line in FIG. 9.
Figure 10D:
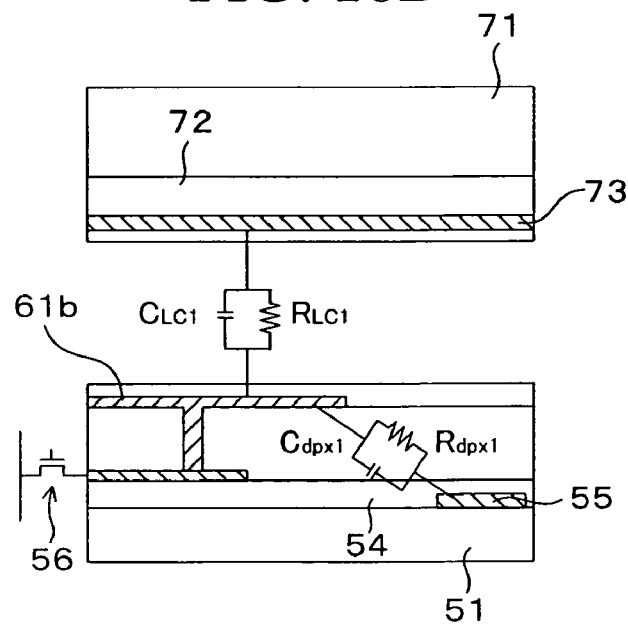
FIG. 10D is a schematic cross-sectional view taken along the V-V line in FIG. 9.

Meanwhile, it is also possible to consider that $C_{LC1}$ and $R_{LC1}$ are connected in parallel between a sub picture element electrode (a sub picture element electrode directly connected to a thin film transistor (TFT) 56) 61b and the common electrode 73 as shown in FIG. 10B. Here, reference code $C_{LC1}$ denotes a capacitance between the sub picture element electrode 61b and the common electrode 73, and reference code $R_{LC1}$ denotes a resistance between the sub picture element electrode 61b and the common electrode 73.

Moreover, it is also possible to consider that $C_{gpx1}$ and $R_{gpx1}$ are connected in parallel between the sub picture element electrode 61b and the gate bus line 52. Here, reference code $C_{gpx1}$ denotes a capacitance between the sub picture element electrode 61b and the gate bus line 52, and reference code $R_{gpx1}$ denotes a resistance between the sub picture element electrode 61b and the gate bus line 52.

To maintain the TFT 56 to an off state for most of time in one field period, a direct-current voltage ($V_{goff}$), which is lower by about $-12$ V than electric potential of the common electrode 73, is applied to the gate bus line 52. Electric charges corresponding to this direct-current voltage are accumulated in the sub picture element electrodes 61a and 61b through the capacitance $C_{gpx2}$ and the resistance $R_{goff}$. However, the TFT 56 is normally turned on once in every field and the sub picture element electrode 61b is electrically connected to a data bus line 55. Accordingly, the electric charges charged in the sub picture element electrode 61b during the period when the TFT 56 is turned off will flow toward the data bus line 55, and the direct-current voltage component will not remain in the sub picture element electrode 61b. On the contrary, the electric charges charged in the sub picture element electrode 61a will be retained therein even if the TFT 56 is turned on. For this reason, the direct-current voltage component will remain in the sub picture element electrode 61a.

As shown in FIG. 10C, it is possible to consider that $C_{dpx2}$ and $R_{dpx2}$ are connected in parallel between the sub picture element electrode 61a and the data bus line 55. Here, reference code $C_{dpx2}$ denotes a capacitance between the sub picture element electrode 61a and the data bus line 55, and reference code $R_{dpx2}$ denotes a resistance between the sub picture element electrode 61a and the data bus line 55.

Moreover, as shown in FIG. 10D, it is also possible to consider that $C_{dpx1}$ and $R_{dpx1}$ are connected in parallel between the sub picture element electrode 61b and the data bus line 55. Here, reference code $C_{dpx1}$ denotes a capacitance between the sub picture element electrode 61b and the data bus line 55, and reference code $R_{dpx1}$ denotes a resistance between the sub picture element electrode 61b and the data bus line 55.

To compensate a feed through voltage, a direct-current voltage, which is higher by about 1 to 2 V than the electric potential of the common electrode 73, is superposed with a display signal (an alternating-current signal) on the data bus line 55. Electric charges corresponding to this direct-current voltage are also accumulated in the sub picture element electrode 61a through the capacitance $C_{dpx2}$ and the resistance $R_{dpx2}$.

However, as described above, the TFT 56 is turned on once in every field and the sub picture element electrode 61b is electrically connected to the data bus line 55. Accordingly, the electric charges charged in the sub picture element electrode 61b during the period when the TFT 56 is turned off will flow toward the data bus line 55 when the TFT 56 is turned on. For this reason, the direct-current voltage component will not remain in the sub picture element electrode 61b. On the contrary, the electric charges charged in the sub picture element electrode 61a will be retained therein even if the TFT 56 is turned on. For this reason, the direct-current voltage component will remain in the sub picture element electrode 61a.

As described above, while accumulation of the direct-current voltage component is hardly observed in the sub picture element electrode 61b directly connected to the TFT 56, the electric charges are charged in the floating sub picture element electrode 61a and the direct-current voltage component remains therein.

Next, a relation between the electric charges charged in the floating sub picture element electrode and the image sticking will be described.

FIG. 11 is an equivalent circuit diagram showing a sub picture element electrode including a floating sub picture element electrode. Here, a direct-current voltage component between a control electrode and a common electrode will be defined as $\Delta Vs$, an amount of charges in the floating sub picture element electrode will be defined as Q, an amount of charges in the common electrode will be defined as Q1, and an amount of charges in the control electrode will be defined as Q2. The values of Q1, Q2, and Q at a stationary state after termination of a transient state will be calculated by the following formulae (2a) to (2c):

$$Q1 = \frac{R_{LC2}}{R_{LC2} + R_C} \times \Delta V_S \times C_{LC2} \qquad (2a)$$

$$Q2 = \frac{R_C}{R_{LC2} + R_C} \times \Delta V_S \times C_C \qquad (2b)$$

$$Q = Q2 - Q1 \qquad (2c)$$
$$= \frac{-((R_{LC2} \times C_{LC2}) - (R_C \times C_C))}{R_{LC2} + R_C} \times \Delta V_S$$

Even if the direct-current voltage component $\Delta V_S$ is removed, a direct-current voltage component $\Delta V_{LC2}$ as shown in the following formula (3) will remain in the liquid crystal layer:

$$\Delta V_{LC2} = -Q/Q_{LC2} \qquad (3)$$
$$= \frac{((R_{LC2} \times C_{LC2}) - (R_C \times C_C))}{(R_{LC2} + R_C) \times C_{LC2}} \times \Delta V_S$$

Assuming that an area of a sub picture element electrode is S and a cell thickness is d, the liquid crystal capacitance $C_{LC2}$ will be expressed as $C_{LC2} = \in(S/d)$. Here, $\in$ is a dielectric constant of the liquid crystal. Since a dielectric constant when liquid crystal molecules are aligned perpendicularly to surface of substrates is different from a dielectric constant when the liquid crystal molecules are aligned horizontally, the values of the liquid crystal capacitance are different between a picture element displaying a white portion of a checker pattern and a picture element displaying a black portion thereof. As a result, the values of the direct-current voltage component $\Delta V_{LC2}$ to be applied to the liquid crystal liquid layer are also different between these picture elements. When the checker pattern display is switched to a halftone display, the direct-current voltage components remaining in the liquid crystal layer do not change immediately. Therefore, a picture element displaying white and a picture element displaying black have different voltages to be applied to the liquid crystal layer. For this reason, a light transmittance of the picture element displaying white is different from a light transmittance of the picture element displaying black, and the image sticking is thereby caused. Here, the image sticking occurring due to the above-described reason will be decreased within a period corresponding to a time constant between the sub picture element electrode and either the control electrode or the common electrode. However, it is necessary to reduce the image sticking as much as possible in order to improve display quality.

FIG. 12 is a graph showing a relation between $\Delta V_S$ and $\Delta V_{LC2}$ when a display voltage is applied to the liquid crystal layer (when the liquid crystal is turned on), and a relation between $\Delta V_S$ and $\Delta V_{LC2}$ when the display voltage is not applied to the liquid crystal layer (when the liquid crystal is turned off), in which the lateral axis indicates the direct-current voltage component $\Delta V_S$ between the control electrode and the common electrode and the longitudinal axis indicates the direct-current voltage component $\Delta V_{LC2}$ which remains in the liquid crystal layer. Here, it is to be noted that figures in FIG. 12 are calculated on the basis of the liquid crystal display device having the structure shown in FIG. 9, in which a picture element pitch is set to 125 μm, an area proportion between the sub picture element electrode 61a capacitively coupled to a control electrode 57 and the sub picture element electrode 61b directly connected to the TFT 56 is set to 3 to 7, and a ratio between a display voltage to be applied to the sub picture element electrode (the floating sub picture element electrode) 61a and a display voltage to be applied to the sub picture element electrode (the sub picture element electrode directly connected to the TFT) 61b is set to 0.72.

It is apparent from FIG. 12 that a voltage, which is several times higher than the direct-current voltage component $\Delta V_S$ between the control electrode and the common electrode, is applied to the liquid crystal layer. For this reason, an effect to suppress image sticking is limited even if the direct-current voltage component $\Delta V_S$ between the control electrode and the common electrode is reduced.

The inventors of the present invention considered that it was essential to apply any of the following countermeasures to prevent image sticking.

(1) Accumulation of the electric charges in the floating sub picture element electrode is suppressed by electrically shielding between the bus line (such as the gate bus line or the data bus line), which allows the signal including the direct-current voltage component to flow thereon, and the floating sub picture element electrode.

(2) The direct-current voltage component possessed by the signal flowing on the gate bus line has a reverse polarity as compared to the direct-current voltage component possessed by the signal flowing on the data bus line. Accordingly, the resistance between the floating sub picture element electrode and the gate bus line and the resistance between the floating sub picture element electrode and the data bus line are optimized so that the influences of these two direct-current voltage components cancel each other.

(3) When the resistance between the floating sub picture element electrode and the control electrode is reduced, the direct-current voltage component remaining in the liquid crystal layer is also reduced. However, if the resistance between the floating sub picture element electrode and the control electrode is reduced excessively, it is not possible to obtain the effect to suppress wash out. Accordingly, the resistance between the floating sub picture element electrode and the control electrode is optimized so as not to cause wash out or image sticking.

(4) The electric charges accumulated in the floating sub picture element electrode are discharged to the data bus line, the auxiliary capacitance bus line or the like at a constant frequency.

(5) An auxiliary capacitance is formed in parallel to the capacitance (the liquid crystal capacitance) between the floating sub picture element electrode and the common electrode to reduce an influence of variation in the liquid crystal capacitance.

Now, liquid crystal display devices according to the preferred embodiments of the present invention provided with the aforementioned countermeasures will be described.

First Embodiment

Figure 13:
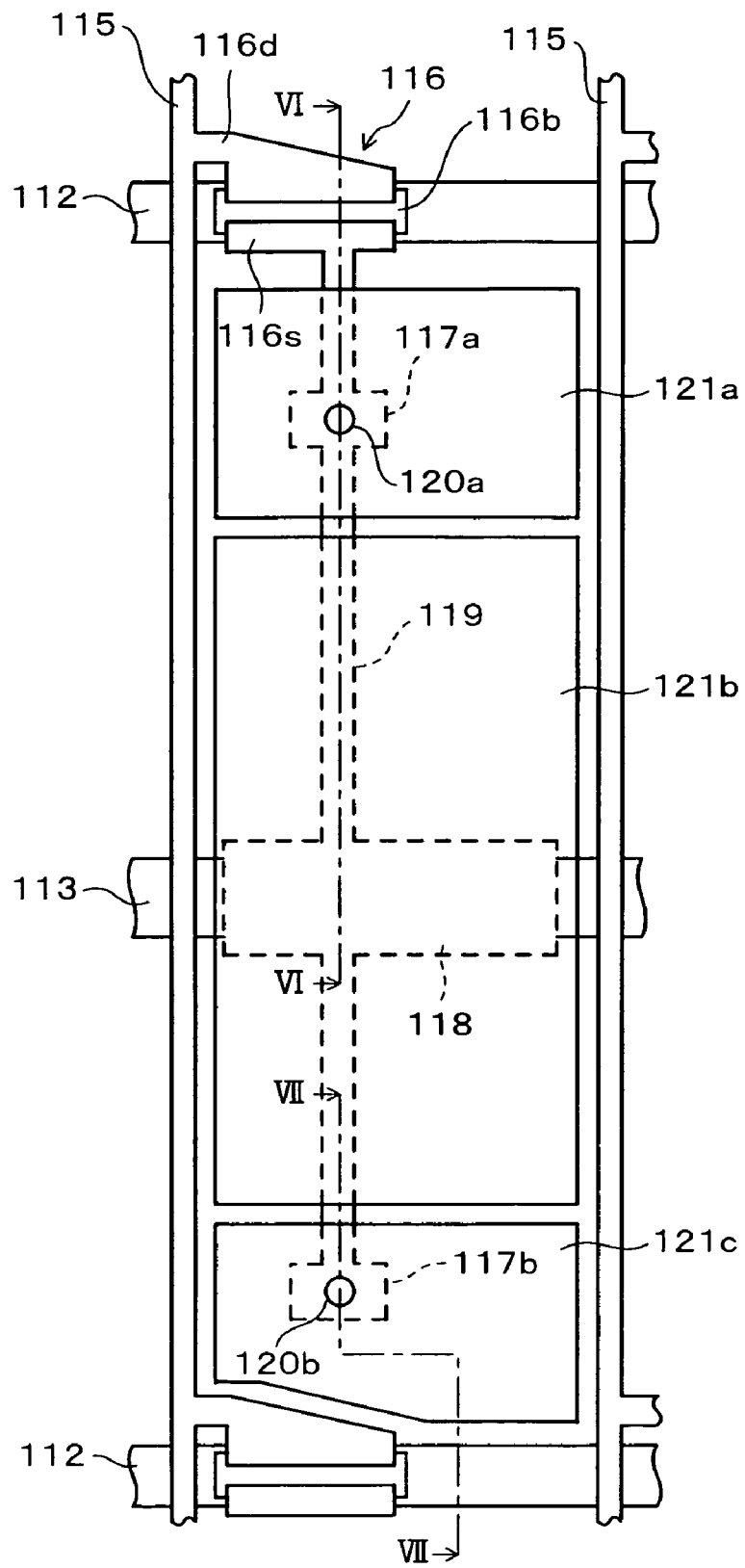
FIG. 13 is a plan view showing a liquid crystal display device according to a first embodiment of the present invention.
Figure 14A:
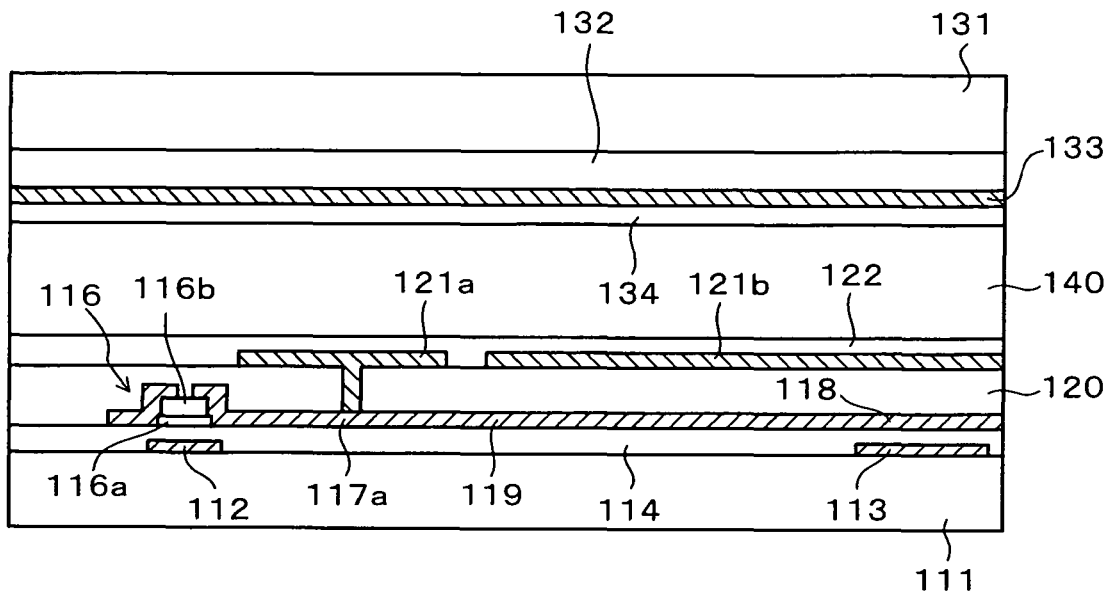
FIG. 14A is a cross-sectional view taken along the VI-VI line in FIG. 13.
Figure 14B:
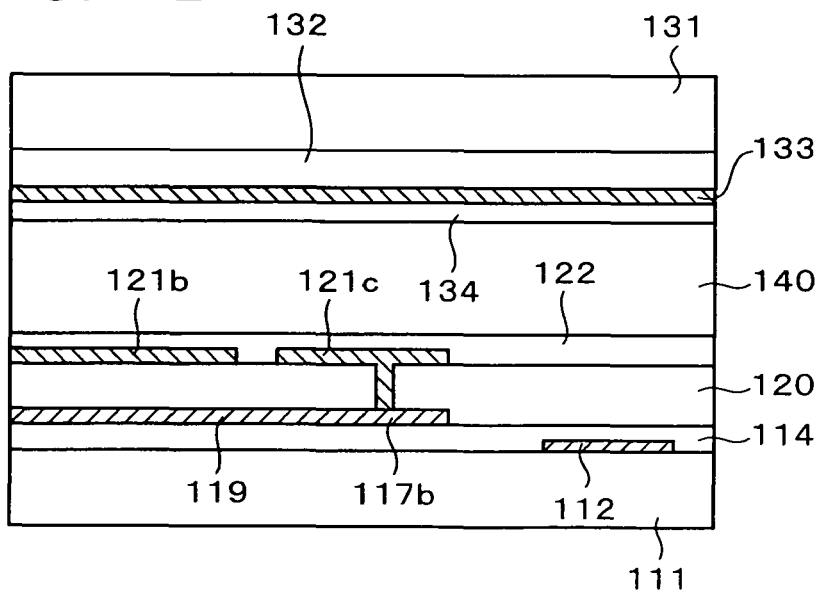
FIG. 14B is a cross-sectional view taken along the VII-VII line in FIG. 13.

FIG. 13 is a plan view showing a liquid crystal display device according to a first embodiment of the present invention. Meanwhile, FIG. 14A is a cross-sectional view taken along the VI-VI line in FIG. 13, and FIG. 14B is a cross-sectional view taken along the VII-VII line in FIG. 13.

On a glass substrate 111 constituting a base of a TFT substrate, there are formed a plurality of gate bus lines 112 extending in a horizontal direction (an X direction) and a plurality of data bus lines 115 extending in a vertical direction (a Y direction). Each rectangular region defined by the gate bus lines 112 and the data bus lines 115 constitutes a picture element region. Meanwhile, on the glass substrate 111, there are formed auxiliary capacitance bus lines 113 disposed parallel to the gate bus lines 112 and intersecting the center of the respective picture element regions.

A first insulating film 114, which is made of an insulative material such as SiN or $SiO_2$, is formed in a space between each of the gate bus lines 112 and each of the data bus lines 115 and in a space between each of the auxiliary capacitance bus lines 113 and each of the data bus lines 115. By using this first insulating film 114, the gate bus lines 112 and the data bus lines 115, and, the auxiliary capacitance bus lines 113 and the data bus lines 115 are electrically insulated, respectively.

A TFT 116, connection electrodes 117a and 117b, a control electrode 118, and sub picture element electrodes 121a to 121c made of a transparent material such as ITO are formed in each picture element region. The control electrode 118 constitutes an auxiliary capacitance electrode together with the auxiliary capacitance bus line 113 and the first insulating film 114. As shown in FIG. 13, the TFT 116 applies part of the gate bus line 112 as a gate electrode. Moreover, as shown in FIG. 14A, a semiconductor film 116a constituting an active layer for the TFT 116 is formed above the gate bus line 112, and a channel protection film 116b is formed on this semiconductor film 116a.

A drain electrode 116d of the TFT 116 is connected to the data bus line 115, and a source electrode 116s thereof is disposed in a position opposed to the drain electrode 116d while sandwiching the gate bus line 112. Moreover, the control electrode 118 is formed in a position opposed to the auxiliary capacitance bus line 113 while sandwiching the first insulating film 114. The connection electrode 117a is disposed below the sub picture element electrode 121a, and the connection electrode 117b is disposed below the sub picture element electrode 121c. The connection electrodes 117a and 117b, as well as the control electrode 118 are connected to the source electrode 116s through a line 119.

The data bus lines 115, the TFT 116, the connection electrodes 117a and 117b, the control electrode 118, and the line 119 are covered with a second insulating film 120, which is made of SiN, insulative resin or the like. Moreover, the sub picture element electrodes 121a to 121c are formed on this second insulating film 120. As shown in FIG. 13, the sub picture element electrode (the floating sub picture element electrode) 121b is disposed in the center of the picture element region and is capacitively coupled to the control electrode 118. Meanwhile, the sub picture element electrode 121a is disposed between the sub picture element electrode 121b and the gate bus line 112 thereabove, and the sub picture element electrode 121c is disposed between the sub picture element electrode 121b and the gate bus line 112 therebelow. These sub picture element electrodes 121a and 121c are electrically connected to the source electrode 116s of the TFT 116 through contact holes 120a and 120b, the connection electrodes 117a and 117b, and the line 119. Moreover, surfaces of the sub picture element electrodes 121a to 121c are covered with an alignment film 122, which is made of polyimide, for example.

Here, the gate bus lines 112 and the auxiliary capacitance bus lines 113 are formed simultaneously by patterning a Cr film or an Al—Ti lamination film in accordance with the photolithography method, for example. In the meantime, the data bus lines 115, the source electrode 116s, the drain electrode 116d, and the control electrode 118 are formed simultaneously by patterning a Ti—Al—Ti lamination film in accordance with the photolithography method, for example.

Meanwhile, as shown in FIG. 14A and FIG. 14B, a counter substrate includes a color filter 132 formed on one of surfaces (which is on the lower side in FIG. 14A and FIG. 14B) of a glass substrate 131 constituting a base, a common electrode 133 formed on a surface of the color filter 132, and an alignment film 134 covering a surface of the common electrode 133. The common electrode 133 is made of a transparent conductive material such as ITO, and the alignment film 134 is made of polyimide, for example.

The TFT substrate and the counter electrode are disposed opposite to each other while placing the surfaces provided with the alignment films inward, and are joined together while sandwiching spacers. Then, liquid crystal 140 is sealed between the TFT substrate and the counter substrate.

In the liquid crystal display device of the first embodiment having the above-described configuration, the sub picture element electrodes 121a and 121c are electrically connected to the TFT 116, and are therefore connected to the data bus line 115 when the TFT 116 is turned on. For this reason, even if electric charges are accumulated in the sub picture element electrodes 121a and 121b due to the direct-current voltage component of the signal flowing on the gate bus line 112 in a period when the TFT 116 is turned off, the electric charges flow toward the data bus line 115 in a period when the TFT 116 is turned on and accumulation of the electric charges is thereby avoided. Accordingly, no image sticking occurs in these sub picture element electrodes 121a and 121b.

Meanwhile, the sub picture element electrode (the floating sub picture element electrode) 121b capacitively coupled to the control electrode 118 is remote from the gate bus line 112, and the sub picture element electrodes 121a and 121c are interposed between the sub picture element electrode 121b and the gate bus line 112. Accordingly, accumulation of the electric charges to the floating sub picture element electrode 121b attributable to the direct-current voltage component of the signal flowing on the gate bus line 112 is extremely small. In this way, it is possible to avoid occurrence of image sticking and to obtain favorable display quality.

First Modified Example

Figure 15:
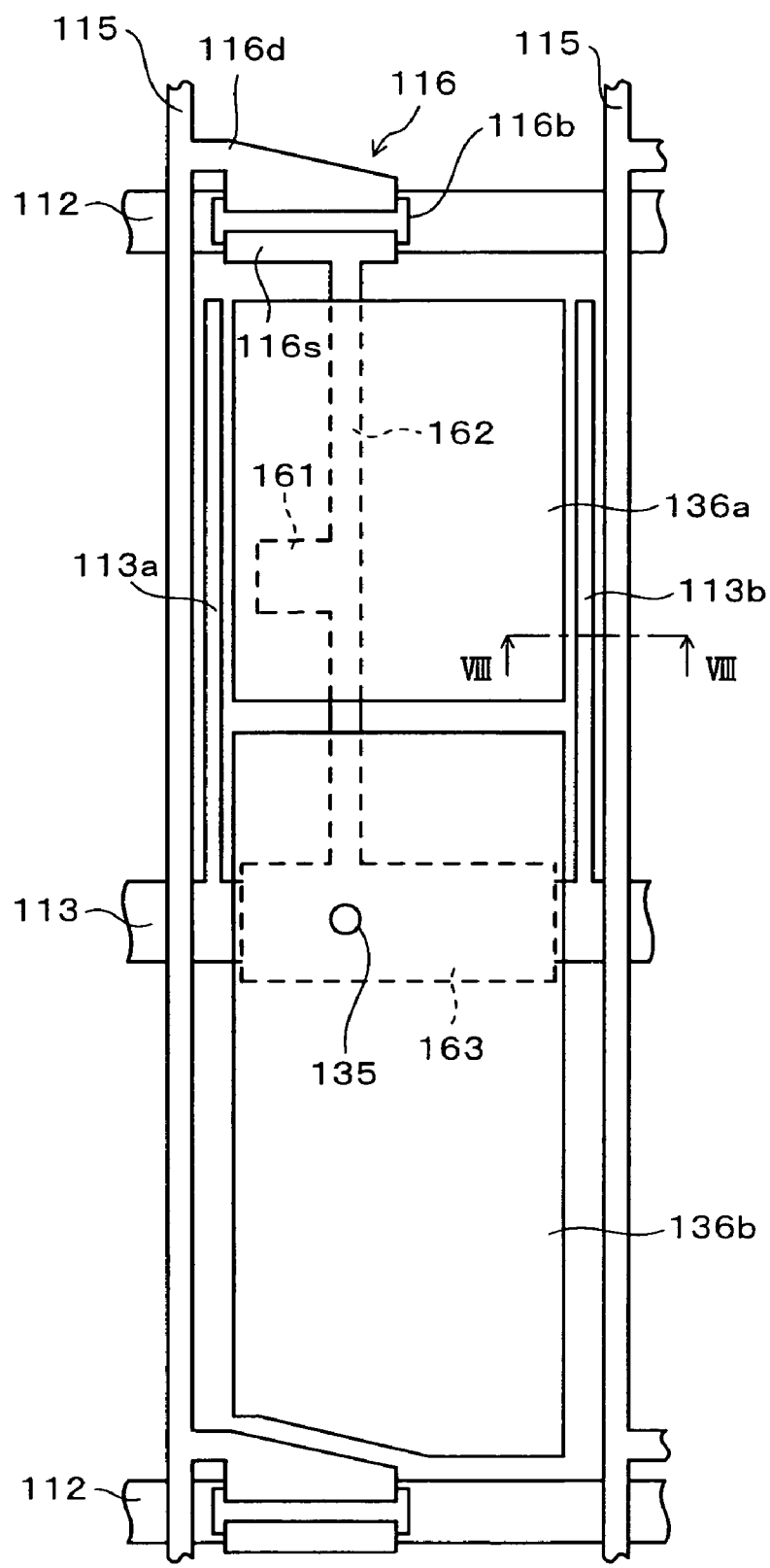
FIG. 15 is a plan view showing a liquid crystal display device according to a first modified example of the first embodiment.
Figure 16:
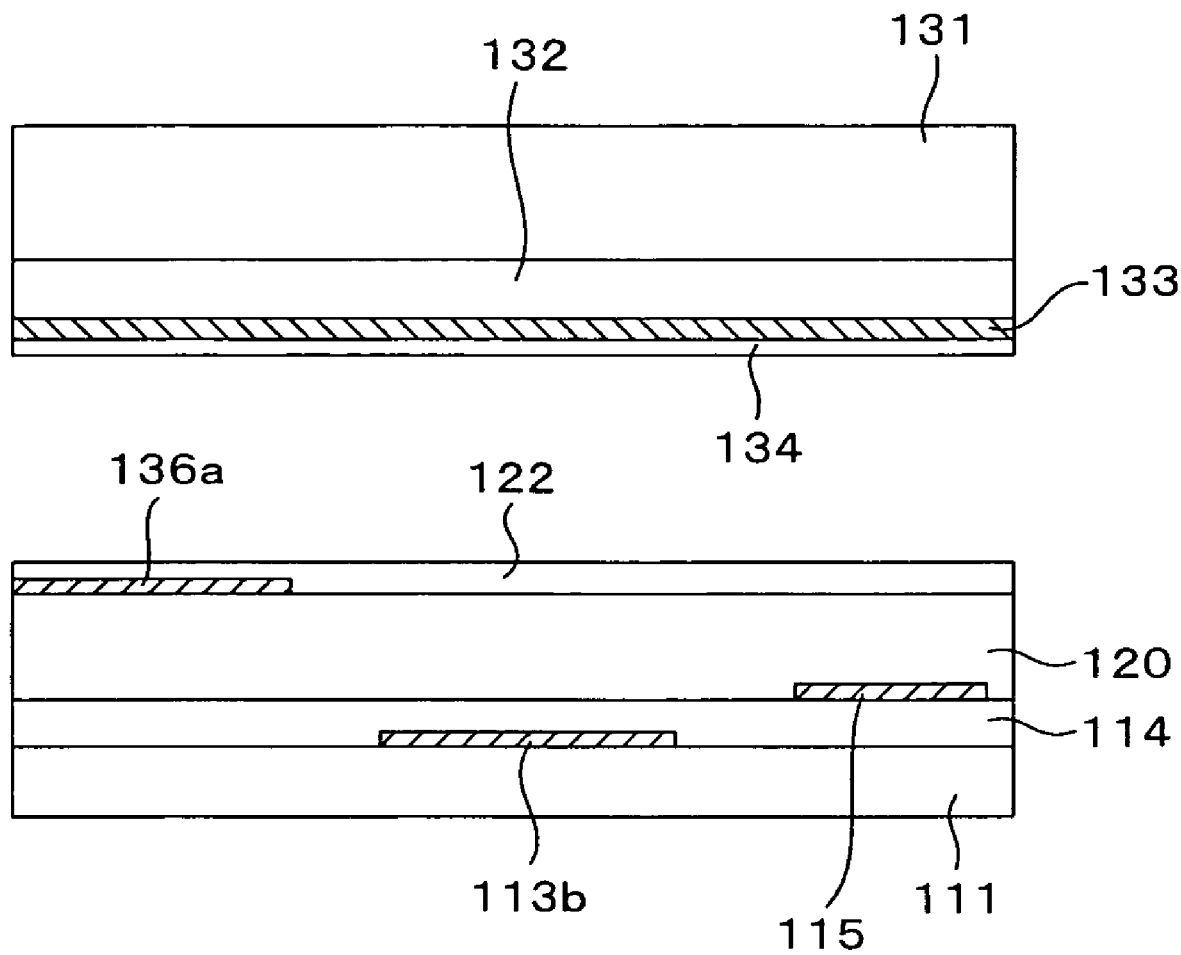
FIG. 16 is a cross-sectional view taken along the VIII-VIII line in FIG. 15.

FIG. 15 is a plan view showing a liquid crystal display device according to a first modified example of the first embodiment, and FIG. 16 is a cross-sectional view taken along the VIII-VIII line in FIG. 15. In terms of FIG. 15 and FIG. 16, the same constituents as those illustrated in FIG. 13, FIG. 14A, and FIG. 14B are designated by the same reference numerals, and detailed description thereof will be omitted.

In the liquid crystal display device of the first modified example shown in FIG. 15 and FIG. 16, two sub picture element electrodes 136a and 136b are provided in one picture element. Moreover, a control electrode 161 is provided below the sub picture element electrode 136a while sandwiching the second insulating film 120 and the sub picture element electrode 136a is capacitively coupled to the control electrode 161.

An auxiliary capacitance electrode 163 is provided above the auxiliary capacitance bus line 113 and this auxiliary capacitance electrode 163 is electrically connected to the sub picture element electrode 136b through a contact hole 135. Meanwhile, the auxiliary capacitance electrode 163 and the control electrode 161 are electrically connected to the source electrode 116s of the TFT 116 through a line 162.

In addition, shield patterns 113a and 113b extending from the auxiliary capacitance bus line 113 are disposed between the sub picture element electrode 136a and the data bus lines 115. The auxiliary capacitance bus line 113 is maintained either at the same electric potential as the electric potential of the common electrode 133 or at constant electric potential relative to the electric potential of the common electrode 133.

In the liquid crystal display device of this first modified example, the shield patterns 113a and 113b maintained at the same electric potential as the electric potential of the auxiliary capacitance bus line 113 are disposed between the floating sub picture element electrode 136a and the data bus lines 115. Accordingly, accumulation of the electric charges in the floating sub picture element electrode 136a attributable to the direct-current voltage component of the signal flowing on any of the data bus lines 115 is suppressed. In this way, this liquid crystal display device exerts the effect to suppress image sticking.

Second Modified Example

Figure 17:
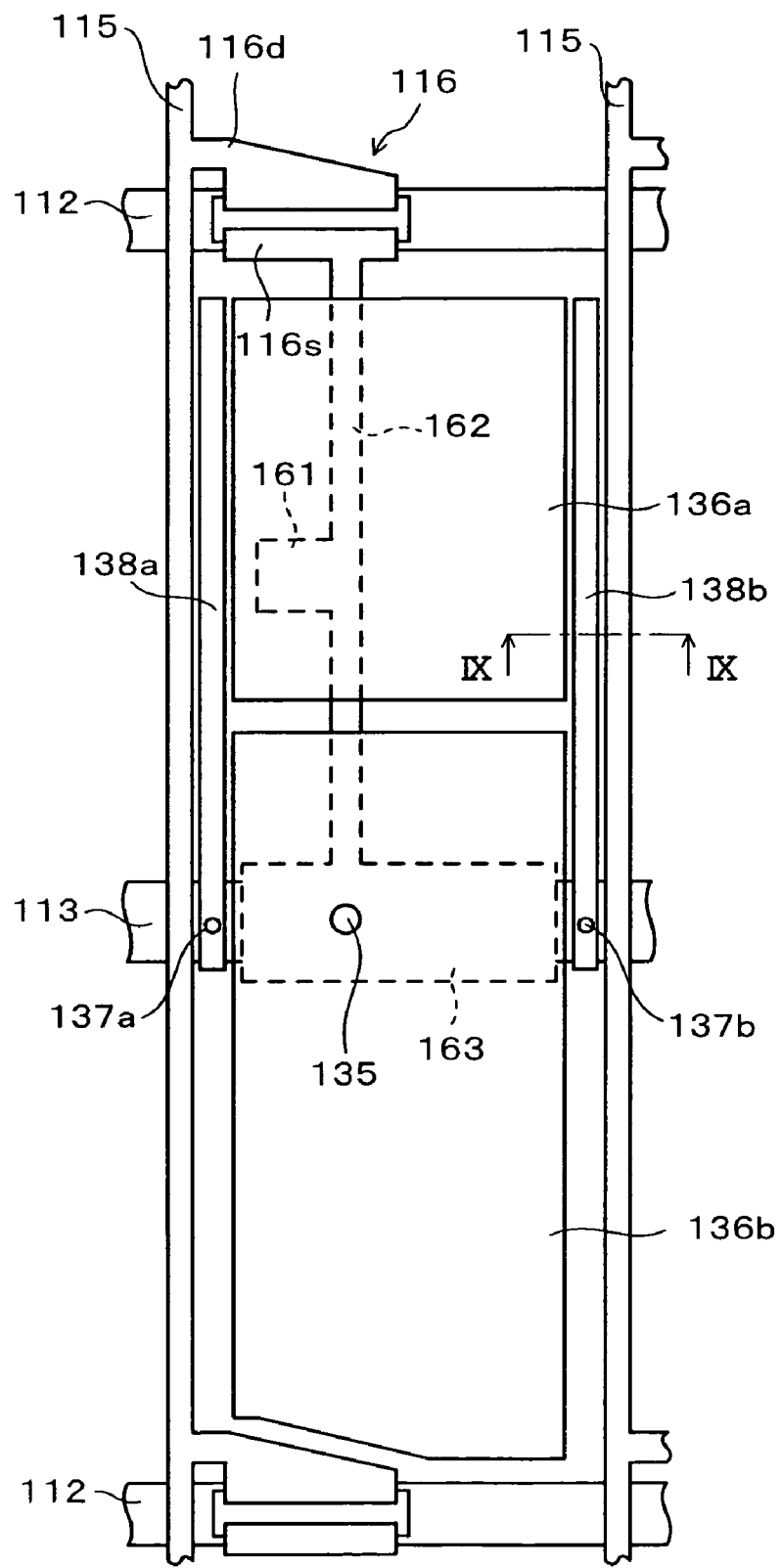
FIG. 17 is a plan view showing a liquid crystal display device according to a second modified example of the first embodiment.
Figure 18:
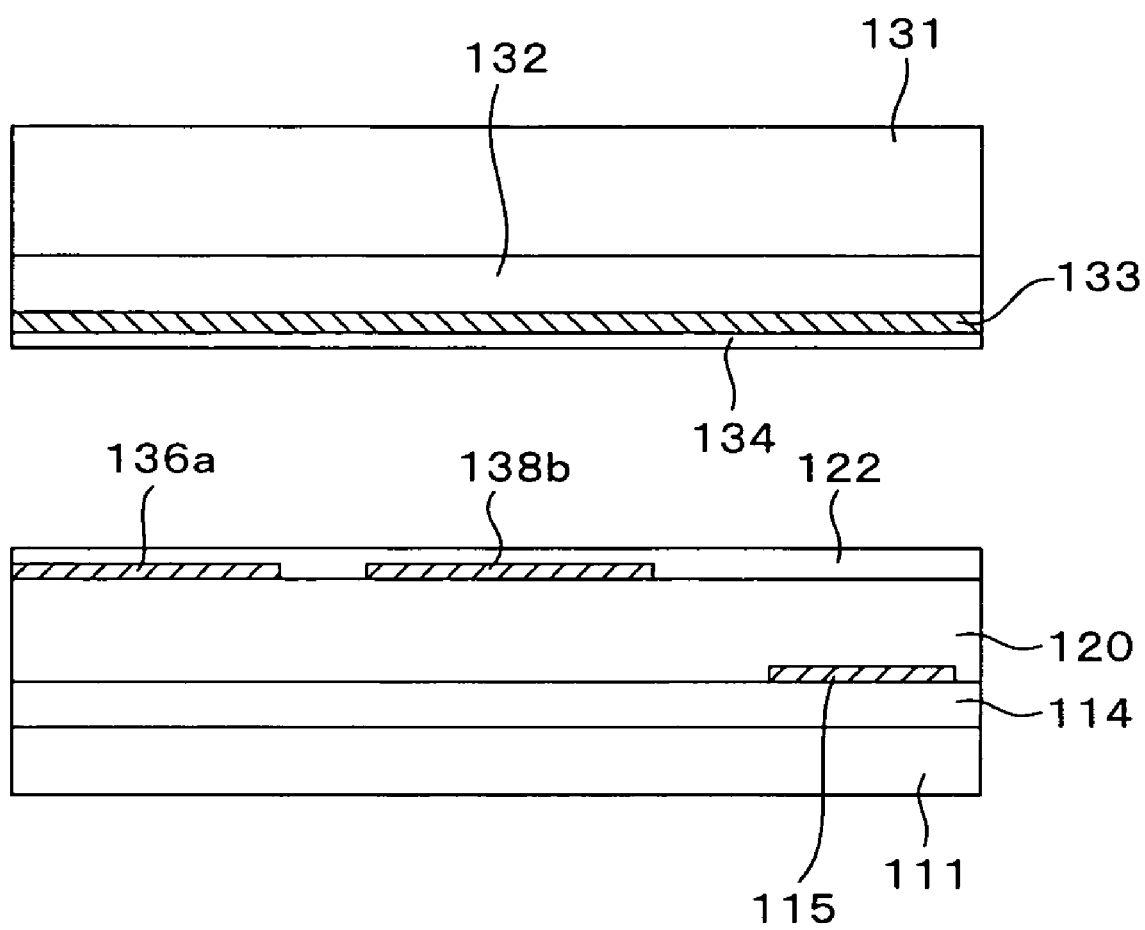
FIG. 18 is a cross-sectional view taken along the IX-IX line in FIG. 17.

FIG. 17 is a plan view showing a liquid crystal display device according to a second modified example of the first embodiment, and FIG. 18 is a cross-sectional view taken along the IX-IX line in FIG. 17. In terms of FIG. 17 and FIG. 18, the same constituents as those illustrated in FIG. 15 and FIG. 16 are designated by the same reference numerals, and detailed description thereof will be omitted.

In the liquid crystal display device of the second modified example shown in FIG. 17 and FIG. 18, shield patterns 138a and 138b which are formed on the same layer as the sub picture element electrode 136a are disposed between the floating sub picture element electrode 136a and the data bus lines 115. These shield patterns 138a and 138b are electrically connected to the auxiliary capacitance bus line 113 through contact holes 137a and 137b, which are formed on the first and second insulating films 114 and 120, respectively. The auxiliary capacitance bus line 113 is maintained either at the same electric potential as the electric potential of the common electrode 133 or at constant electric potential relative to the electric potential of the common electrode 133 as similar to the liquid crystal display device of the first modified example.

In the liquid crystal display device of the first modified example shown in FIG. 15 and FIG. 16, the shield patterns 113a and 113b are formed on a lower layer than the data bus lines 115 and the sub picture element electrode 136a. On the contrary, in the liquid crystal display device of the second modified example, the shield patterns 138a and 138b are formed on the same layer as the sub picture element electrode 136a. Accordingly, a resistance component of the first insulating film 114 disappears in the liquid crystal display device of the second modified example. For this reason, the liquid crystal display device of the second modified example has a larger effect to shield the sub picture element electrode 136a from the data bus lines 115 as compared to the liquid crystal display device of the first modified example. In this way, the liquid crystal display device of the second modified example can avoid image sticking more reliably than the liquid crystal device of the first modified example.

Third Modified Example

Figure 19:
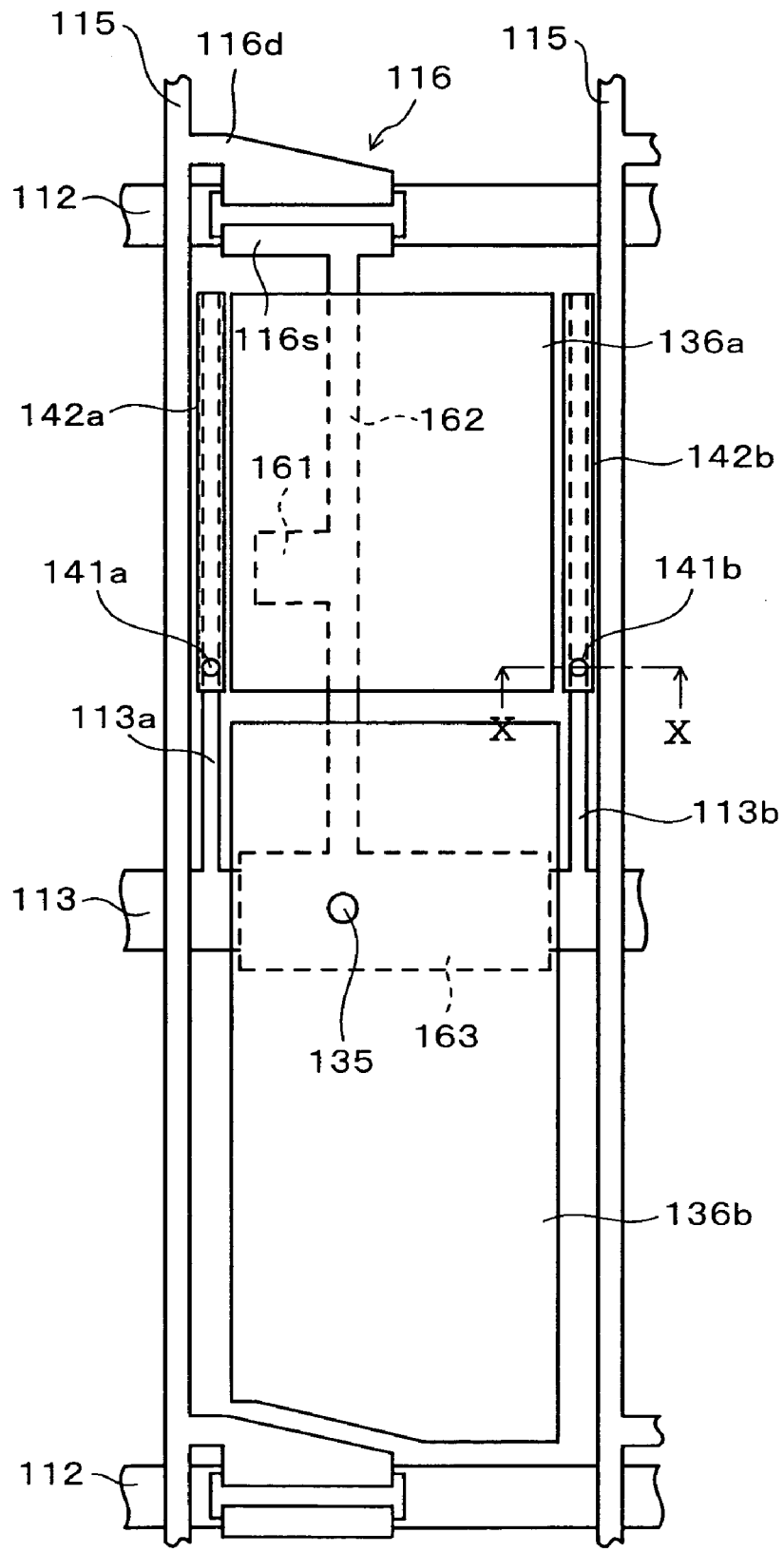
FIG. 19 is a plan view showing a liquid crystal display device according to a third modified example of the first embodiment.
Figure 20:
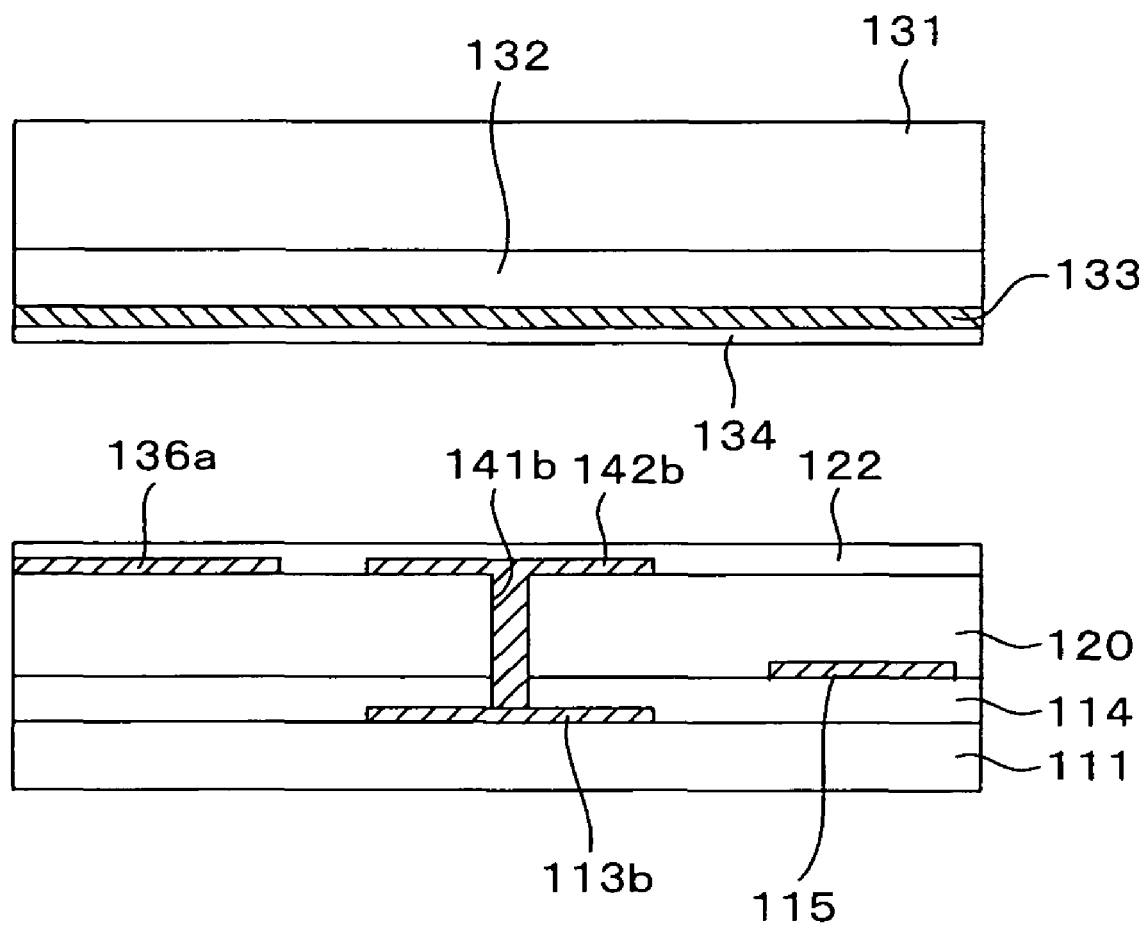
FIG. 20 is a cross-sectional view taken along the X-X line in FIG. 19.

FIG. 19 is a plan view showing a liquid crystal display device according to a third modified example of the first embodiment, and FIG. 20 is a cross-sectional view taken along the X-X line in FIG. 19. In terms of FIG. 19 and FIG. 20, the same constituents as those illustrated in FIG. 15 and FIG. 16 are designated by the same reference numerals, and detailed description thereof will be omitted.

In the liquid crystal display device of the third modified example shown in FIG. 19 and FIG. 20, the shield patterns 113a and 113b extending from the auxiliary capacitance bus line 113, and shield patterns 142a and 142b formed on the same layer as the sub picture element electrode 136a are disposed between the floating sub picture element electrode 136a and the data bus lines 115. The shield patterns 142a and 142b are electrically connected to the shield patterns 113a and 113b through contact holes 141a and 141b, which are formed on the first and second insulating films 114 and 120, respectively.

In the liquid crystal display device of the third modified example as well, the shield patterns 113a, 113b, 142a, and 142b are formed between the floating sub picture element electrode 136a and the data bus lines 115. Accordingly, it is possible to suppress accumulation of the electric charges in the floating sub picture element electrode 136a attributable to the direct-current voltage component flowing on any of the data bus lines 115 and thereby to avoid image sticking.

Fourth Modified Example

Figure 21:
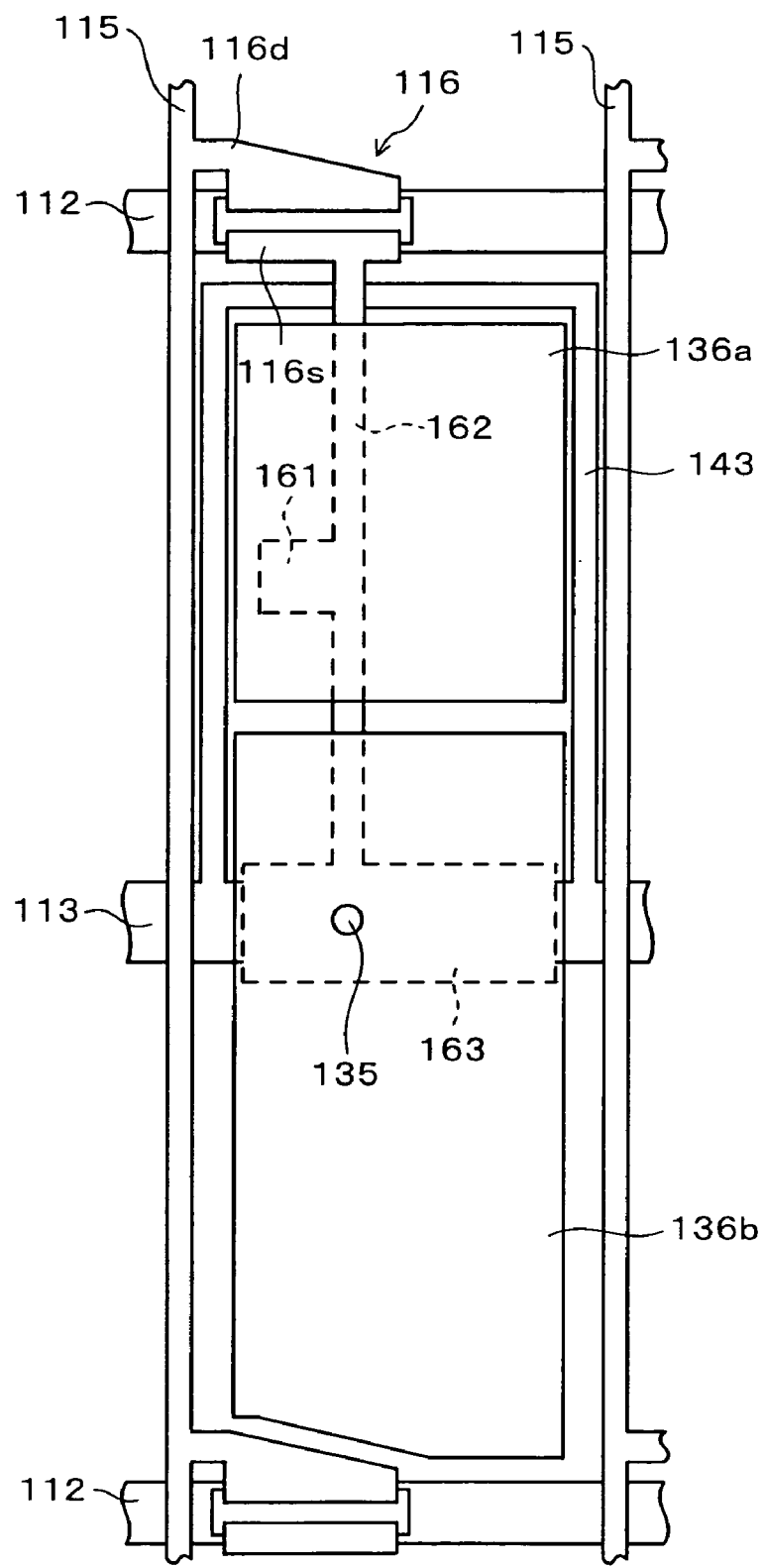
FIG. 21 is a plan view showing a liquid crystal display device according to a fourth modified example of the first embodiment.

FIG. 21 is a plan view showing a liquid crystal display device according to a fourth modified example of the first embodiment. In terms of FIG. 21, the same constituents as those illustrated in FIG. 15 are designated by the same reference numerals, and detailed description thereof will be omitted.

In the liquid crystal display device of the fourth modified example shown in FIG. 21, a shield pattern 143, which is formed on the same layer as the auxiliary capacitance bus line 113 and is connected to the auxiliary capacitance bus line 113, surrounds the floating sub picture element electrode 136a.

In the liquid crystal display device of the fourth modified example, it is possible to shield not only the direct-current voltage component included in the signal flowing on any of the data bus lines 115, but also the direct-current voltage component included in the signal flowing on any of the gate bus lines 112. In this way, this liquid crystal display device exerts the effect to avoid image sticking more reliably than the liquid crystal display device of the first modified example.

Fifth Modified Example

Figure 22:
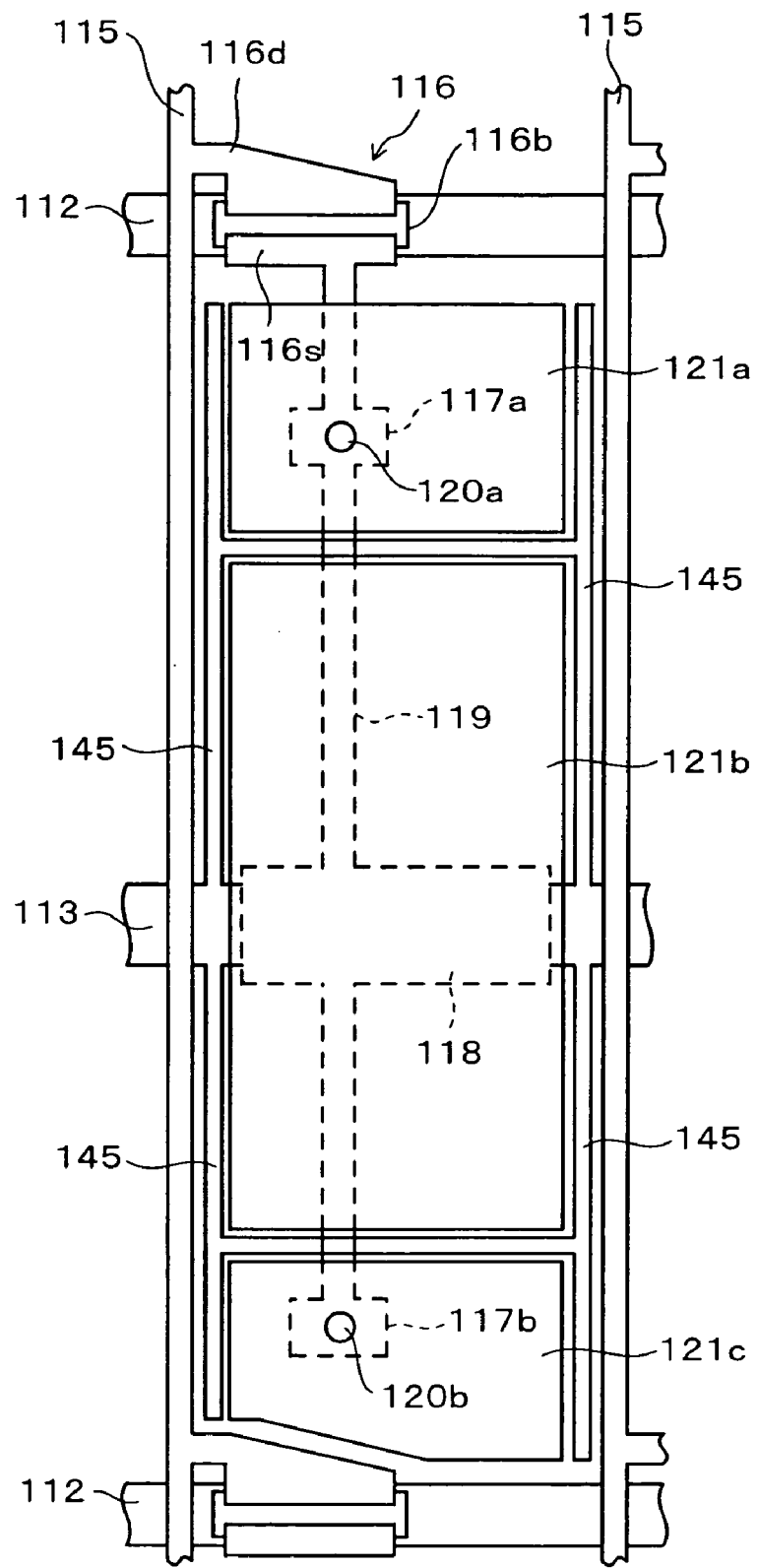
FIG. 22 is a plan view showing a liquid crystal display device according to a fifth modified example of the first embodiment.

FIG. 22 is a plan view showing a liquid crystal display device according to a fifth modified example of the first embodiment. In terms of FIG. 22, the same constituents as those illustrated in FIG. 13 are designated by the same reference numerals, and detailed description thereof will be omitted.

In the liquid crystal display device shown in FIG. 22, the sub picture element electrodes 121a and 121c are disposed between the floating sub picture element electrode 121b and the gate bus lines 112, which are indicated on an upper side and a lower side in FIG. 22. These sub picture element electrodes 121a and 121c are electrically connected to the TFT 116 through the contact holes 120a and 120b, and through the line 119. Meanwhile, shield patterns 145 respectively extending from the auxiliary capacitance bus line 113 are disposed between the floating sub picture element electrode 121b and the data bus lines 115 on the right side and the left side in FIG. 22.

In the liquid crystal display device of the fifth modified example, the floating sub picture element electrode 121b is shielded from the gate bus lines 112 and the data bus lines 115 by the sub picture element electrodes 121a and 121c as well as the shield patterns 145. Accordingly, this liquid crystal display device exerts the effect to suppress accumulation of the electric charges attributable to the direct-current voltage component of the signal flowing on any of the gate bus lines 112 and the data bus lines 115, and thereby to avoid image sticking effectively.

Moreover, in the liquid crystal display device of the fifth modified example, the shield patterns 145 are also disposed between the sub picture element electrodes 121a and 121c, which are electrically connected to the TFT 116, and, the data bus lines 115. Accordingly, the liquid crystal display device also has the effect to suppress accumulation of the electric charges in the sub picture element electrodes 121a and 121c attributable to the direct-current voltage component included in the signal flowing on any of the data bus lines 115.

Sixth Modified Example

Figure 23:
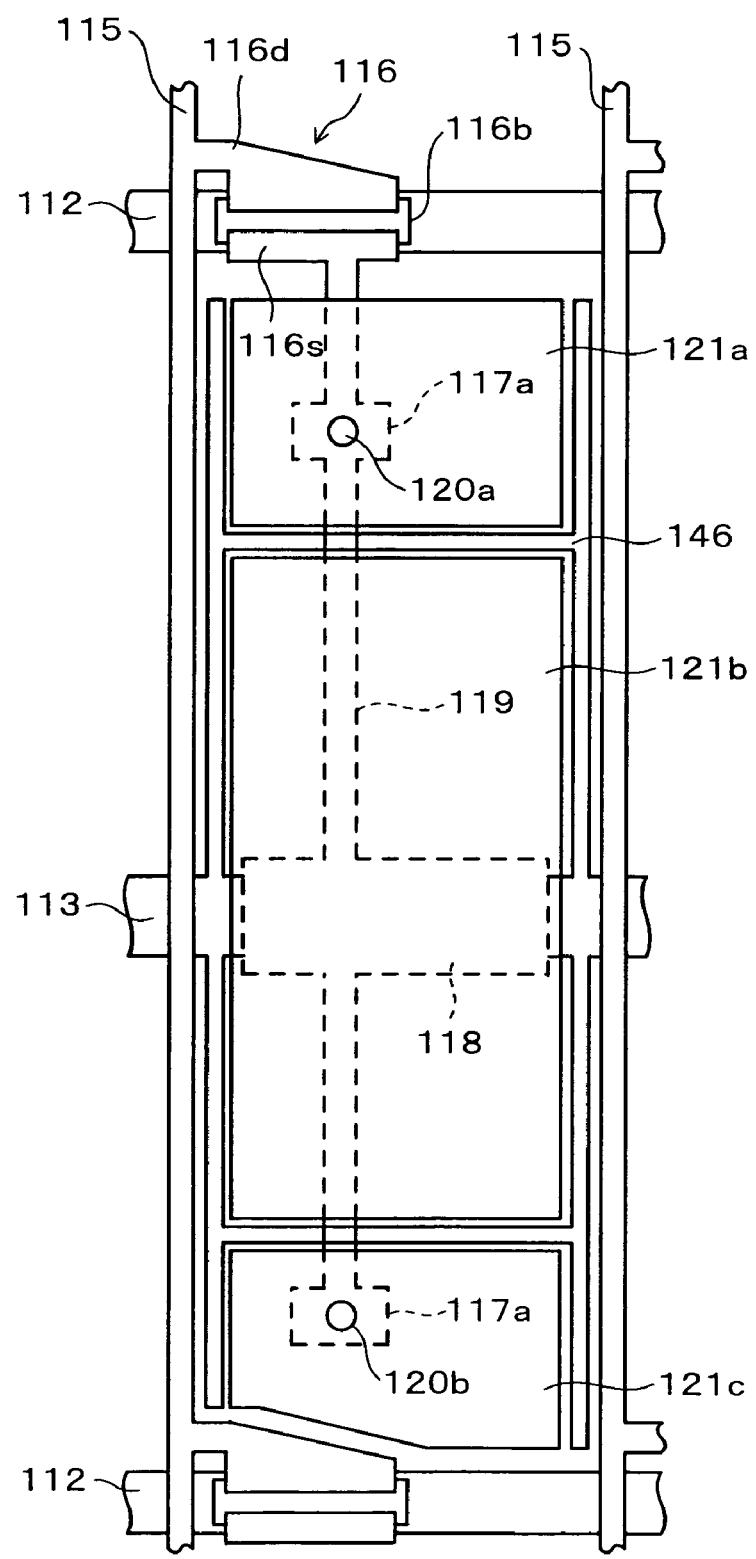
FIG. 23 is a plan view showing a liquid crystal display device according to a sixth modified example of the first embodiment.

FIG. 23 is a plan view showing a liquid crystal display device according to a sixth modified example of the first embodiment. In terms of FIG. 23, the same constituents as those illustrated in FIG. 22 are designated by the same reference numerals, and detailed description thereof will be omitted.

In the liquid crystal display device of the sixth modified example shown in FIG. 23, the shield pattern 146, which is formed on the same layer as the auxiliary capacitance bus line 113 and connected to the auxiliary capacitance bus line 113, is also disposed between the floating sub picture element electrode 121b and the sub picture element electrodes 121a and 121c directly connected to the TFT 116. In the liquid crystal display device of the sixth modified example as well, it is possible to suppress accumulation of the electric charges attributable to the direct-current voltage component of the signal flowing on any of the gate bus lines 112 and the data bus lines 115, and thereby to avoid image sticking effectively.

Seventh Modified Example

Figure 24:
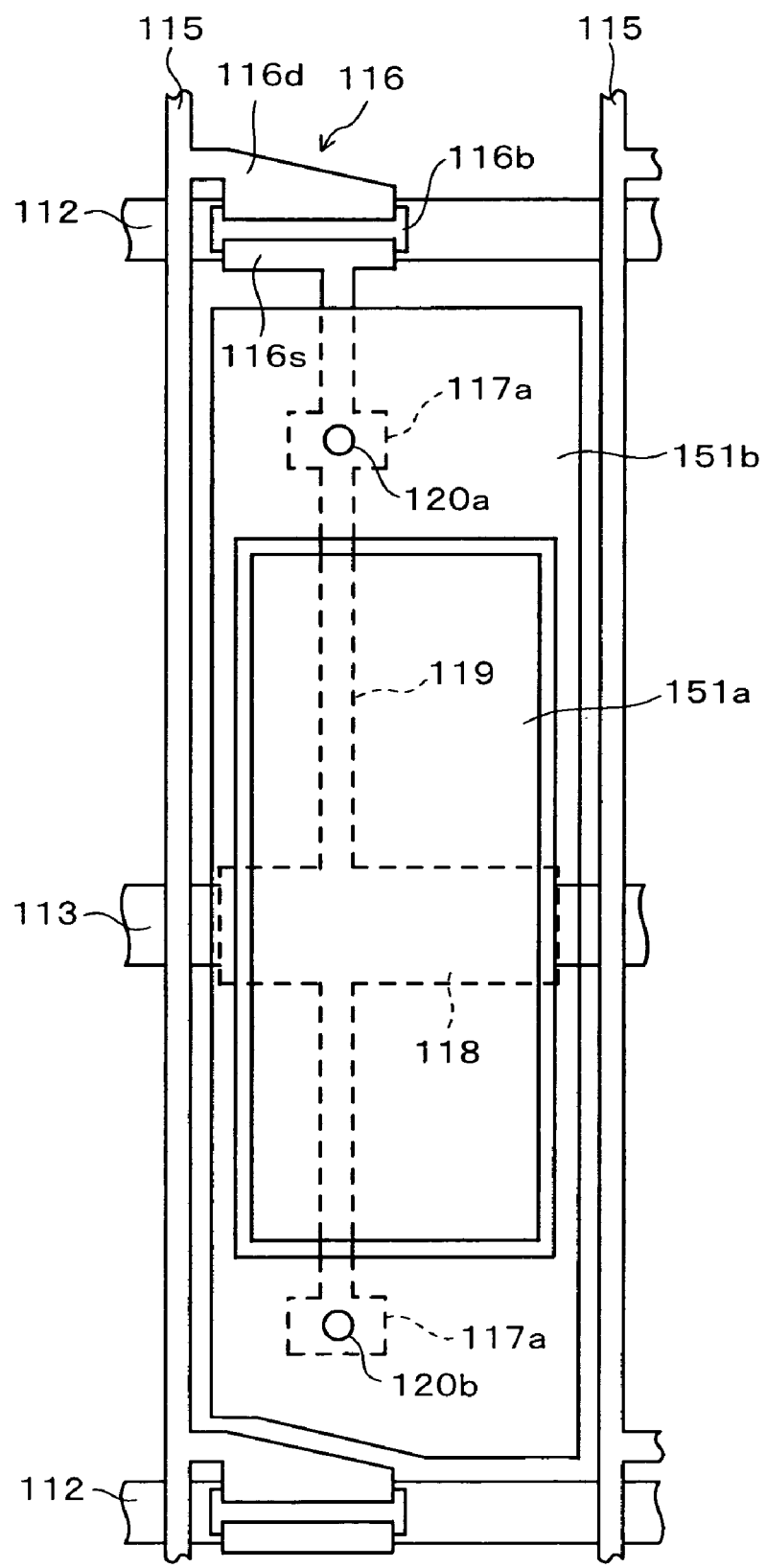
FIG. 24 is a plan view showing a liquid crystal display device according to a seventh modified example of the first embodiment.

FIG. 24 is a plan view showing a liquid crystal display device according to a seventh modified example of the first embodiment. In terms of FIG. 24, the same constituents as those illustrated in FIG. 13 are designated by the same reference numerals, and detailed description thereof will be omitted.

In the liquid crystal display device of the seventh modified example shown in FIG. 24, a sub picture element electrode 151b surrounds a floating sub picture element electrode 151a. This sub picture element electrode 151b is electrically connected to the source electrode 116s of the TFT 116 through the contact holes 120a and 120b as well as the line 119.

In the liquid crystal display device of the seventh modified example as well, the floating sub picture element electrode 151a is shielded from the gate bus lines 112 and from the data bus lines 115. Accordingly, the liquid crystal display device exerts the effect to suppress accumulation of the electric charges attributable to the direct-current voltage component of the signal flowing on any of the gate bus lines 112 and the data bus lines 115, and thereby to avoid image sticking effectively.

Second Embodiment

Now, a second embodiment of the present invention will be described.

Figure 25:
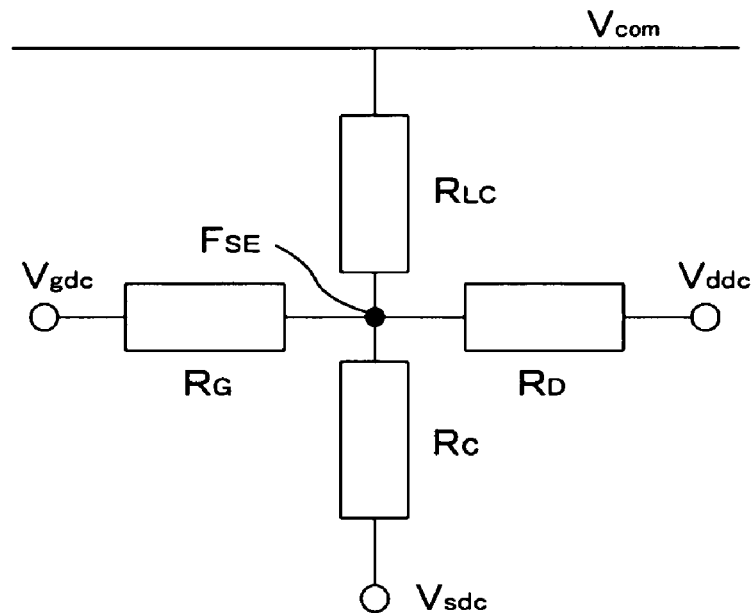
FIG. 25 is a view showing the principle of a second embodiment of the present invention.

FIG. 25 is a view showing the principle of the second embodiment of the present invention. FIG. 25 shows an equivalent circuit involving a floating sub picture element electrode $F_{SE}$, a common electrode, a control electrode, a gate bus line, and a data bus line.

As shown in FIG. 25, it is possible to say that a resistance $R_G$ exists between the floating sub picture element electrode $F_{SE}$ and the gate bus line, that a resistance $R_D$ exists between the floating sub picture element electrode $F_{SE}$ and the data bus line, that a resistance $R_C$ exists between the floating sub picture element electrode $F_{SE}$ and the control electrode, and that a resistance (a liquid crystal resistance) $R_{LC}$ exists between the floating sub picture element electrode $F_{SE}$ and the common electrode. Here, electric potential of the control electrode will be defined as $V_{sdc}$, electric potential of the common electrode will be defined as $V_{com}$, a direct-current voltage component (central electric potential) of a signal flowing on the gate bus line will be defined as $V_{gdc}$, and a direct-current voltage component (central electric potential) of a signal flowing on the data bus line will be defined as $V_{ddc}$.

As described previously, a direct-current voltage, which is lower by about −12 V than the electric potential of the common electrode, is applied to the gate bus line to turn a TFT off. Meanwhile, a direct-current voltage, which is higher by about +2 V than the electric potential of the common electrode, is superposed with a display signal on the data bus line in order to compensate a feed through voltage. The direct-current voltage component applied to the signal flowing on the gate bus line has a reverse polarity as compared to the direct-current voltage component applied to the signal flowing on the data bus line. Accordingly, by setting the values of $V_{ddc}$, $V_{gdc}$, $R_G$, and $R_D$ so as to satisfy the following formula (4), it is possible to prevent accumulation of the electric charges in the floating sub picture element electrode attributable to the direct-current voltage components of the gate bus line and the data bus line, and eventually to prevent occurrence of image sticking.

$$V_{ddc} \times R_G - V_{gdc} \times R_D = 0 \quad (4)$$

The magnitude of an influence of the direct-current voltage component of the signal flowing on the gate bus line and the magnitude of an influence of the direct-current voltage component of the signal flowing on the data bus line are determined by the electric potential differences and the resistances. However, the electric potential differences $V_{ddc}$ and $V_{gdc}$ are also related to the performance of the TFT and the like, and have relatively small degrees of freedom of adjustment. On the contrary, the resistances $R_G$ and $R_D$ are determined by the size, the shape and the position of the floating sub picture element electrode, the thickness of the insulating film, and the like, and have relatively large degrees of freedom of adjustment. Accordingly, in this embodiment, the resistance $R_G$ between the floating sub picture element electrode and the gate bus line and the resistance $R_D$ between the floating sub picture element electrode and the data bus line are adjusted so as to cancel out the influence of the direct-current voltage component of the signal flowing on the gate bus line and the influence of the direct-current voltage component of the signal flowing on the data bus line.

Figure 26:
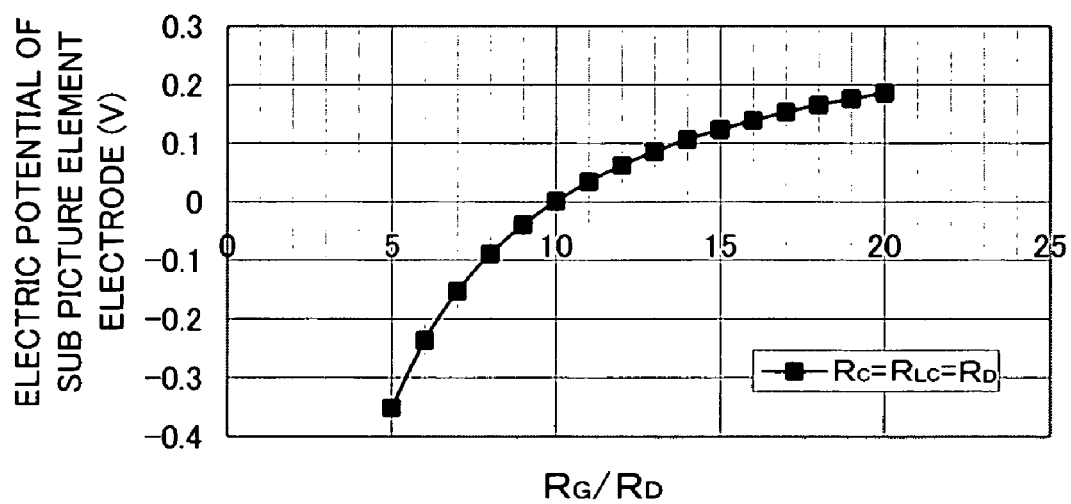
FIG. 26 is a graph showing a relation between $R_G/R_D$ and final attainment electric potential of a floating sub picture element electrode.

FIG. 26 is a graph showing a relation between $R_G/R_D$ indicated on the lateral axis and final attainment electric potential of the floating sub picture element electrode indicated on the longitudinal axis. It is to be noted, however, that the resistances $R_C$, $R_{LC}$, and $R_D$ are set equal ($R_C=R_{LC}=R_D$) in FIG. 26. Moreover, $V_{com}$ and $V_{sdc}$ are set to 0 V, $V_{gdc}$ is set to −11.28 V, and $V_{ddc}$ is set to +1.13V. In this case, as it is apparent from FIG. 26, it is possible to cancel out the influence of the direct-current voltage component of the signal flowing on the gate bus line and the influence of the direct-current voltage component of the signal flowing on the data bus line, and to prevent occurrence of image sticking when the value of resistance $R_G$ is set ten times as large as the resistance $R_D$ ($R_G/R_D=10$).

Figure 27:
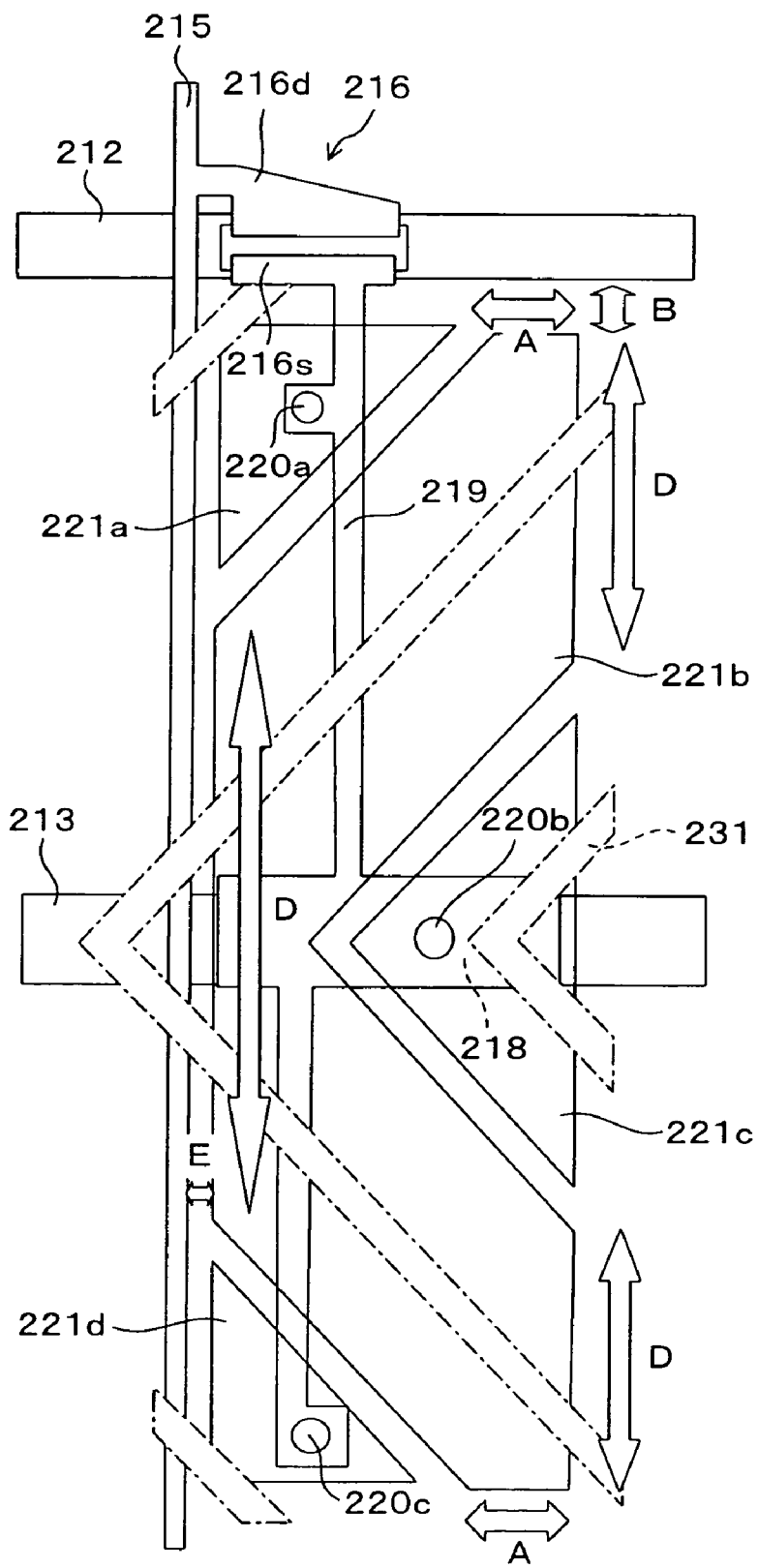
FIG. 27 is a schematic plan view showing a picture element portion of a liquid crystal display device showing a method of adjusting resistance between a floating sub picture element electrode and a gate bus line and resistance between the floating sub picture element electrode and a data bus line.

FIG. 27 is a schematic plan view of a picture element portion of a liquid crystal display device showing a method of adjusting resistance between the floating sub picture element electrode and the gate bus line and resistance between the floating sub picture element electrode and the data bus line. Meanwhile, FIG. 28 is a schematic cross-sectional view showing the picture element of FIG. 27.

Figure 28:
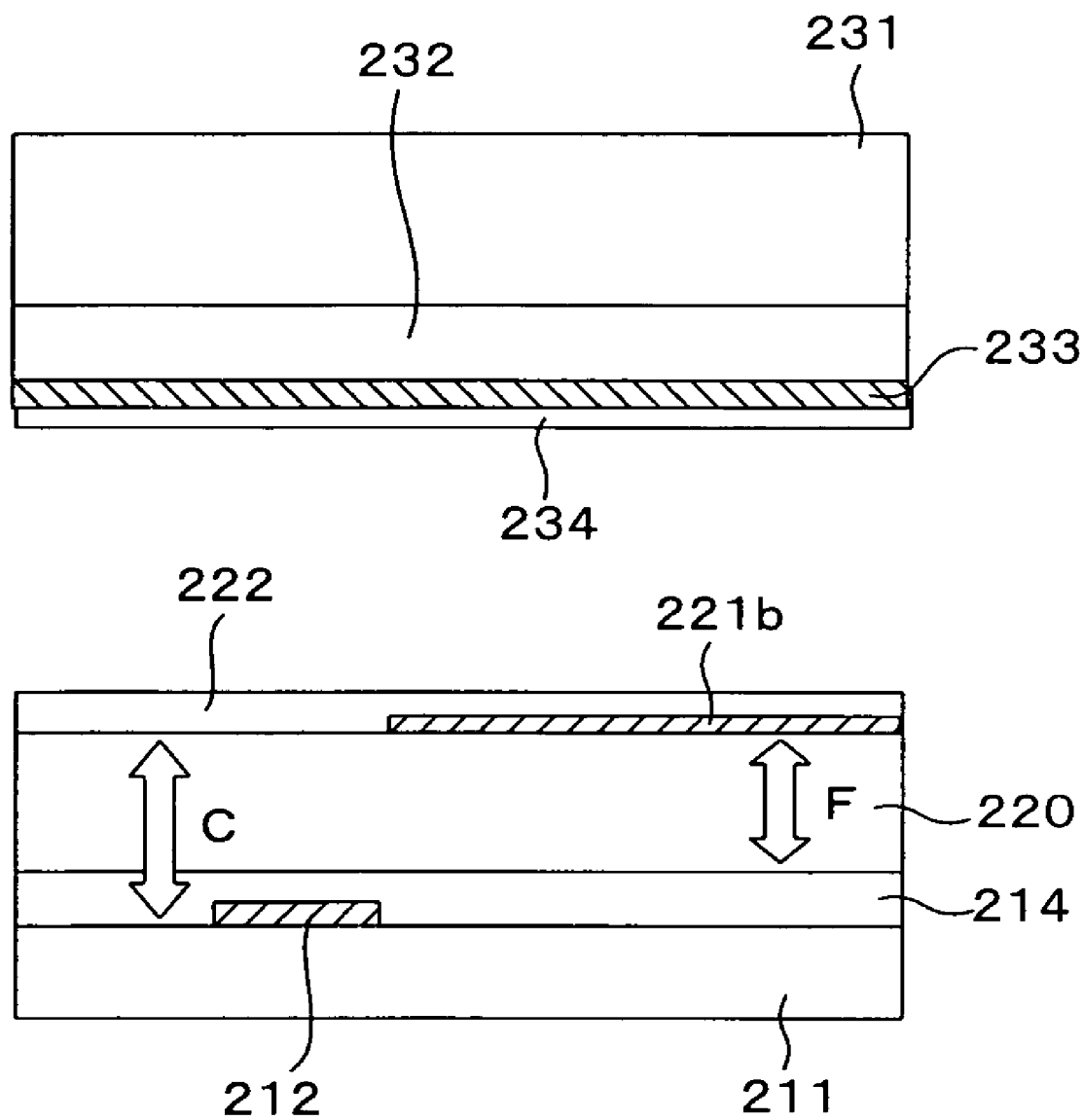
FIG. 28 is a schematic cross-sectional view showing the picture element of FIG. 27.

In the liquid crystal display device shown in FIG. 27 and FIG. 28, each picture element region defined by gate bus lines 212 and data bus lines 215 includes a TFT 216, four sub picture element electrodes 221a to 221d, and a control electrode 218.

The control electrode 218 is electrically connected to a source electrode 216s of the TFT 216 through a line 219. Meanwhile, the sub picture element electrodes 221a and 221d are electrically connected to the source electrode of the TFT 216 through contact holes 220a and 220c and the line 219. Moreover, the sub picture element electrode 221c is electrically connected to the source electrode of the TFT 216 through a contact hole 220b, the control electrode 218, and the line 219. On the other hand, the sub picture element electrode (the floating sub picture element electrode) 221b is capacitively coupled to the control electrode 218 through a second insulating film 220.

As shown in FIG. 28, the gate bus lines 212 and an auxiliary capacitance bus line 213 are formed on a glass substrate 211 and are covered with a first insulating film 214. The data bus lines 215, the source electrode 216s, a drain electrode 216d, the control electrode 218, and the line 219 are formed on the first insulating film 214. The data bus lines 215, the source electrode 216s, the drain electrode 216d, the control electrode 218, and the line 219 are covered with the second insulating film 220, and the sub picture element electrodes 221a to 221d are formed on the second insulating film 220. These sub picture element electrodes 221a to 221d are divided by slits which are formed along zigzag lines bending above the gate bus lines 212 and the auxiliary bus line 213.

In FIG. 27, chain lines 231 show positions of protrusions in the shape of mounds (domain regulating structures) which are formed on the counter substrate side.

In this liquid crystal display device, the value of resistance $R_G$ is decreased when the length of a portion where the gate bus line 212 and the floating sub picture element electrode 221b face each other (a portion indicated by an arrow A in FIG. 27) is increased, and the value of resistance $R_G$ is increased when the above-described length is decreased. Moreover, the value of resistance $R_G$ is increased when the distance between the gate bus line 212 and the floating sub picture element electrode 221b (a portion indicated by an arrow B in FIG. 27) is increased, and the value of resistance $R_G$ is decreased when the above-described distance is decreased. In addition, the value of resistance $R_G$ is increased when the total thickness of the first insulating film 214 and the second insulating film 220 (a portion indicated by an arrow C in FIG. 28) is increased, and the value of resistance $R_G$ is decreased when the above-described thickness is decreased.

Meanwhile, the value of resistance $R_D$ is decreased when the length of a portion where the data bus line 215 and the floating sub picture element electrode 221b face each other (a portion indicated by an arrow D in FIG. 27) is increased, and the value of resistance $R_D$ is increased when the above-described length is decreased. Moreover, the value of resistance $R_D$ is increased when the distance between the data bus line 215 and the floating sub picture element electrode 221b (a portion indicated by an arrow E in FIG. 27) is increased, and the value of resistance $R_D$ is decreased when the above-described distance is decreased. In addition, the value of resistance $R_D$ is increased when the thickness of the second insulating film 220 (a portion indicated by an arrow F in FIG. 28) is increased, and the value of resistance $R_D$ is decreased when the above-described thickness is decreased.

In the second embodiment, the influence of the direct-current voltage component included in the signal flowing on the gate bus line 212 and the influence of the direct-current voltage component included in the signal flowing on the data bus line 215 are cancelled by means of adjusting the above-mentioned parameters. In this way, it is possible to avoid image sticking and to obtain a favorable display characteristic.

Third Embodiment

Now, a third embodiment of the present invention will be described.

The following formula (5) is obtained by modifying the above-described formula (3):

$$\Delta V_{LC2} = \frac{((R_{LC2} \times C_{LC2}) - (R_C \times C_C))}{(R_{LC2} + R_C) \times C_{LC2}} \times \Delta V_S \qquad (5)$$
$$= \frac{(1 - (R_C/R_{LC2} \times C_C/C_{LC2}))}{(1 + R_C/R_{LC2})} \times \Delta V_S$$

In this formula (5), a ratio $C_C/C_{LC2}$ between a capacitance $C_C$, which is provided between a control electrode and a floating sub picture element electrode, and a capacitance $C_{LC2}$, which is provided between the floating sub picture element electrode and a common electrode, is a designed value to be determined in response to a voltage ratio between a voltage on a sub picture element electrode directly connected to a TFT and a voltage on the floating sub picture element electrode.

FIG. 29 is a graph showing results of calculations of dependencies (DC voltage magnifications) of image sticking voltages on the resistance $R_C$ between the control electrode and the floating sub picture element electrode and on the resistance $R_{LC2}$ between the floating sub picture element electrode and the common electrode while setting $C_C/C_{LC2}$ to a constant value ($C_C/C_{LC2}=1.00$ to $9.00$), in which the lateral axis indicates the ratio between $R_C$ and $R_{LC2}$ and the longitudinal axis indicates the magnification of a direct-current voltage. Meanwhile, FIG. 30 is a table showing the results illustrated in FIG. 29.

Figure 1A:
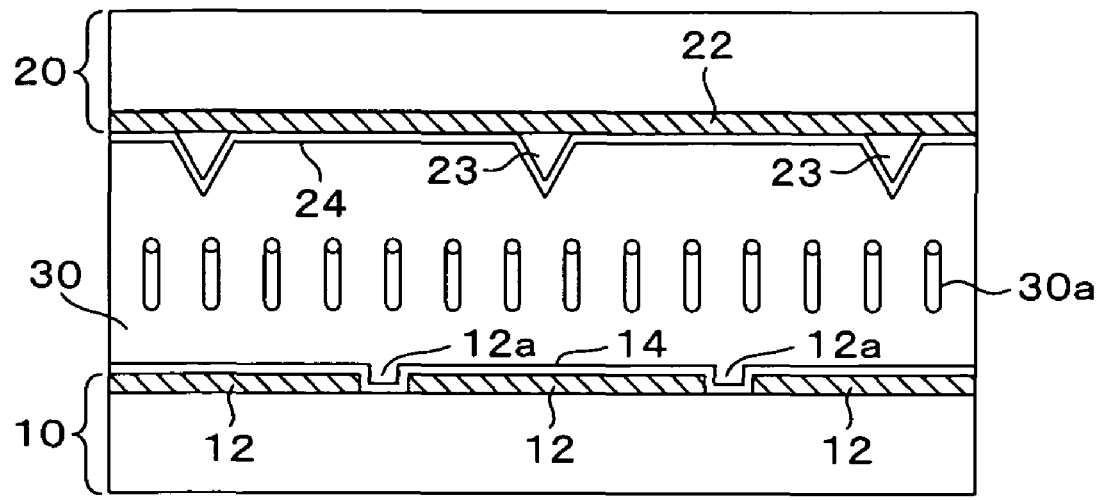
FIG. 1A and FIG. 1B are schematic cross-sectional views showing an example of a MVA liquid crystal display device.
Figure 1B:
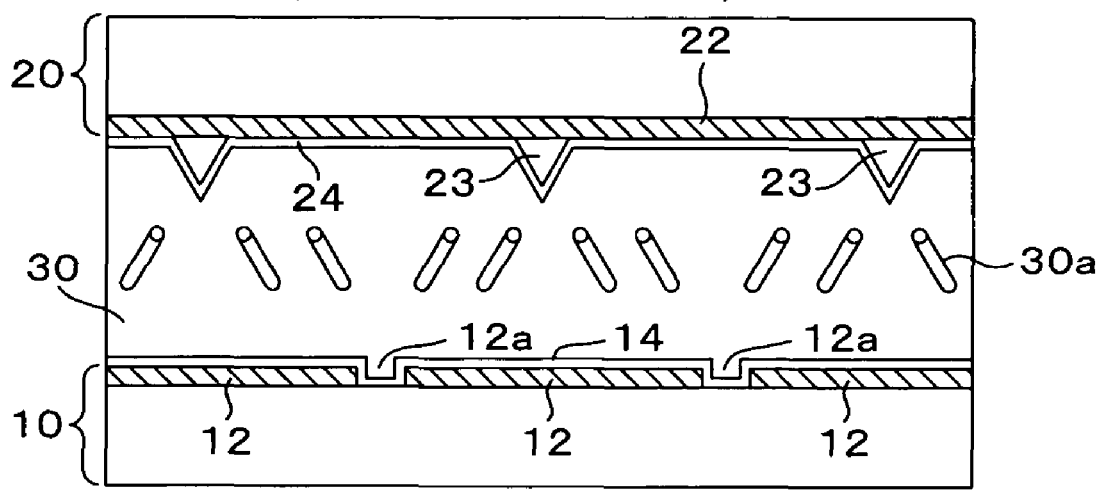
Figure 2:
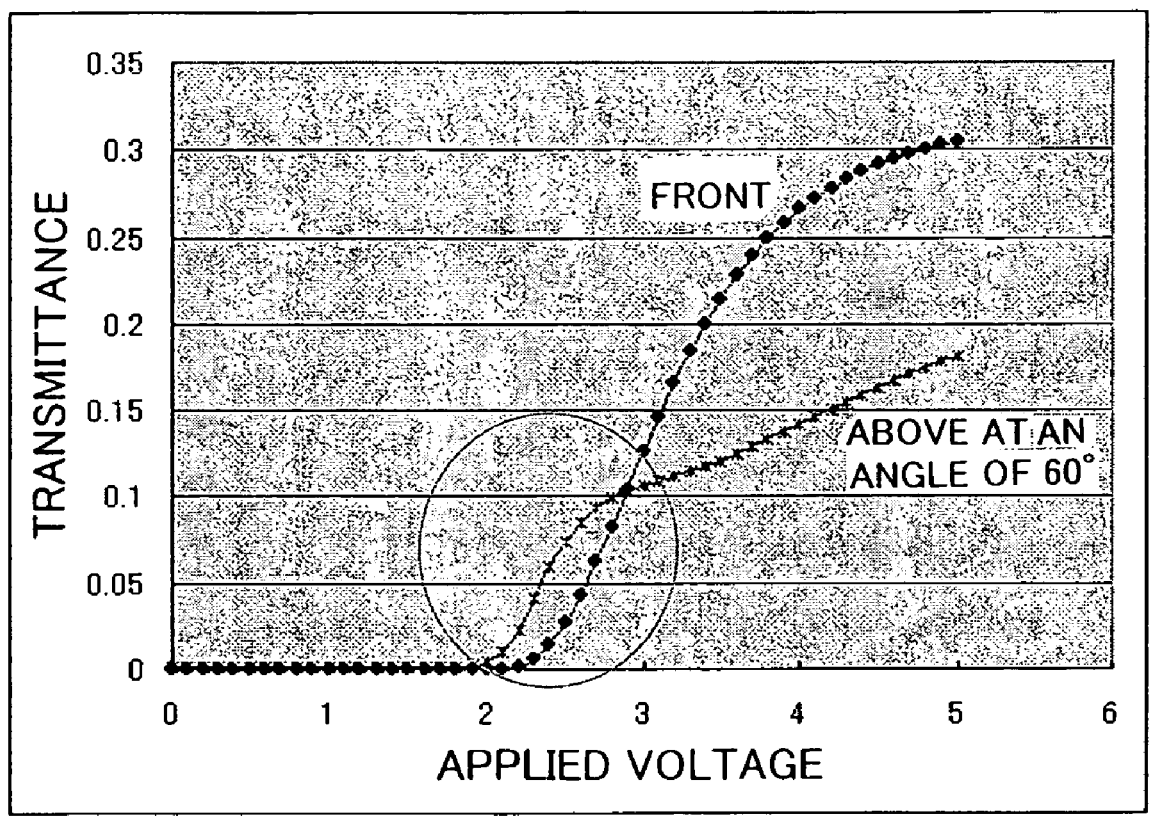
FIG. 2 is a graph showing transmittance-applied voltage (T-V) characteristic when viewing a screen of a liquid crystal display device from front and T-V characteristic when viewing the screen from above at an angle of 60°.
Figure 3:
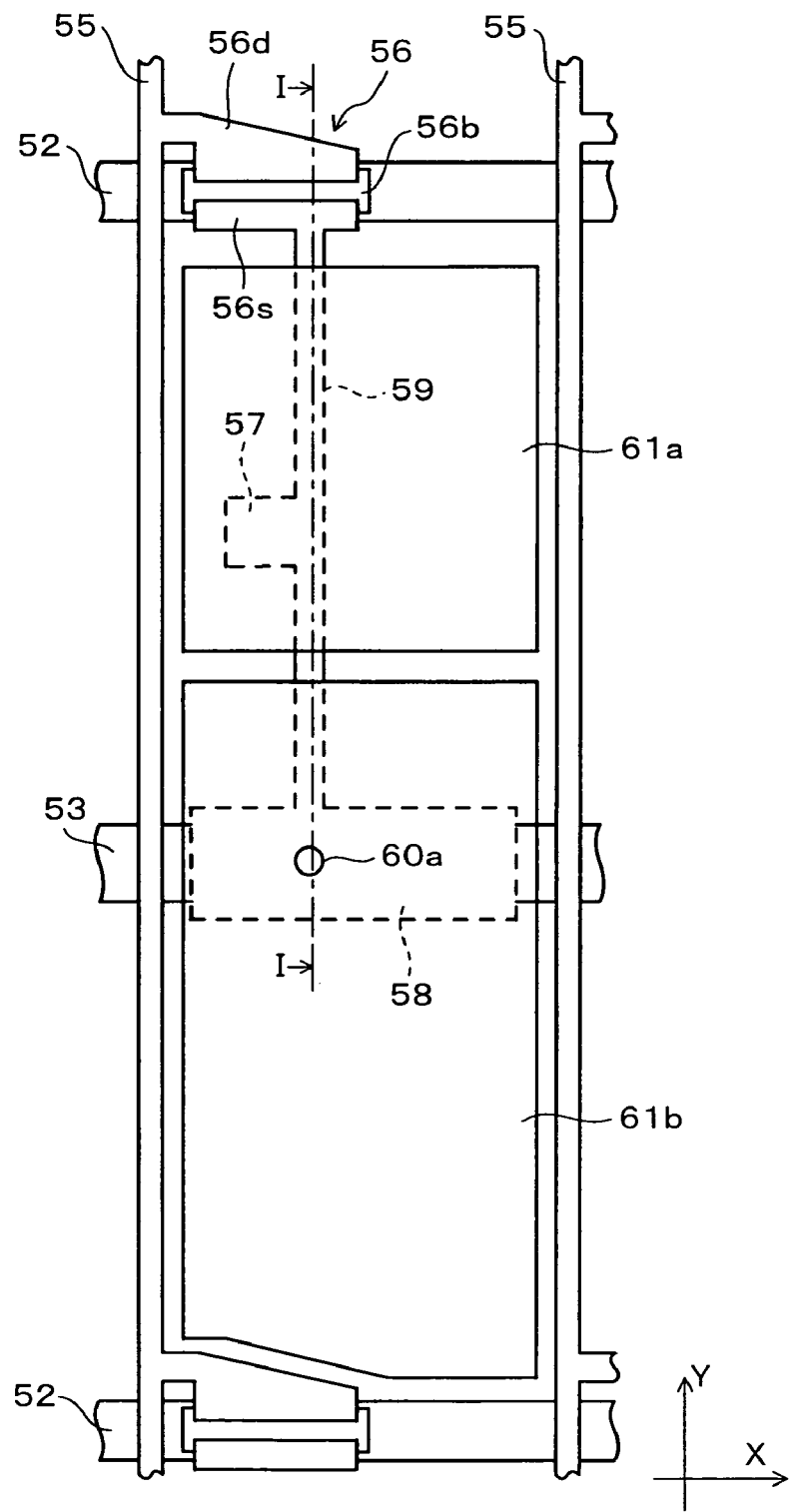
FIG. 3 is a plan view showing an example of a TFT substrate in a liquid crystal display device configured to achieve the HT method applying capacitive coupling.
Figure 4:
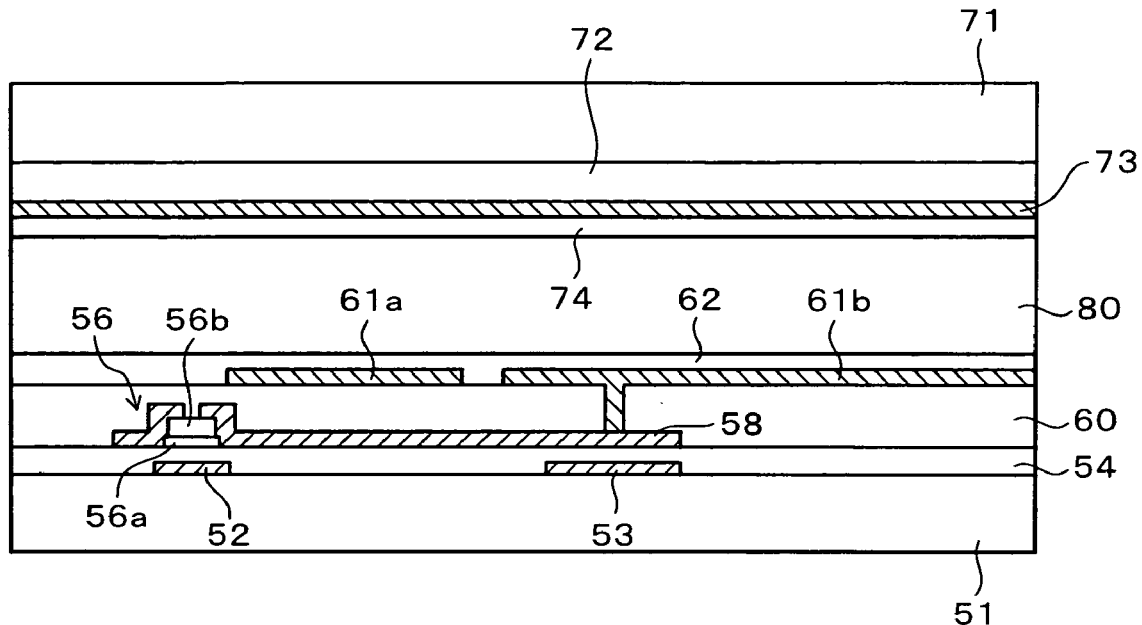
FIG. 4 is a cross-sectional view taken along the I-I line in FIG. 3.
Figure 5:
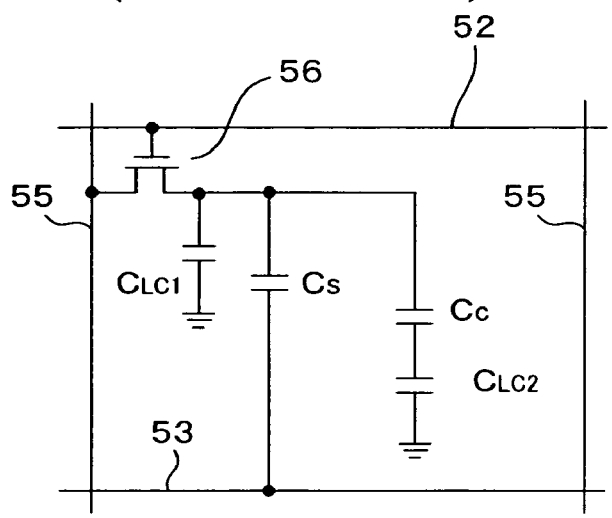
FIG. 5 is an equivalent circuit diagram showing one picture element in the liquid crystal display device shown in FIG. 3.

In the case of the liquid crystal display device shown in FIG. 3 and FIG. 4, the specific resistance of the liquid crystal is lower by 2 digits or above than the specific resistance of the insulating film of the TFT. Accordingly, the value $R_C/R_{LC2}$ is close to $10^3$. In this case, as it is apparent from FIG. 29 and FIG. 30, the magnification of the direct-current voltage is approximately equal to $C_C/C_{LC2}$. In the capacitive coupling HT method, the voltage ratio between the floating sub picture element electrode and the sub picture element electrode directly connected to the TFT is set in a range of about 0.9 to 0.6. Accordingly, the magnification of the direct-current voltage reaches close to 9 at the maximum, and image sticking is apt to occur.

In the meantime, FIG. 31 shows that it is possible to reduce the voltage on the floating sub picture element electrode significantly by decreasing $R_C$ between the control electrode and the floating sub picture element electrode. FIG. 31 is a graph showing relations between $R_C/R_{LC2}$ indicated in the lateral axis and electric potential differences of sub picture element electrodes at a white display portion and at a black display portion indicated in the longitudinal axis. Upon calculation, a value $C_{LCON}/C_{LCOFF}$ is assumed equal to 1.5.

As apparent from FIG. 31, the value $R_C$ must be equal to or less than 100 times of the value $R_{LC2}$ in order to reduce the voltage (the direct-current voltage component) on the floating sub picture element electrode.

However, when the resistance $R_C$ between the control electrode and the floating sub picture element electrode is reduced, an electric current will flow between the floating sub picture element electrode and the sub picture element electrode directly connected to the TFT. Accordingly, the electric potential difference between these sub picture element electrodes is gradually lost and the effect to suppress wash out attributable to the capacitive coupling HT method is reduced.

Figure 32:
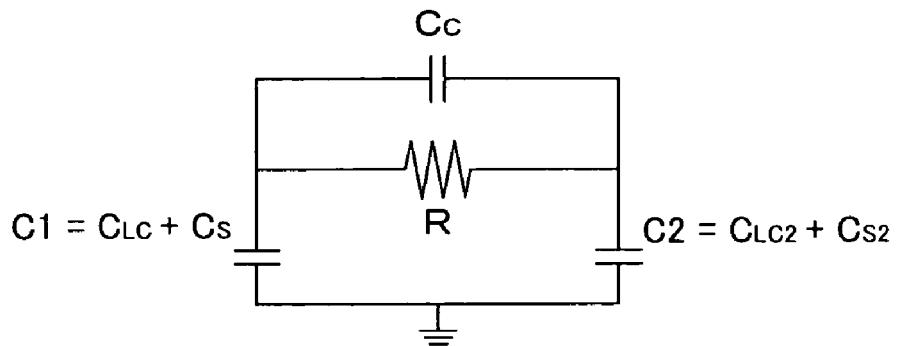
FIG. 32 is an equivalent circuit diagram showing a floating sub picture element electrode and a sub picture element directly connected to a TFT.

FIG. 32 is an equivalent circuit diagram showing the floating sub picture element electrode and the sub picture element directly connected to the TFT. Here, reference code C1 denotes a capacitance (C1=$C_{LC}$+$C_S$) included in the sub picture element electrode directly connected to the TFT, reference code C2 denotes a capacitance (C2=$C_{LC2}$+$C_{S2}$) included in the floating sub picture element electrode, reference code $C_C$ denotes a capacitance located between the floating sub picture element electrode and the sub picture element directly connected to the TFT, and reference code R denotes a resistance located between the floating sub picture element electrode and the sub picture element directly connected to the TFT. In this case, a voltage $V_C(t)$ on the floating sub picture element electrode at time t can be obtained by the following formula (6):

$$V_C(t)=V_C(0)\times\exp-(t/((Cse+C_C)\times R)) \quad (6)$$

Here, Cse is series connection capacitance of C1 and C2 (Cse=1/((1/C1)−(1/C2))).

Figure 33:
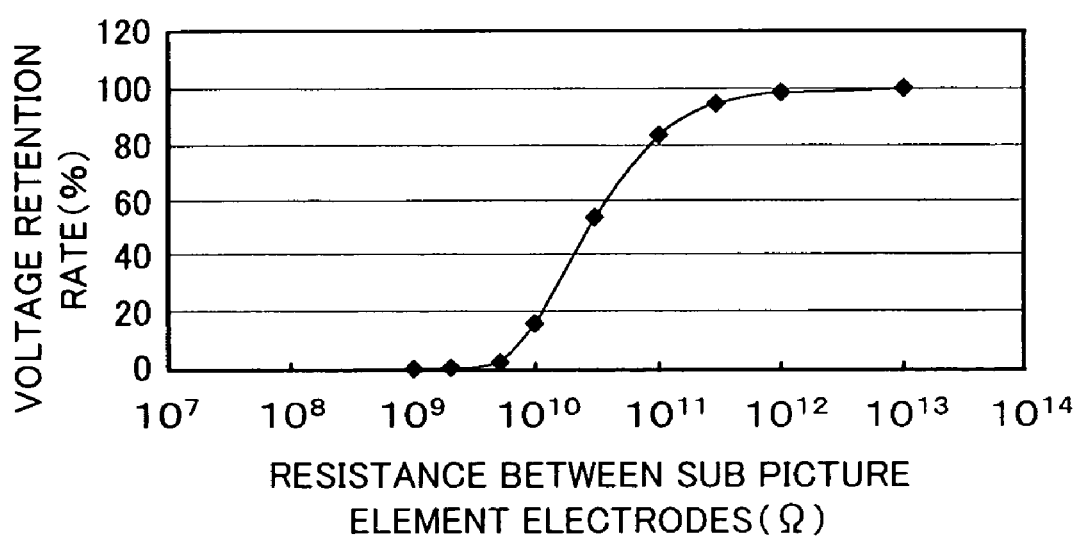
FIG. 33 is a graph showing a relation between a resistor R, which is located between the floating sub picture element electrode and the sub picture element directly connected to the TFT, and a voltage retention rate in one frame period (t=16.6 msec).

FIG. 33 is a graph showing a relation between the resistance R, which is located between the floating sub picture element electrode and the sub picture element directly connected to the TFT, which is indicated by the lateral axis, and a voltage retention rate in one frame period (t=16.6 msec), which is indicated by the longitudinal axis. Here, the liquid crystal display device having the structure shown in FIG. 3 and FIG. 4 is assumed. Upon calculation, a picture element pitch is set to 125 μm, an area proportion between the floating sub picture element electrode and the sub picture element electrode directly connected to the TFT is set to 3 to 7, and a ratio between a display voltage to be applied to the floating sub picture element electrode and a display voltage to be applied to the sub picture element electrode directly connected to the TFT is set to 0.72.

As apparent from FIG. 33, the voltage retention rate will be maintained at about 90% or above when the resistance between the floating sub picture element electrode and the sub picture element electrode directly connected to the TFT equal to or more than $10^{11}\Omega$. If the voltage retention rate falls below 50%, variation in the electric potential difference attributable to uneven resistance reaches the maximum. Accordingly, in light of display stability, it is preferable to set the voltage retention rate equal to or more than 50%.

As described above, the effect to prevent image sticking is obtained by setting the resistance R located between the floating sub picture element electrode and the sub picture element electrode directly connected to the TFT so as to satisfy the $R_C$ equal to or less than 100 times of $R_{LC2}$ and the voltage retention rate in one frame period equal to or more than 50%.

Figure 34:
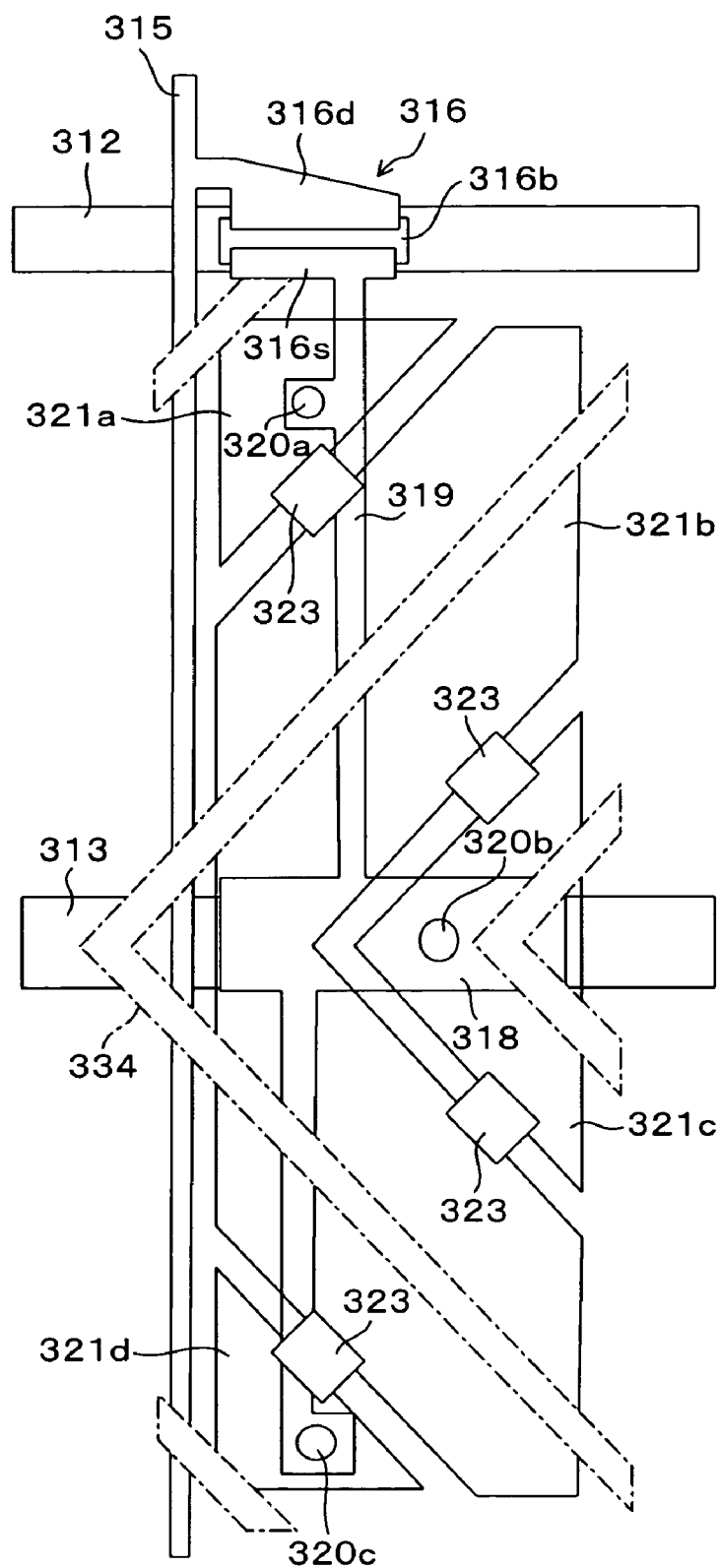
FIG. 34 is a plan view showing a TFT substrate in a liquid crystal display device according to a third embodiment of the present invention.
Figure 35:
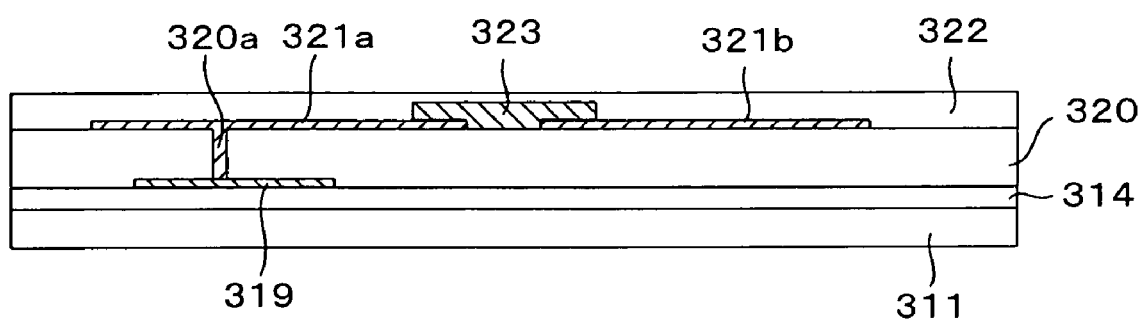
FIG. 35 is a cross-sectional view of the TFT substrate shown in FIG. 34.

FIG. 34 is a plan view showing a TFT substrate in a liquid crystal display device of the third embodiment adopting the above-described arrangements. Meanwhile, FIG. 35 is a cross-sectional view of the TFT substrate shown in FIG. 35.

As shown in FIG. 34, a plurality of gate bus lines 312 (only one gate bus line is illustrated in FIG. 34) extending in the horizontal direction and a plurality of data bus lines 315 (only one data bus line is illustrated in FIG. 34) extending in the vertical direction are formed on the TFT substrate. Each rectangular region defined by the gate bus lines 312 and the data bus lines 315 constitutes a picture element region. Meanwhile, auxiliary capacitance bus lines 313 intersecting the picture element regions are formed in parallel to the gate bus lines 312 on the TFT substrate. As will be described later, a first insulating film 314 is formed in a space between each of the gate bus lines 312 and each of the data bus lines 315 and in a space between each of the auxiliary capacitance bus lines 313 and each of the data bus lines 315. By using this first insulating film 314, the gate bus lines 312 and the data bus lines 315, and, the auxiliary capacitance bus lines 313 and the data bus lines 315 are electrically insulated, respectively.

A TFT 316, a control electrode 318, and four sub picture element electrodes 321a to 321d are formed in each picture element region. A drain electrode 316d of the TFT 316 is connected to the data bus line 315, and a source electrode 316s thereof is connected to the control electrode 318 through a line 319.

The sub picture element electrodes 321a to 321d are divided by slits which are formed along zigzag lines bending above the gate bus lines 312 and the auxiliary bus line 313. Moreover, the sub picture element electrodes 321a and 321d are electrically connected to the source electrode 316s through contact holes 320a and 320c and the line 319. The sub picture element electrode 321c is electrically connected to the control electrode 318 through a contact hole 320b. On the other hand, the sub picture element electrode (the floating sub picture element electrode) 321b is capacitively coupled to the control electrode 318 through a second insulating film 320 to be described later. In addition, these sub picture element electrodes 321a to 321d are electrically connected to one another with connecting portions 323, which are made of a high-resistance conductive material. Here, the control electrode 318 also functions as an auxiliary capacitance electrode and constitutes an auxiliary capacitance together with the auxiliary capacitance bus line 313 and the first insulating film 314.

Now, a layer structure of the TFT substrate will be described with reference to FIG. 35.

The gate bus lines 312 and the auxiliary capacitance bus lines 313 are formed on a glass substrate 311 constituting a base of the TFT substrate. The gate bus lines 312 and the auxiliary capacitance bus lines 313 are formed simultaneously by patterning a Cr film or an Al—Ti lamination film in accordance with the photolithography method, for example.

Moreover, the first insulating film 314 made of an insulating material such as SiN or $SiO_2$ is formed on the glass substrate 311, and the gate bus lines 312 and the auxiliary capacitance bus lines 313 are covered with this insulating film 314.

The data bus lines 315, the source electrode 316s and the drain electrode 316d of the TFT 316, the control electrode 318, and the line 319 are formed on the first insulating film 314. The data bus lines 315, the source electrode 316s, the drain electrode 316d, the control electrode 318, and the line 319 are formed simultaneously by patterning a Ti—Al—Ti lamination film in accordance with the photolithography method, for example.

As shown in FIG. 34, the TFT 316 applies part of the gate bus line 312 as a gate electrode. Moreover, a semiconductor film (not shown) constituting an active layer and a channel protection film 316b are formed on the gate electrode. The source electrode 316s and the drain electrode 316d are disposed opposite to each other while sandwiching the gate bus line 312.

The data bus lines 315, the source electrode 316s, the drain electrode 316d, the control electrode 318, and the line 319 are covered with the second insulating film 320, which is made of SiN or insulative resin, for example. The sub picture element electrodes 321a to 321d are formed on this second insulating film 320. These sub picture element electrodes 321a to 321d are made of a transparent conductive material such as ITO. The sub picture element electrodes 321a and 321d are electrically connected to the line 319 through the contact holes 320a and 320c respectively formed on the second insulating film 320, and the sub picture element electrode 321c is electrically connected to the control electrode 318 through the contact hole 320b. Moreover, the sub picture element electrode 321b is capacitively coupled to the control electrode 318 through the second insulating film 320.

The sub picture element electrodes 321a to 321d are electrically connected to one another through the connecting portions 323, which are made of a high-resistance conductive material. Moreover, an alignment film 322 made of polyimide, for example, is formed on the sub picture element electrodes 321a to 321d and on the connecting portions 323.

The connecting portions 323 are made of impurity-doped amorphous silicon, for example. As described previously, a resistance R between the floating sub picture element electrode 321b and the sub picture element electrodes 321a, 321c, and 321d directly connected to the TFT 316 is set equal to or less than 100 times of a resistance between the floating sub picture element electrode 321b and the common electrode, and the voltage retention rate in one frame period is set equal to or more than 50%.

The material for the connecting portions 323 is not only limited to amorphous silicon as described above, and it is also possible to form the connecting portions 323 by use of an organic conductive material, for example. However, as the material for the connecting portions 323, it is preferable to use a material that possesses a value of resistance in an appropriate range and does not contaminate the liquid crystal. In addition, the material is also required to have resistance to a process for forming the alignment film. For example, it is preferable that the material be hardly soluble to a solvent and have high heat resistance.

In FIG. 34, chain lines 331 show positions of protrusions in the shape of mounds (domain regulating structures) which are formed on the counter substrate side.

In the liquid crystal display device of this embodiment, the floating sub picture element electrode 321b is electrically connected to the sub picture element electrodes 321a, 321c, and 321d directly connected to the TFT 316 through the high-resistance connecting portions 323. Moreover, the resistance R between the floating sub picture element electrode 321b and the sub picture element electrodes 321a, 321c, and 321d directly connected to the TFT 316 is set equal to or less than 100 times of the resistance between the floating sub picture element electrode 321b and the common electrode, and the voltage retention rate in one frame period is set equal to or more than 50%. Accordingly, it is possible to suppress wash out and to avoid occurrence of image sticking. In this way, it is possible to obtain favorable display quality.

First Modified Example

Figure 36:
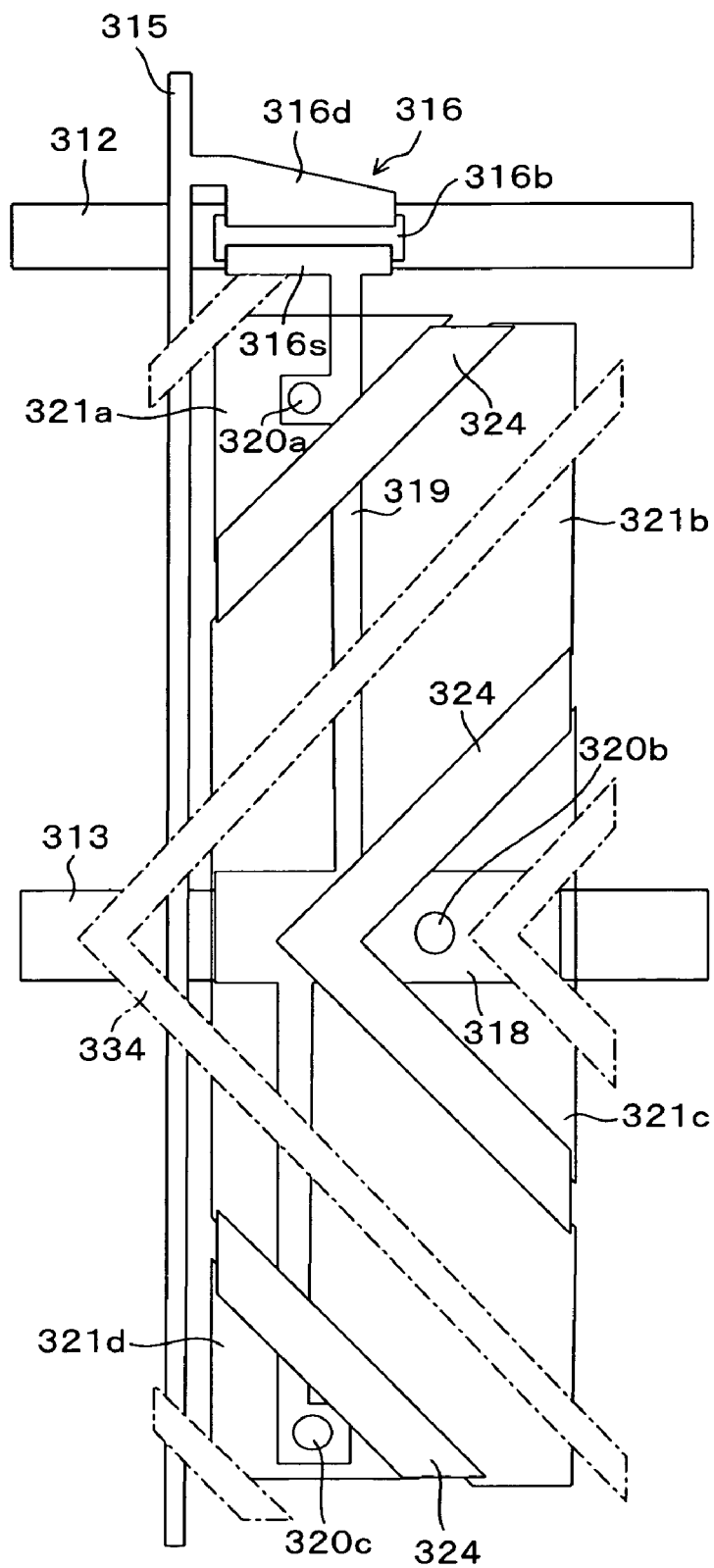
FIG. 36 is a plan view showing a liquid crystal display device according to a first modified example of the third embodiment.
Figure 37:
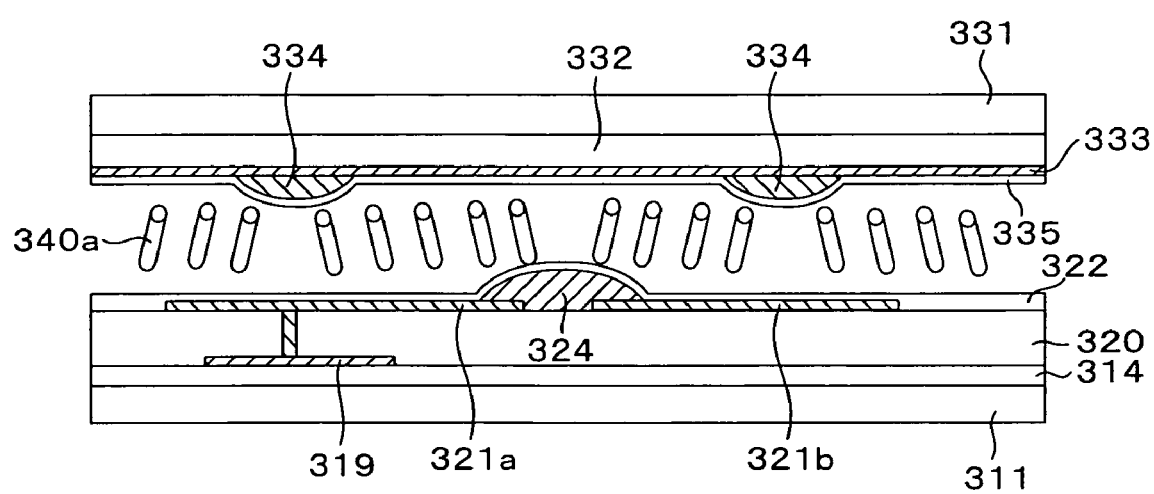
FIG. 37 is a cross-sectional view showing the liquid crystal display device of FIG. 36.

FIG. 36 is a plan view showing a liquid crystal display device according to a first modified example of the third embodiment, and FIG. 37 is a cross-sectional view showing the liquid crystal display device of FIG. 36. In terms of FIG. 36 and FIG. 37, the same constituents as those illustrated in FIG. 34 and FIG. 35 are designated by the same reference numerals, and detailed description thereof will be omitted.

In the liquid crystal display device of the first modified example, connecting portions 324 for electrically connecting the floating sub picture element electrode 321b and the sub picture element electrodes 321a, 321c, and 321d directly connected to the TFT 316 are formed into the shape of mounds along slits for dividing the sub picture element electrodes 321a to 321d. The connecting portions 324 are made of a high-resistance conductive material such as impurity-doped amorphous silicon. Surfaces of the sub picture element electrodes 321a to 321d and of the connecting portions 324 are covered with the alignment film 322.

On the other hand, a color filter 332 and a common electrode 333 are formed on one of surfaces (which is the lower side in FIG. 37) of a glass substrate 331 constituting a base of the counter substrate, and domain regulating protrusions 334 are formed into the shape of mounds on the common electrode 333 (which is the lower side in FIG. 37). Surfaces of the common electrode 333 and of the protrusions 334 are covered with an alignment film 335. The protrusions 334 may be formed by use of a dielectric material or a high-resistance conductive material as similar to the connecting portions 324.

In this liquid crystal display device, it is possible to achieve multi-domains by use of the connecting portions 324 in the shape of mounds formed on the TFT substrate side and the protrusions 334 in the shape of mounds formed on the counter substrate side as shown in FIG. 37. That is, directions of inclination of liquid crystal molecules 340a are different on two sides of each of the connecting portions 324 or on two sides of each of the protrusions 334 upon application of a voltage. In this way, it is possible to prevent leakage of light in oblique directions.

In this liquid crystal display device as well, the floating sub picture element electrode 321b is electrically connected to the sub picture element electrodes 321a, 321c, and 321d directly connected to the TFT 316 through the high-resistance connecting portions 324 made of amorphous silicon, for example. Moreover, the resistance R between the floating sub picture element electrode 321b and the control electrode 318 is set equal to or less than 100 times of the resistance between the floating sub picture element electrode 321b and the common electrode, and the voltage retention rate in one frame period is set equal to or more than 50%. Accordingly, it is possible to suppress wash out and to avoid occurrence of image sticking. In this way, it is possible to obtain favorable display quality.

Here, if the connecting portions 324 constituting the domain regulating protrusions have low resistance, the entire connecting portions 324 are set to the same electric potential as the electric potential of the sub picture element electrodes 321a to 321d. Accordingly, an electric line of force will occur vertically from the connecting portions 324 toward the surfaces of the substrates, and it is not possible to achieve the multi-domains. Nevertheless, the connecting portions 324 are made of the high-resistance conductive material in the above-described example. Therefore, it is possible to align the liquid crystal molecules along predetermined directions.

Fourth Embodiment

Figure 38:
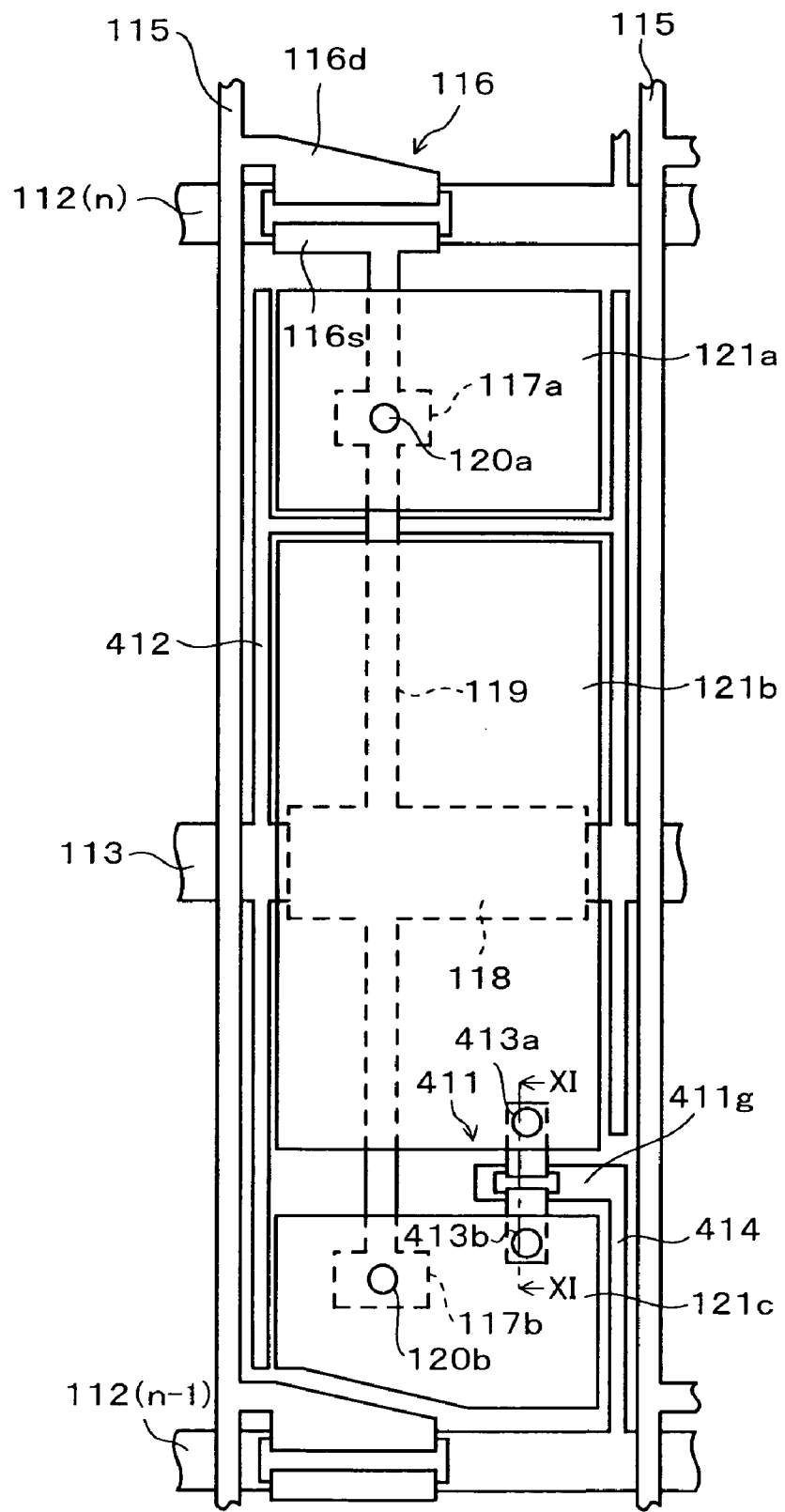
FIG. 38 is a plan view showing a liquid crystal display device according to a fourth embodiment of the present invention.
Figure 39:
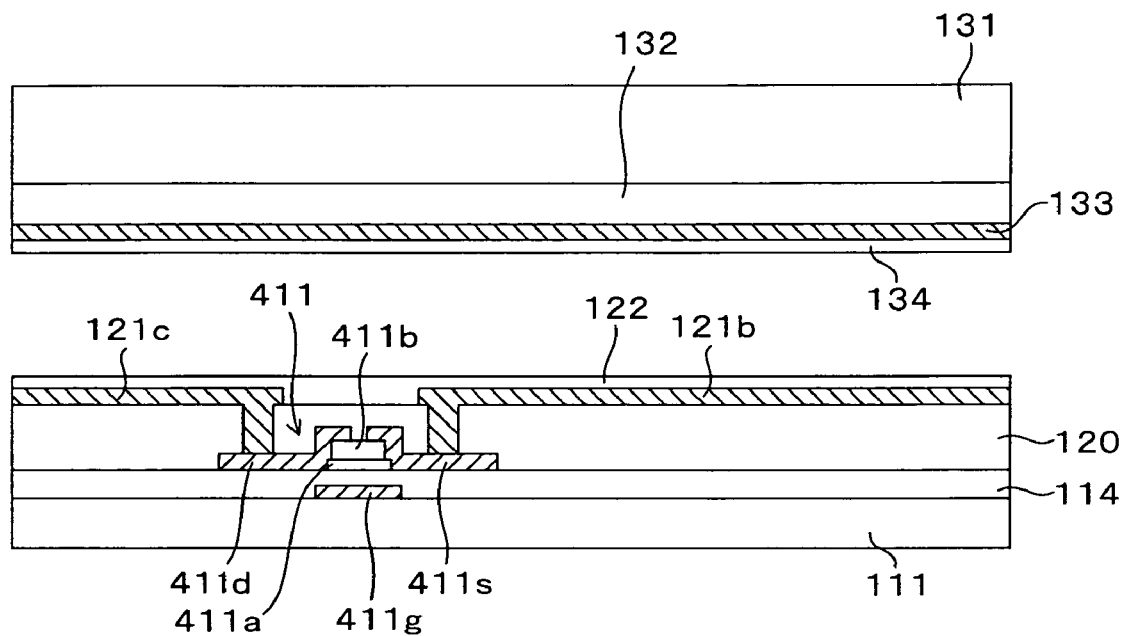
FIG. 39 is a cross-sectional view taken along the XI-XI line in FIG. 38.

FIG. 38 is a plan view showing a liquid crystal display device according to a fourth embodiment of the present invention, and FIG. 39 is a cross-sectional view taken along the XI-XI line in FIG. 38. In terms of FIG. 38 and FIG. 39, the same constituents as those illustrated in FIG. 13, FIG. 14A, and FIG. 14B are designated by the same reference numerals, and detailed description thereof will be omitted.

In this embodiment, each picture element region defined by the gate bus lines 112 and the data bus lines 115 includes three sub picture element electrodes 121a to 121c. The sub picture element electrodes 121a and 121c are electrically connected to the line 119, which extends from the source electrode 116s of the TFT 116, through the contact holes 120a and 120b formed on the second insulating film 120. Meanwhile, the sub picture element electrode (the floating sub picture element electrode) 121b is capacitively coupled to the control electrode 118 while sandwiching the second insulating film 120.

Spaces between the sub picture element electrode 121b and the data bus lines 115, and a space between the sub picture element electrode 121b and the sub picture element electrode 121a are shielded by a shield pattern 412, which is connected to the auxiliary capacitance bus line 113.

A TFT 411 is formed between the sub picture element electrode 121b and the sub picture element electrode 121c. A gate electrode 411g of this TFT 411 is connected to the gate bus line 112 (an n−1-th gate bus line) which is different from the gate bus line 112 (an n-th gate bus line) connected to the TFT 116. Moreover, a source electrode 411s and a drain electrode 411d are connected to the sub picture element electrodes 121b and 121c through contact holes 413a and 413b, respectively.

Figure 40:
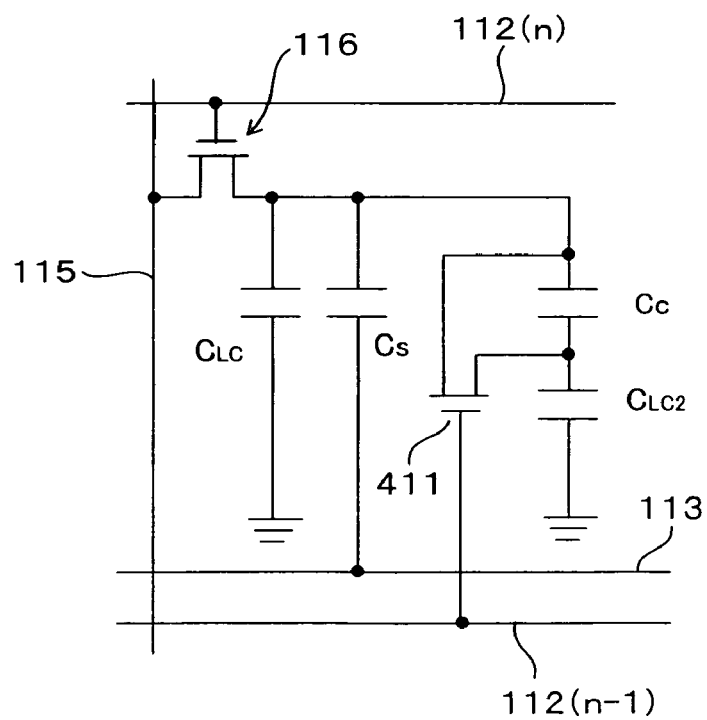
FIG. 40 is an equivalent circuit diagram showing one picture element in the liquid crystal display device according to the fourth embodiment.

FIG. 40 is an equivalent circuit diagram showing one picture element in the above-described liquid crystal display device. In FIG. 40, the TFT 116 is connected to the n-th gate bus line 112(n). Moreover, as described previously, the source electrode 116s of the TFT 116 is directly connected to the sub picture element electrodes 121a and 121c, and to the control electrode 118. Reference code $C_{LC}$ denotes the capacitance (the liquid crystal capacitance) between the sub picture element electrodes 121a and 121c, and, the common electrode 133. Meanwhile, reference code $C_S$ denotes the capacitance (the auxiliary capacitance) between the control electrode 118 and the auxiliary capacitance bus line 113. In the meantime, reference code $C_C$ denotes the capacitance between the control electrode 118 and the floating sub picture element electrode 121b, and reference code $C_{LC2}$ denotes the capacitance between the floating sub picture element electrode 121b and the common electrode 133.

In addition, the TFT 411 is formed between the sub picture element electrodes 121b and 121c, and the gate electrode 411g thereof is connected to the n−1-th gate bus line 112(n−1).

In the liquid crystal display device of this embodiment, the TFT 411 is turned on before (which is just one horizontal scanning period ahead) the display voltage is applied to the sub picture element electrodes 121a and 121c and to the control electrode 118 through the TFT 116, whereby the electric potential of the floating sub picture element electrode 121b becomes equal to the electric potential of the sub picture element electrodes 121a and 121c directly connected to the TFT 116 and of the control electrode 118. In this way, the electric charges accumulated in the floating sub picture element electrode 121b, which are attributable to the direct-current voltage components included in the signals flowing on the gate bus line 112 and the data bus line 115, flow toward the sub picture element electrodes 121a and 121c and the control electrode 118. Therefore, it is possible to obtain the effect to suppress accumulation of the electric charges in the floating sub picture element electrode 121b and thereby to avoid image sticking.

First Modified Example

Figure 41:
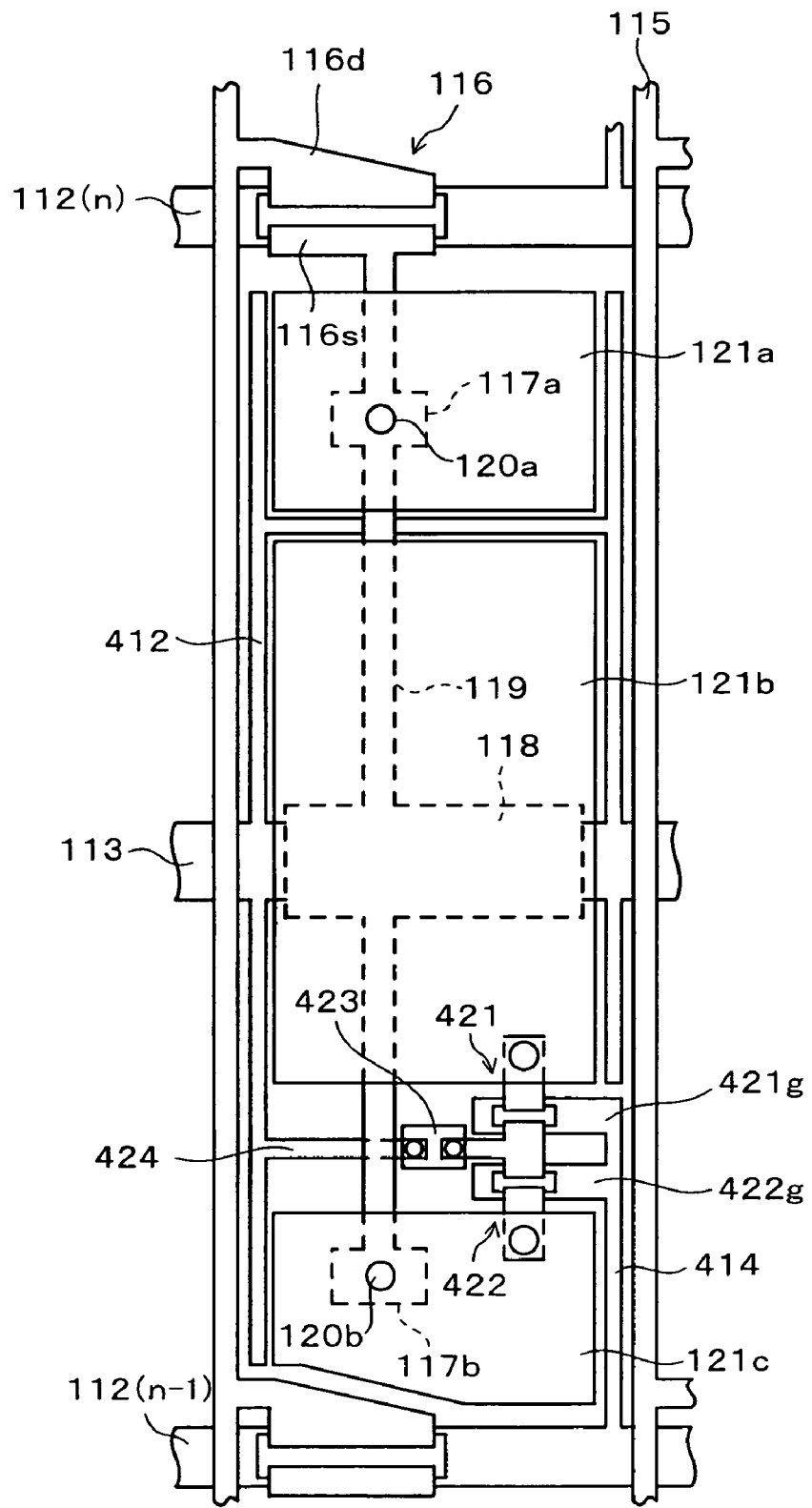
FIG. 41 is a plan view showing a liquid crystal display device according to a first modified example of the fourth embodiment.

FIG. 41 is a plan view showing a liquid crystal display device according to a first modified example of the fourth embodiment. In terms of FIG. 41, the same constituents as those illustrated in FIG. 38 are designated by the same reference numerals, and detailed description thereof will be omitted.

In this example, two TFTs 421 and 422 are disposed between the sub picture element electrode 121c directly connected to the TFT 116 and the floating sub picture element electrode 121b. Drain electrodes of these TFTs 421 and 422 are connected to each other. Meanwhile, gate electrodes 421g and 422g of these TFTs 421 and 422 are connected to the n−1-th gate bus line 112(n−1) through a line 414, and source electrodes thereof are connected to the floating sub picture element electrode 121b and to the sub picture element electrode 121c, respectively. Moreover, drain electrodes of the TFTs 421 and 422 are connected to a shield pattern 412, which extends from the auxiliary capacitance bus line 113, through a connecting portion 423 and a line 424.

Figure 42:
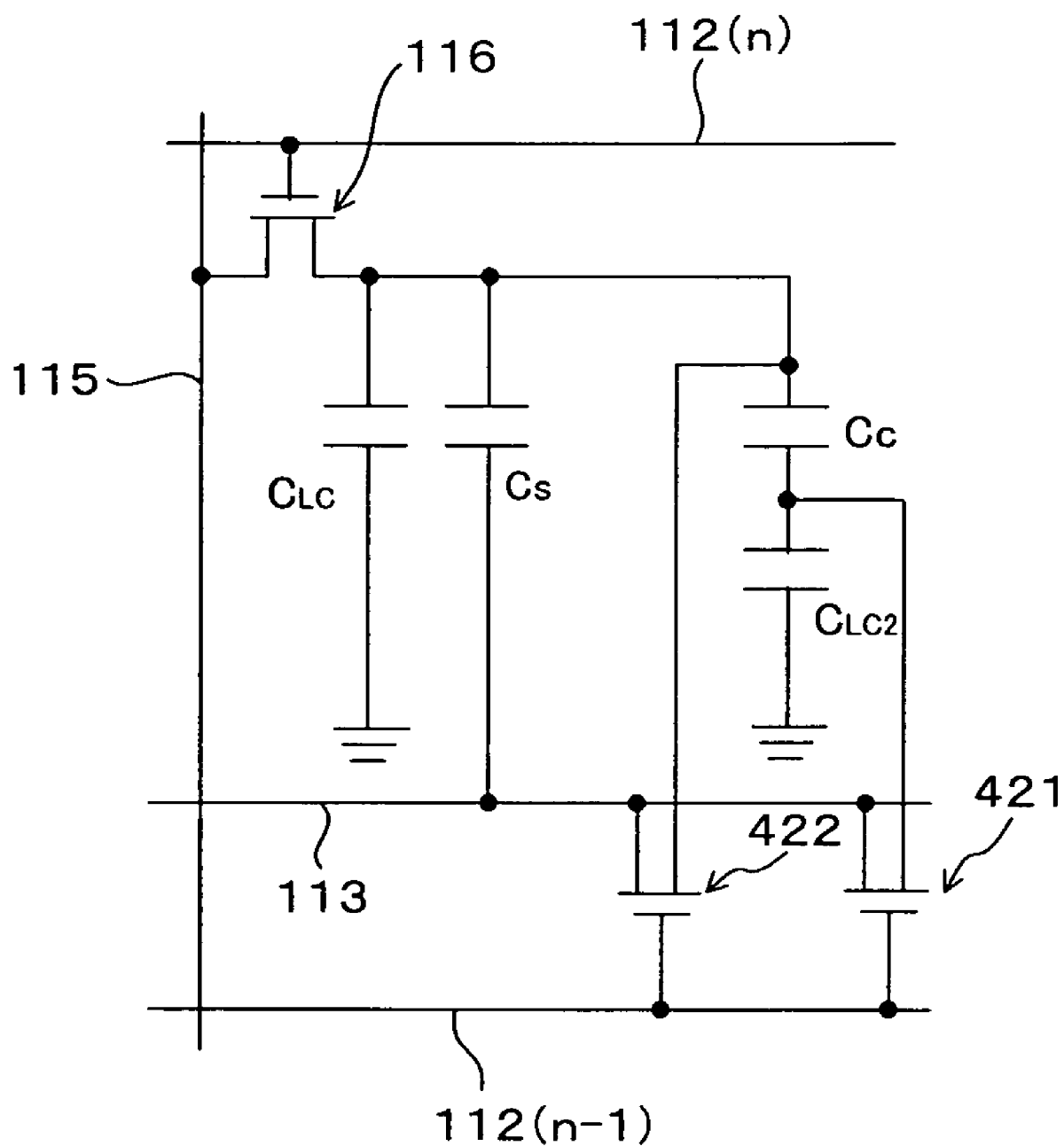
FIG. 42 is an equivalent circuit diagram showing one picture element in the liquid crystal display device according to the first modified example of the fourth embodiment.

FIG. 42 is an equivalent circuit diagram showing one picture element in the above-described liquid crystal display device. In FIG. 42, the TFT 116 is connected to the n-th gate bus line 112(n). Moreover, the source electrode 116s of this TFT 116 is electrically connected to the sub picture element electrodes 121a and 121c, and to the control electrode 118. Reference code $C_{LC}$ denotes the capacitance (the liquid crystal capacitance) between the sub picture element electrodes 121a and 121c and the common electrode 133. Meanwhile, reference code Cs denotes the capacitance (the auxiliary capacitance) between the control electrode 118 and the auxiliary capacitance bus line 113. In the meantime, reference code $C_C$ denotes the capacitance between the control electrode 118 and the floating sub picture element electrode 121b, and reference code $C_{LC2}$ denotes the capacitance between the floating sub picture element electrode 121b and the common electrode 133.

In addition, the TFTs 421 and 422 are connected between the sub picture element electrodes 121b and 121c. The gate electrode of the TFT 421 is connected to the n−1-th gate bus line 112(n−1), and the source electrode and the drain electrode thereof are connected between the floating sub picture element electrode 121b and the auxiliary capacitance bus line 113. Meanwhile, the gate electrode of the TFT 422 is also connected to the n−1-th gate bus line 112(n−1), and the source electrode and the drain electrode thereof are connected between the sub picture element electrode 121c and the auxiliary capacitance bus line 113. Here, the auxiliary capacitance bus line 113 is assumed to be maintained at the same electric potential as the electric potential of the common electrode on the counter substrate.

In the liquid crystal display device of this example as well, the TFTs 421 and 422 are turned on before (which is just one horizontal scanning period ahead) the display voltage is applied to the sub picture element electrodes 121a and 121c and to the control electrode 118 through the TFT 116, whereby the electric potential of the floating sub picture element electrode 121b and the electric potential of the sub picture element electrodes 121a and 121c directly connected to the TFT 116 become equal to the electric potential of the auxiliary capacitance bus line 113. In this way, the electric charges accumulated in the floating sub picture element electrode 121b and in the sub picture element electrodes 121a and 121c, which are attributable to the direct-current voltage components included in the signals flowing on the gate bus line 112 and the data bus line 115, flow toward the auxiliary capacitance bus line 113. Therefore, it is possible to obtain the effect to suppress accumulation of the electric charges in the floating sub picture element electrode 121b and thereby to avoid image sticking.

Note that the electric charges accumulated in the sub picture element electrodes 121a and 121c directly connected to the TFT 116 are allowed to flow toward the auxiliary capacitance bus line 113 through the TFT 422 in the above-described first modified example. However, as described previously, these sub picture element electrodes 121a and 121c are connected to the data bus line 115 once in every frame. Accordingly, the influences of the electric charges accumulated in the sub picture element electrodes 121a and 121c are minimal. Therefore, it is also possible to omit the TFT 422.

Fifth Embodiment

Now, a fifth embodiment of the present invention will be described.

Figure 43:
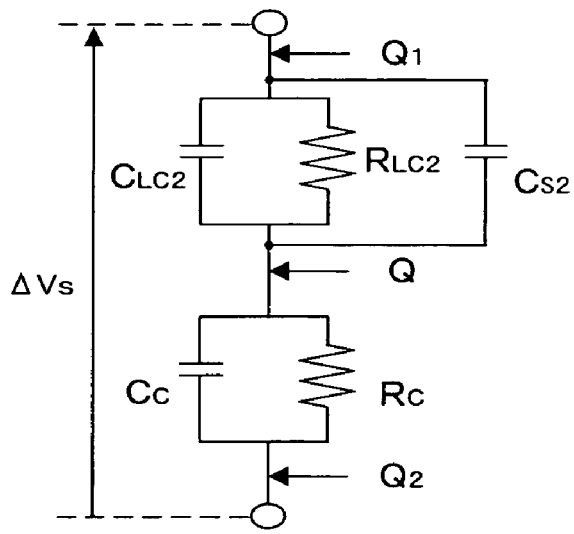
FIG. 43 is a circuit diagram of a picture element showing the principle of a fifth embodiment of the present invention.

FIG. 43 is a circuit diagram of a picture element showing the principle of a fifth embodiment of the present invention. In FIG. 43, reference codes $C_C$ and $R_C$ respectively denote the capacitance and the resistance between the control electrode and the floating sub picture element electrode, and reference codes $C_{LC2}$ and $R_{LC2}$ respectively denote the capacitance (the liquid crystal capacitance) and the resistance (the liquid crystal resistance) between the floating sub picture element electrode and the common electrode.

As described previously, one of the reasons why the electric potential difference occurs between the floating sub picture element electrodes in the white display portion and the black display portion is variation in the liquid crystal capacitance $C_{LC2}$. Accordingly, in the fifth embodiment, an auxiliary capacitance $C_{S2}$ is connected in parallel to the liquid crystal capacitance $C_{LC2}$ to reduce the influence of the variation in the capacitance between the floating sub picture element electrode and the common electrode.

Figure 44:
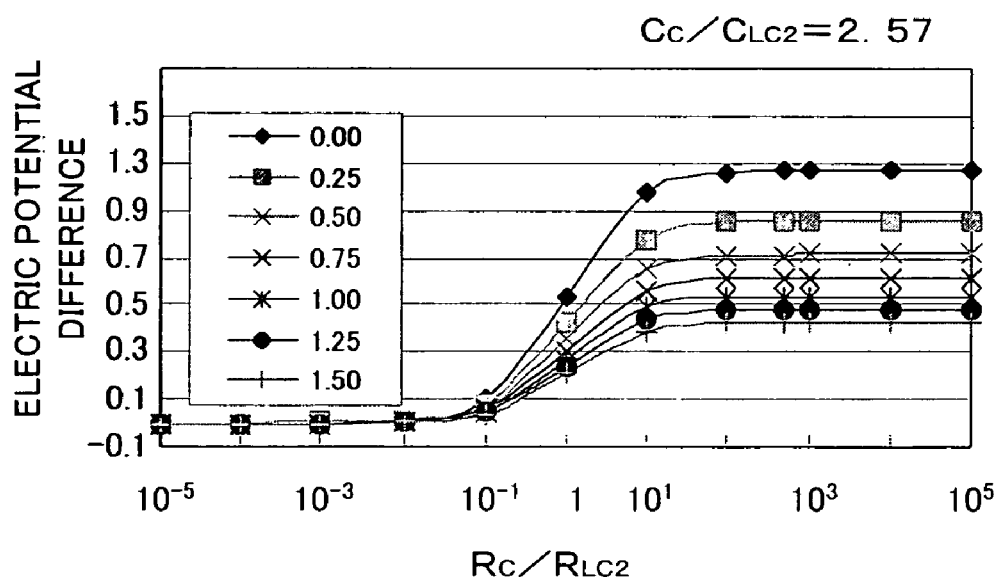
FIG. 44 is a graph showing relations between $R_C/R_{LC2}$ and electric potential differences of floating sub picture element electrodes at a white display portion and at a black display portion.

FIG. 44 is a graph showing relations between $R_C/R_{LC2}$ indicated on the lateral axis and the electric potential difference of the floating sub picture element electrodes between the white display portion and the black display portion indicated on the longitudinal axis. Here, the relations are observed in the case where there is no auxiliary capacitance $C_{S2}$ (0.00 times) and in the cases where the values of the auxiliary capacitance $C_{S2}$ is 0.25 to 1.5 times as large as the value of the liquid crystal capacitance $C_{LC2}$. Note that the value $C_C/C_{LC2}$ is set to 2.57 herein.

As apparent from comparison between FIG. 44 and FIG. 31, the electric potential difference of the floating sub picture element electrodes between the white display portion and the black display portion is reduced by connecting the auxiliary capacitance $C_{S2}$ in parallel to the liquid crystal capacitance $C_{LC2}$. Assuming that the value of the auxiliary capacitance $C_{S2}$ is equal to the value of the liquid crystal capacitance $C_{LC2}$ ($C_{S2}/C_{LC2}$=1.00), for example, the electric potential difference of the floating sub picture element electrodes between the white display portion and the black display portion causing image sticking is reduced approximately to one-half.

Figure 45:
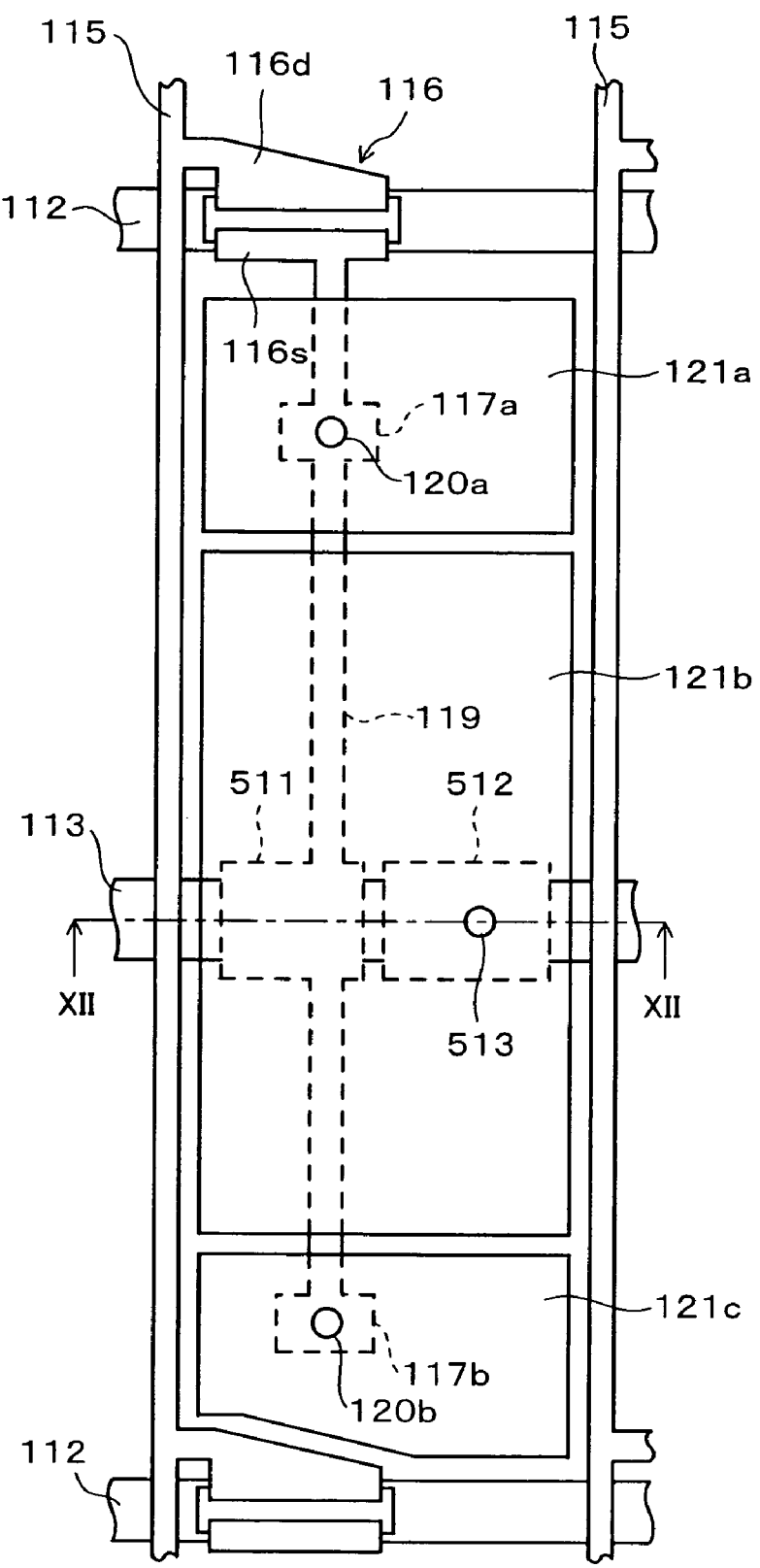
FIG. 45 is a plan view showing a liquid crystal display device according to the fifth embodiment.
Figure 46:
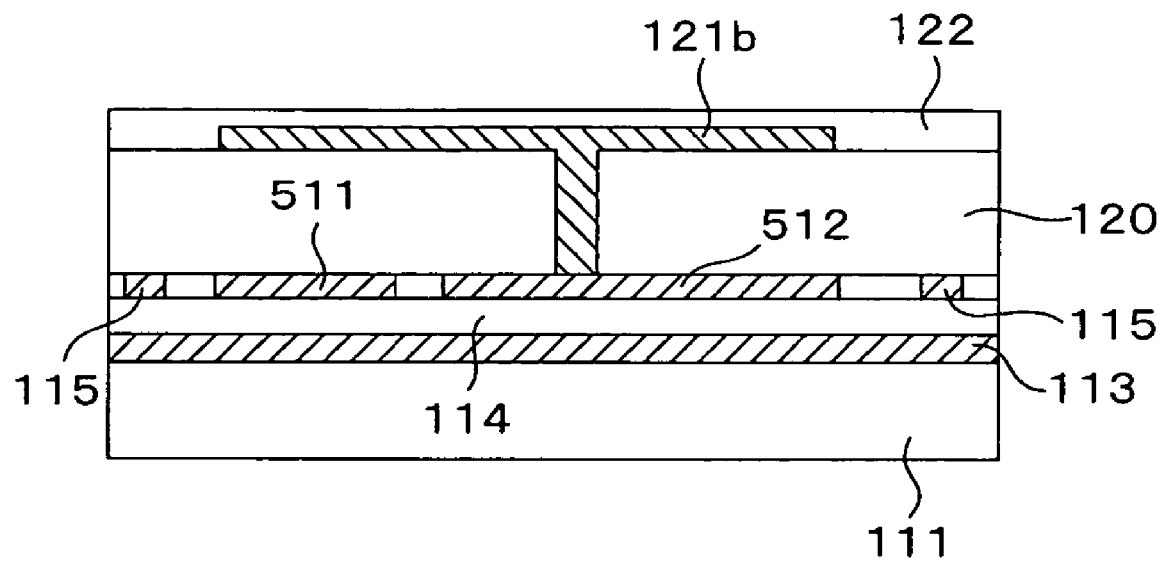
FIG. 46 is a cross-sectional view taken along the XII-XII line in FIG. 45.

FIG. 45 is a plan view showing the liquid crystal display device after undergoing the above-described countermeasure, and FIG. 46 is a cross-sectional view taken along the XII-XII line in FIG. 45. In terms of FIG. 45 and FIG. 46, the same constituents as those illustrated in FIG. 13, FIG. 14A, and FIG. 14B are designated by the same reference numerals, and detailed description thereof will be omitted.

In the liquid crystal display device of this embodiment, a control electrode 511 and an auxiliary capacitance electrode 512 are formed above the auxiliary capacitance bus line 113. The control electrode 511 is capacitively coupled to the floating sub picture element electrode 121b through the second insulating film 140. Moreover, the control electrode 511 is electrically connected to the source electrode 116s of the TFT 116 through the line 119, and is electrically connected to the sub picture element electrodes 121a and 121c through the line 119 and the contact holes 120a and 120b. In addition, the control electrode 511 constitutes a first auxiliary capacitance together with the auxiliary capacitance bus line 113 and the first insulating film 114. Here, the auxiliary capacitance bus line 113 is assumed to be maintained at the same electric potential as the electric potential of the common electrode on the counter substrate.

The auxiliary capacitance electrode 512 is electrically connected to the floating sub picture element electrode 121b through a contact hole 513 formed on the second insulating film 140. Moreover, the auxiliary capacitance electrode 512 constitutes a second auxiliary capacitance $C_{S2}$ together with the auxiliary capacitance bus line 113 and the first insulating film 120.

In this embodiment, the auxiliary capacitance $C_{S2}$ is disposed in parallel to the liquid crystal capacitance $C_{LC2}$ as shown in the equivalent circuit diagram of FIG. 43. Accordingly, it is possible to reduce the electric potential difference of the floating sub picture element electrodes between the white display portion and the black display portion, and thereby to prevent occurrence of image sticking.

Here, it is also conceivable to form the auxiliary capacitance $C_{S2}$ by use of the floating sub picture element electrode 121b and the auxiliary capacitance bus line 113 instead of providing the auxiliary capacitance electrode 512. However, in that case, a capacitance value of the auxiliary capacitance $C_{S2}$ is reduced because the first and second insulating films 114 and 120 are interposed between the floating sub picture element 121b and the auxiliary capacitance bus line 113. Resultantly, the effect to prevent occurrence of image sticking will be reduced as well. For this reason, it is preferable to form the auxiliary capacitance electrode 512 on the first insulating film 114 as described above, and to connect this auxiliary capacitance electrode 512 and the floating sub picture element electrode 121b electrically.

The methods for preventing image sticking described in the first to fifth embodiments are applicable to various types of liquid crystal display devices such as a TN liquid crystal display device or a VA liquid crystal display device. Moreover, the methods are applicable not only to transmissive liquid crystal display devices but also to reflective liquid crystal display devices and semi-transmissive liquid crystal display devices.

What is claimed is:

1. A liquid crystal display device, comprising:
   first and second substrates disposed opposite to each other;
   a liquid crystal sealed between the first and second substrates;
   a gate bus line and a data bus line formed on the first substrate;

a thin film transistor connected to the gate bus line and the data bus line;

a plurality of sub picture element electrodes formed in a picture element region defined by the gate bus line and the data bus line; and a control electrode capacitively coupled to at least one of the plurality of sub picture element electrodes and connected to the thin film transistor and to which a display voltage is applied from the data bus line through the thin film transistor, wherein the liquid crystal display device includes an auxiliary capacitance bus line maintained at a constant electric potential and capacitively coupled to the control electrode to constitute an auxiliary capacitances and a shield member for electrically shielding an entire connection between the sub picture element electrode capacitively coupled to the control electrode and both the gate bus line and the data bus line, and the shield member is at least one of the sub picture element electrodes which is connected to the thin film transistor among the plurality of sub picture element-electrodes, and the sub picture element electrode capacitively coupled to the control electrode is surrounded by the shield member.

* * * * *